United States Patent
Verweij et al.

(10) Patent No.: US 11,340,962 B2
(45) Date of Patent: May 24, 2022

(54) MULTIPLE NOTIFICATION USER INTERFACE

(71) Applicant: Apple Inc., Cupertino, CA (US)

(72) Inventors: Hugo Verweij, San Francisco, CA (US); Mitchell Lerner, San Francisco, CA (US); David Chance Graham, Columbus, OH (US)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 16/147,406

(22) Filed: Sep. 28, 2018

(65) Prior Publication Data
US 2020/0081751 A1    Mar. 12, 2020

Related U.S. Application Data

(60) Provisional application No. 62/729,939, filed on Sep. 11, 2018.

(51) Int. Cl.
| | | |
|---|---|---|
| *G06F 15/16* | (2006.01) | |
| *G06F 9/54* | (2006.01) | |
| *G06F 9/48* | (2006.01) | |
| *G06F 3/16* | (2006.01) | |

(52) U.S. Cl.
CPC ............ G06F 9/542 (2013.01); G06F 3/165 (2013.01); G06F 3/167 (2013.01); G06F 9/4837 (2013.01)

(58) Field of Classification Search
CPC .......... G06F 9/542; G06F 3/165; G06F 3/167; G06F 9/4837
USPC ........................................................ 709/206
See application file for complete search history.

(56) References Cited

U.S. PATENT DOCUMENTS

| | | | | |
|---|---|---|---|---|
| 8,805,690 | B1* | 8/2014 | Lebeau ................... | G06F 3/165 709/206 |
| 9,812,001 | B1* | 11/2017 | Grant ...................... | G08B 29/20 |
| 2011/0074558 | A1* | 3/2011 | Miura .................. | G04G 13/021 340/309.16 |
| 2012/0120105 | A1* | 5/2012 | Honda ................. | G06Q 10/109 345/634 |
| 2014/0282003 | A1* | 9/2014 | Gruber .................... | G06F 3/167 715/727 |
| 2015/0148928 | A1* | 5/2015 | Malsbary ............... | H04H 20/61 700/94 |
| 2017/0041769 | A1* | 2/2017 | Shim ....................... | H04W 4/12 |
| 2019/0074991 | A1* | 3/2019 | Peterson ................. | G06F 3/167 |

OTHER PUBLICATIONS

Invitation to Pay Addition Fees received for PCT Patent Application No. PCT/US2019/049206, dated Dec. 4, 2019, 12 pages.
International Search Report and Written Opinion received for PCT Patent Application No. PCT/US2019/049206, dated Feb. 4, 2020, 18 pages.
International Preliminary Report on Patentability received for PCT Patent Application No. PCT/US2019/049206, dated Mar. 25, 2021, 13 pages.

* cited by examiner

*Primary Examiner* — Cheikh T Ndiaye
*Assistant Examiner* — Ayele F Woldemariam
(74) *Attorney, Agent, or Firm* — Dentons US LLP

(57) ABSTRACT

The present disclosure generally relates to audio output for time-based notifications. Enhanced alerts for time-based notifications based on various notification conditions provides users with clarity about which notifications are being output, thereby providing an improved user interface.

36 Claims, 32 Drawing Sheets

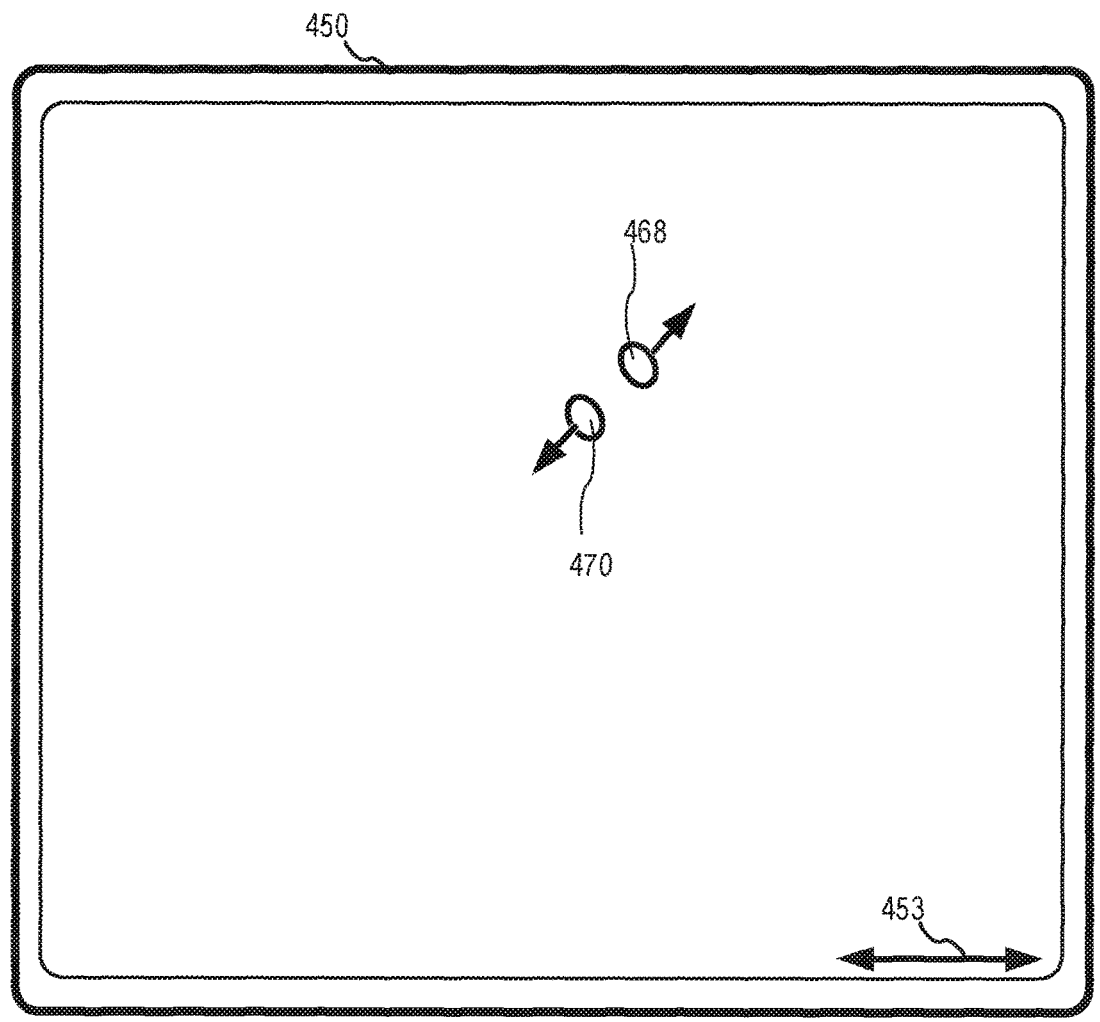
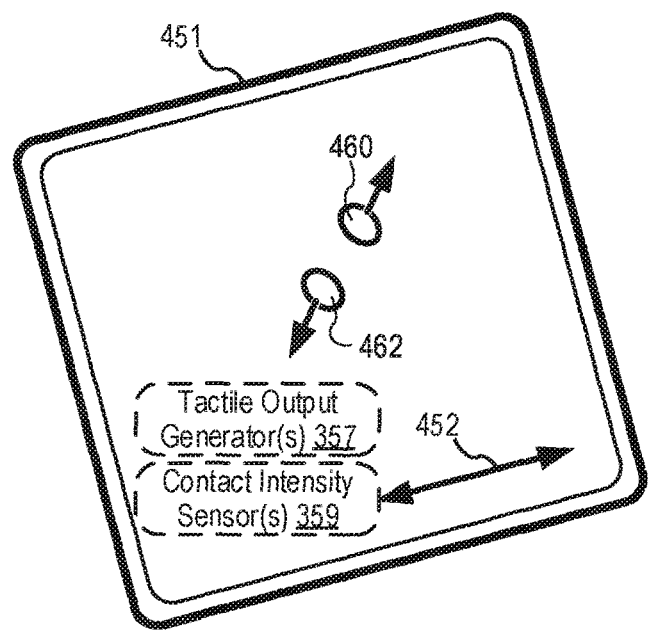
*FIG. 4B*

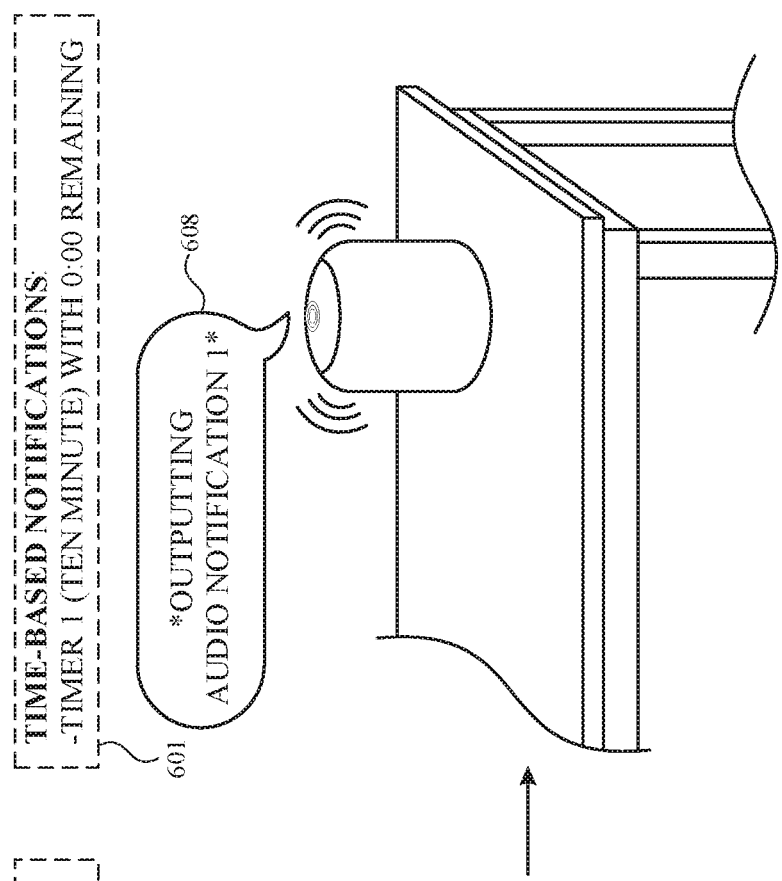
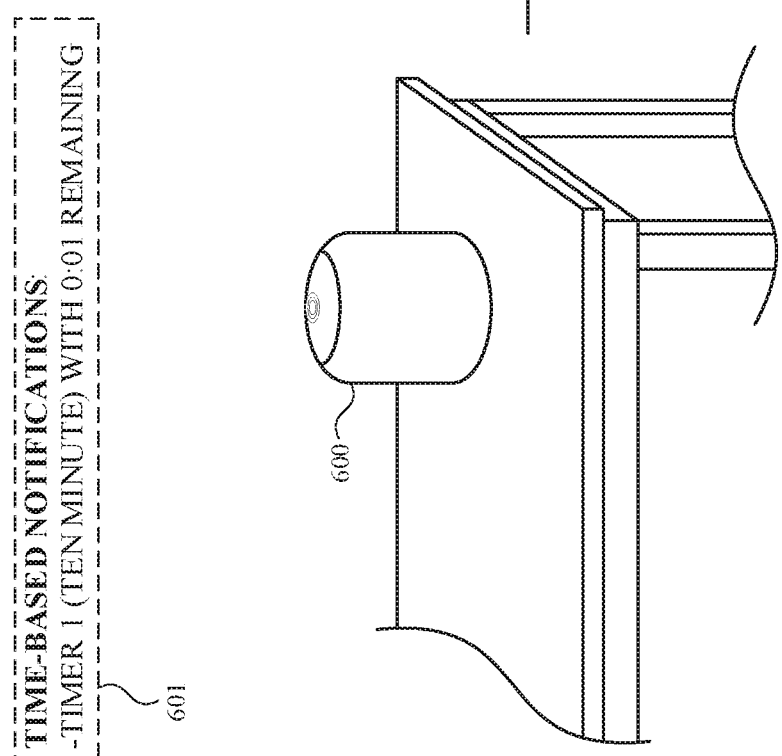

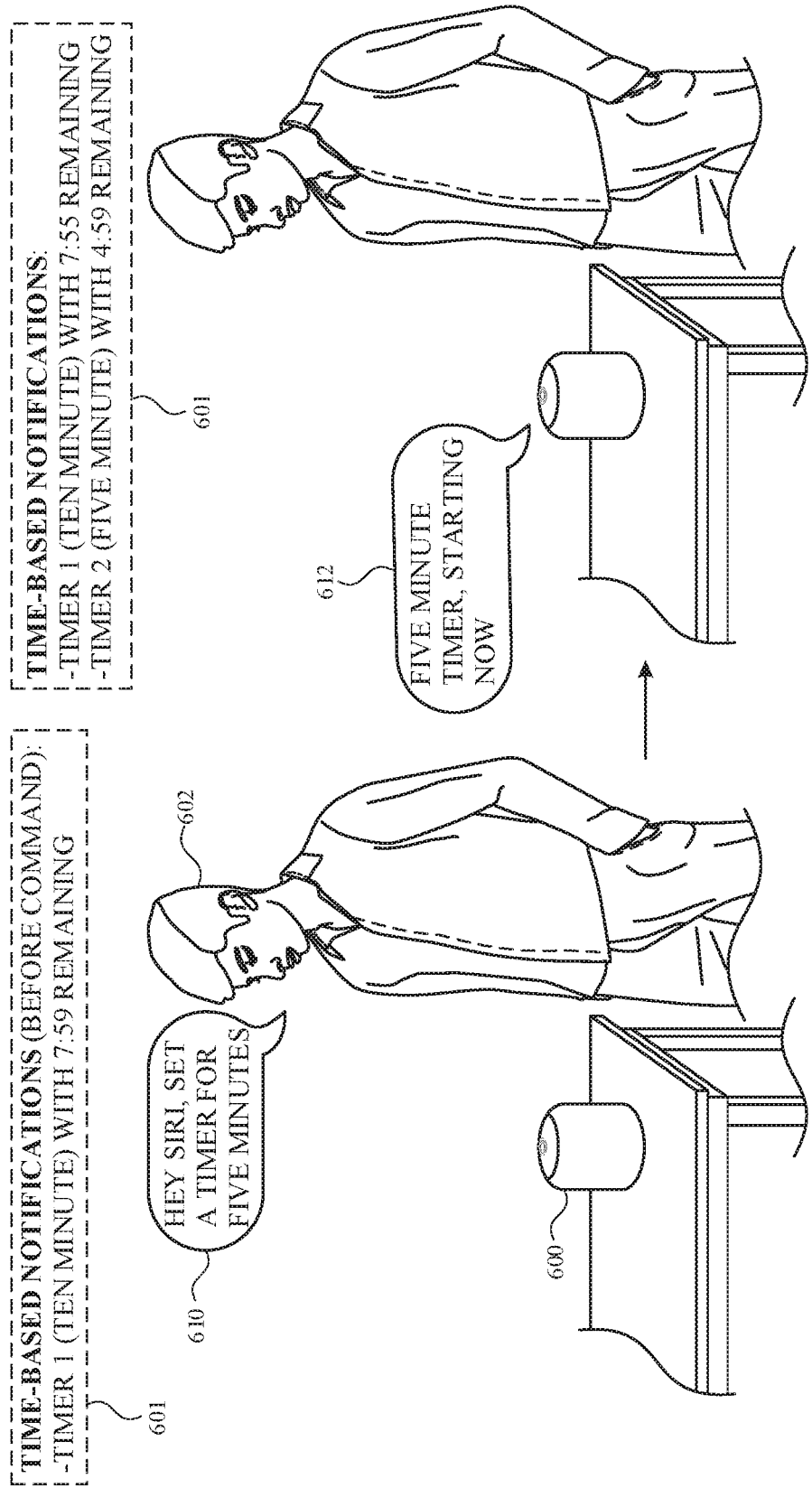

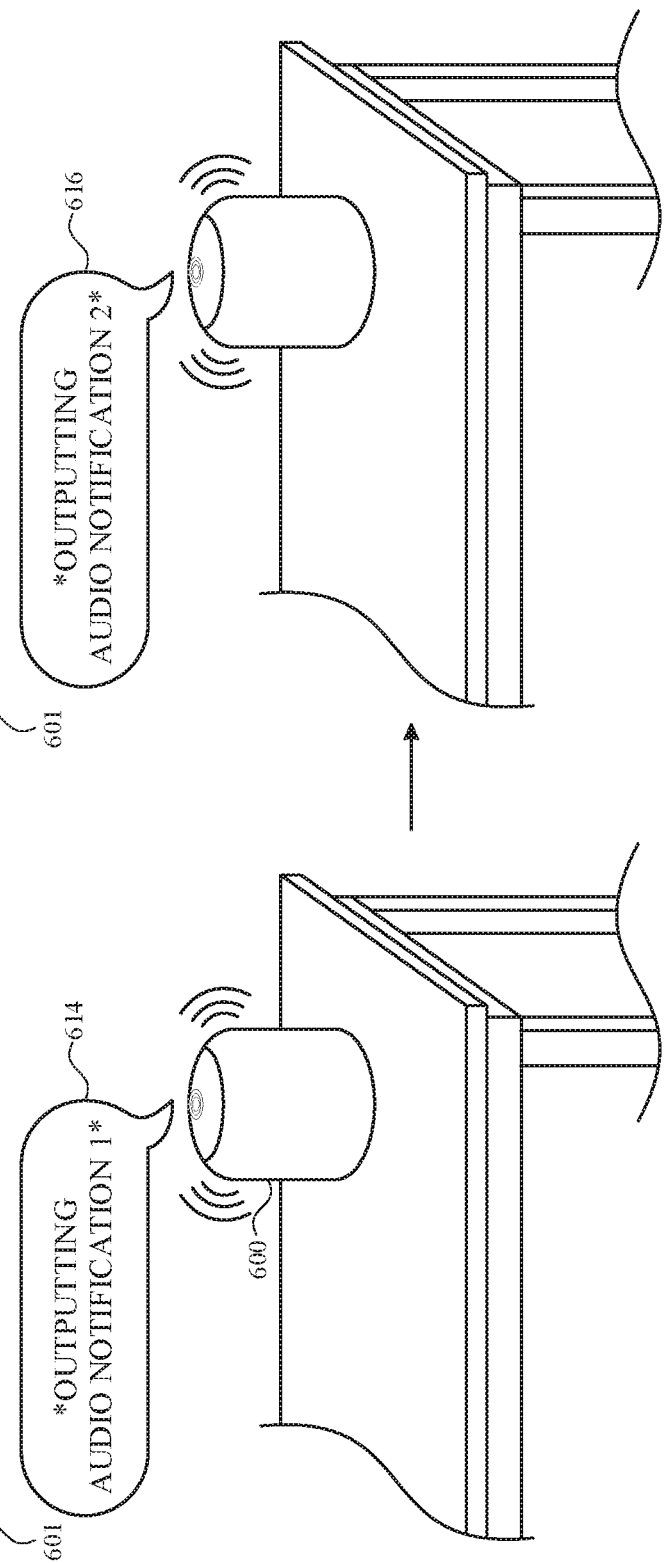

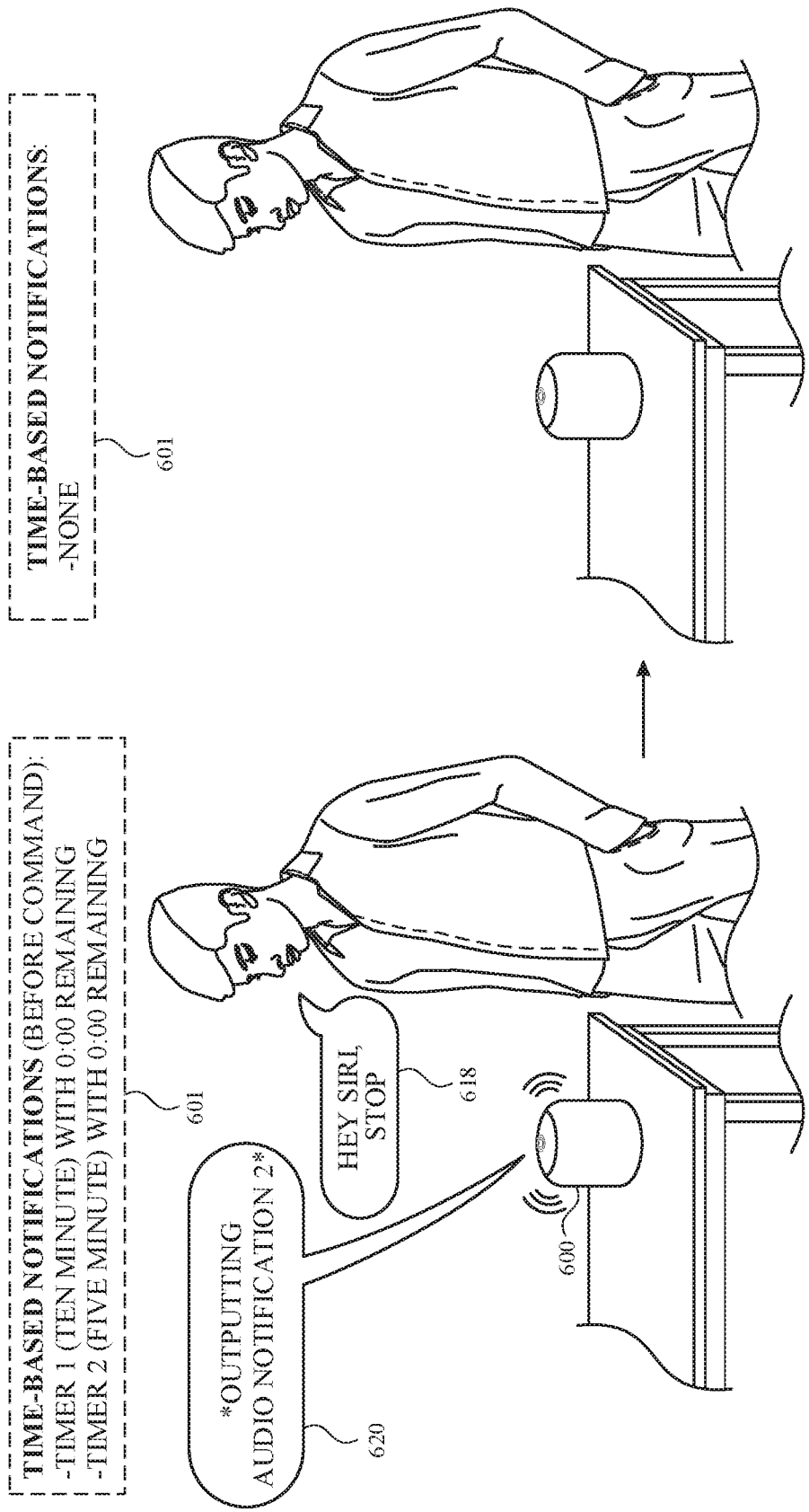

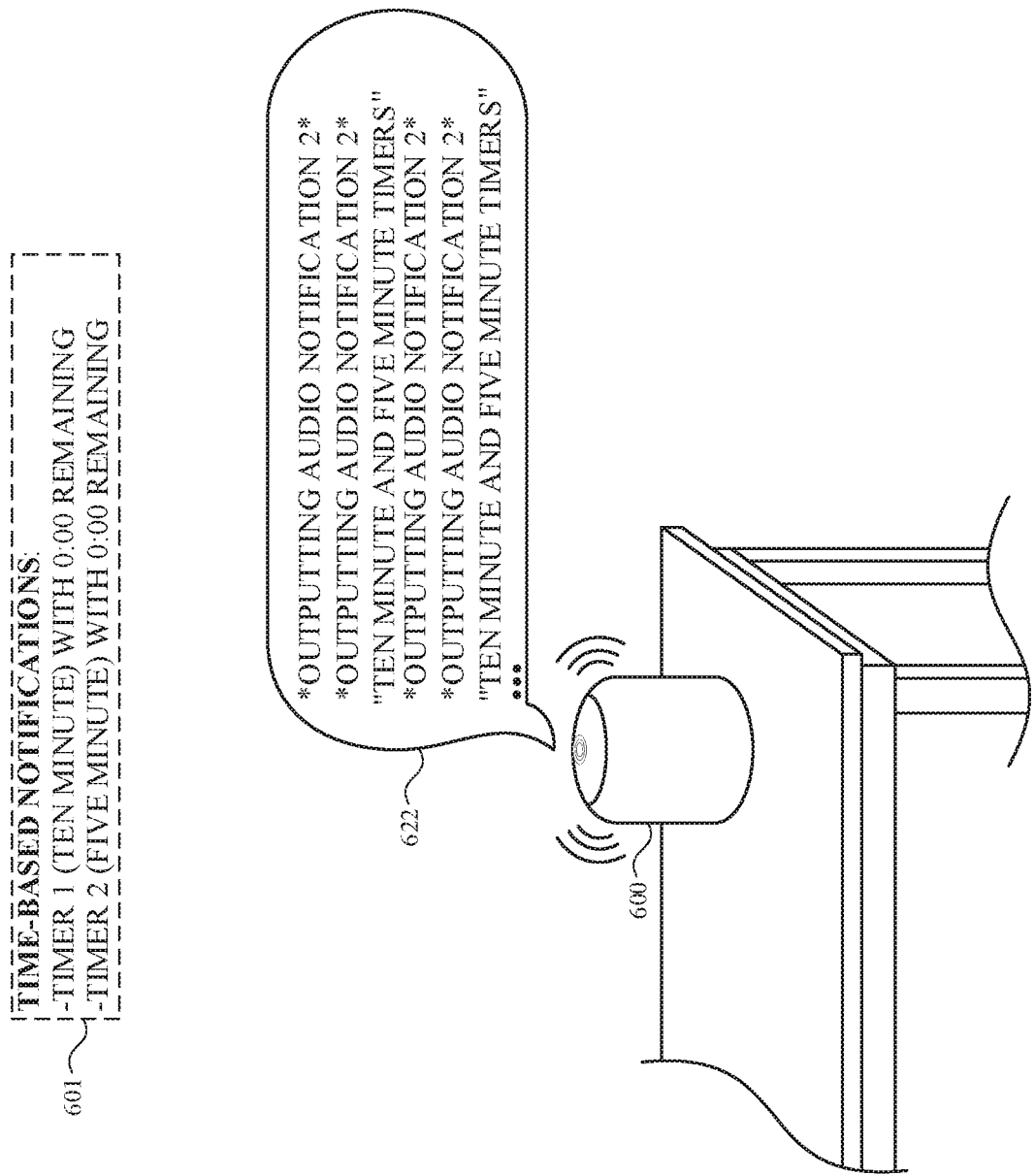

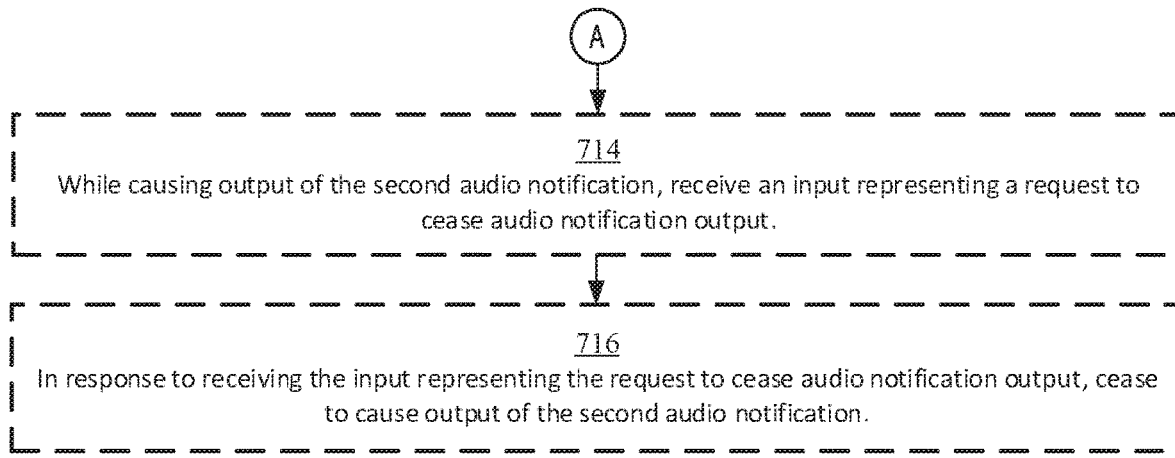
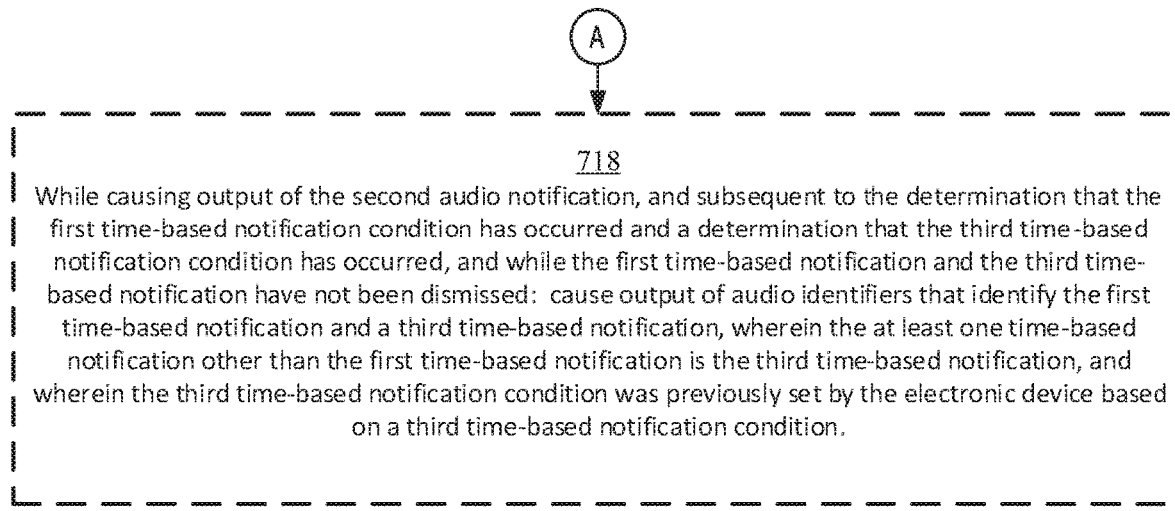
FIG. 7B

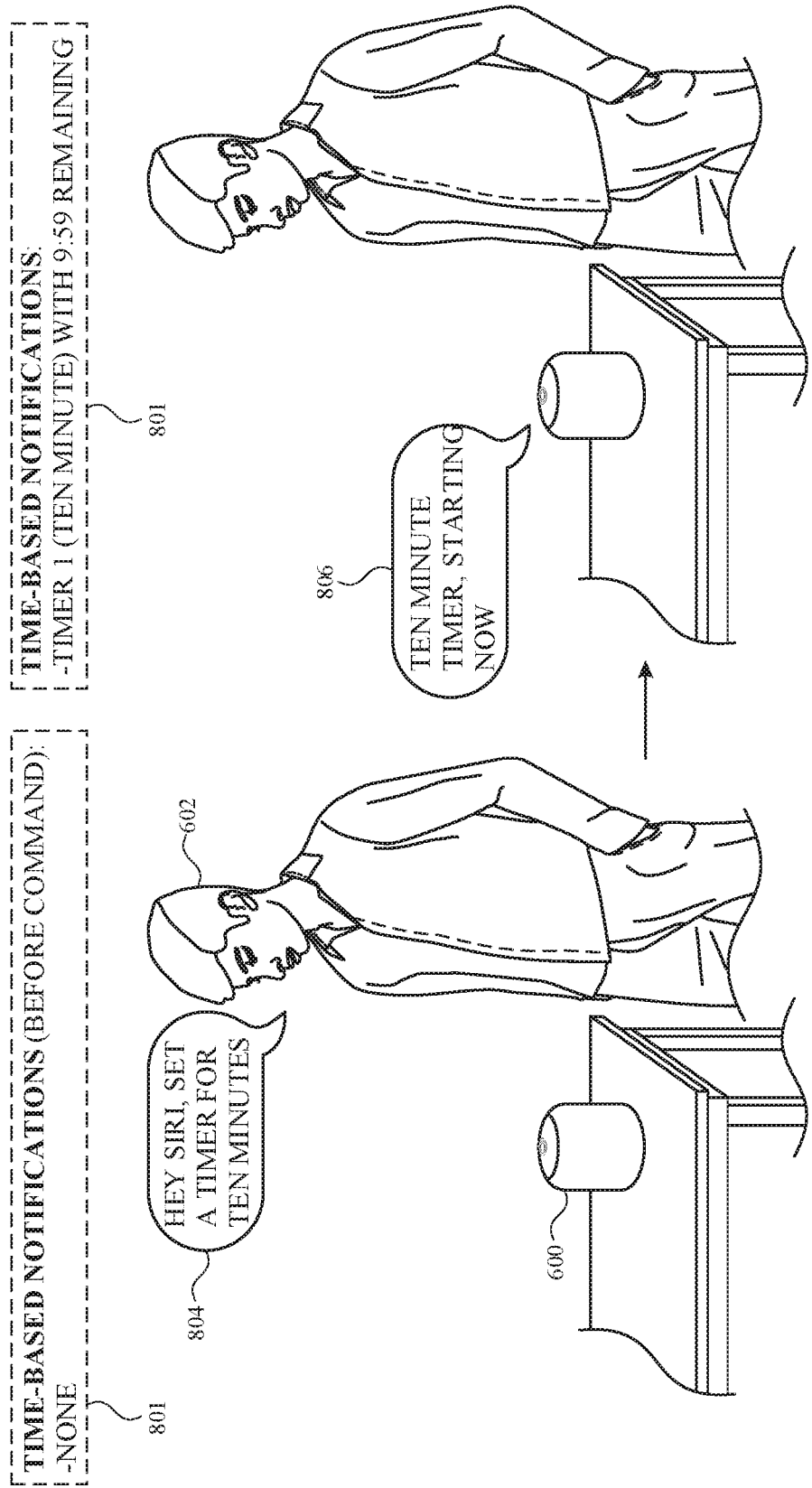

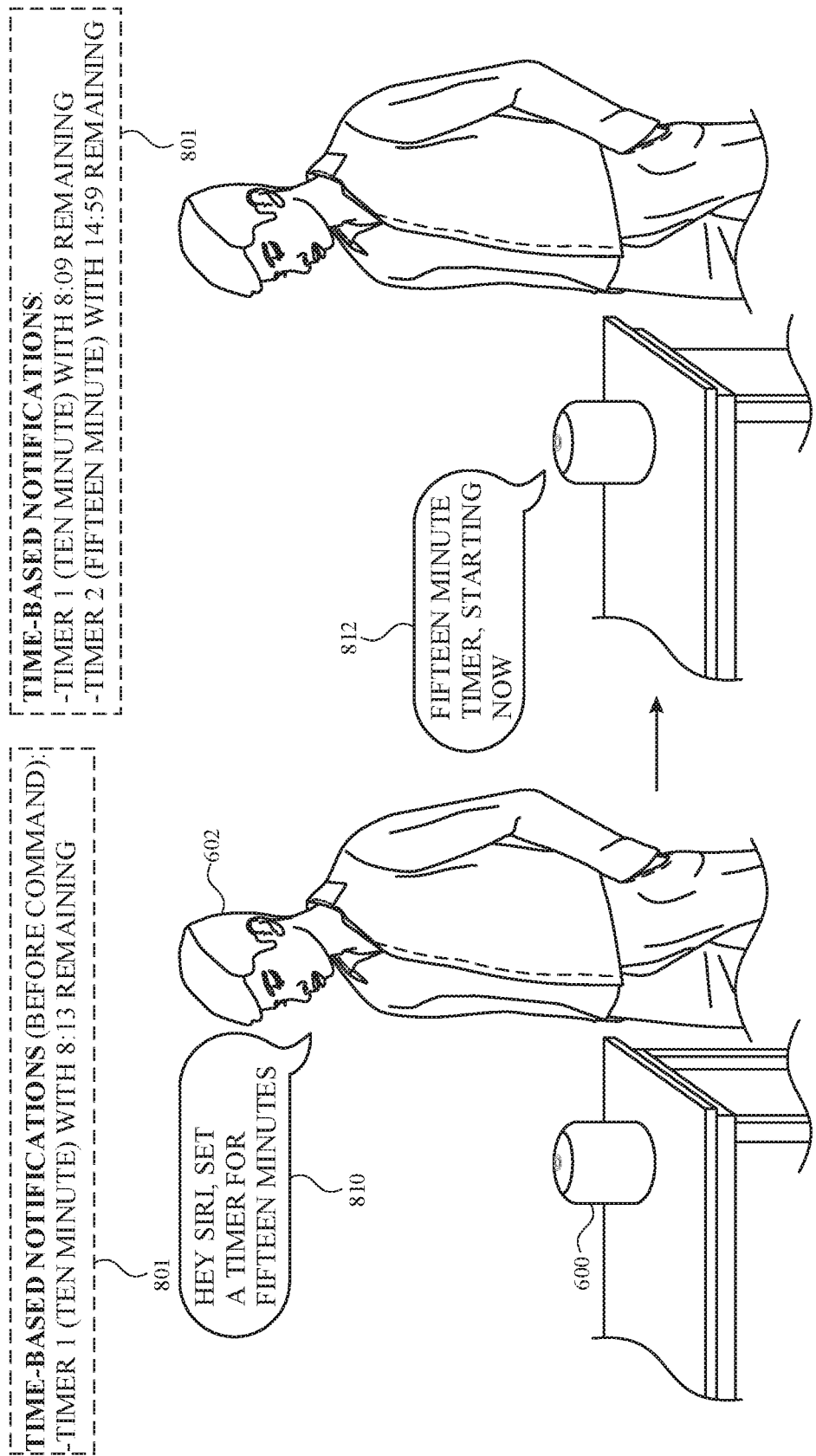

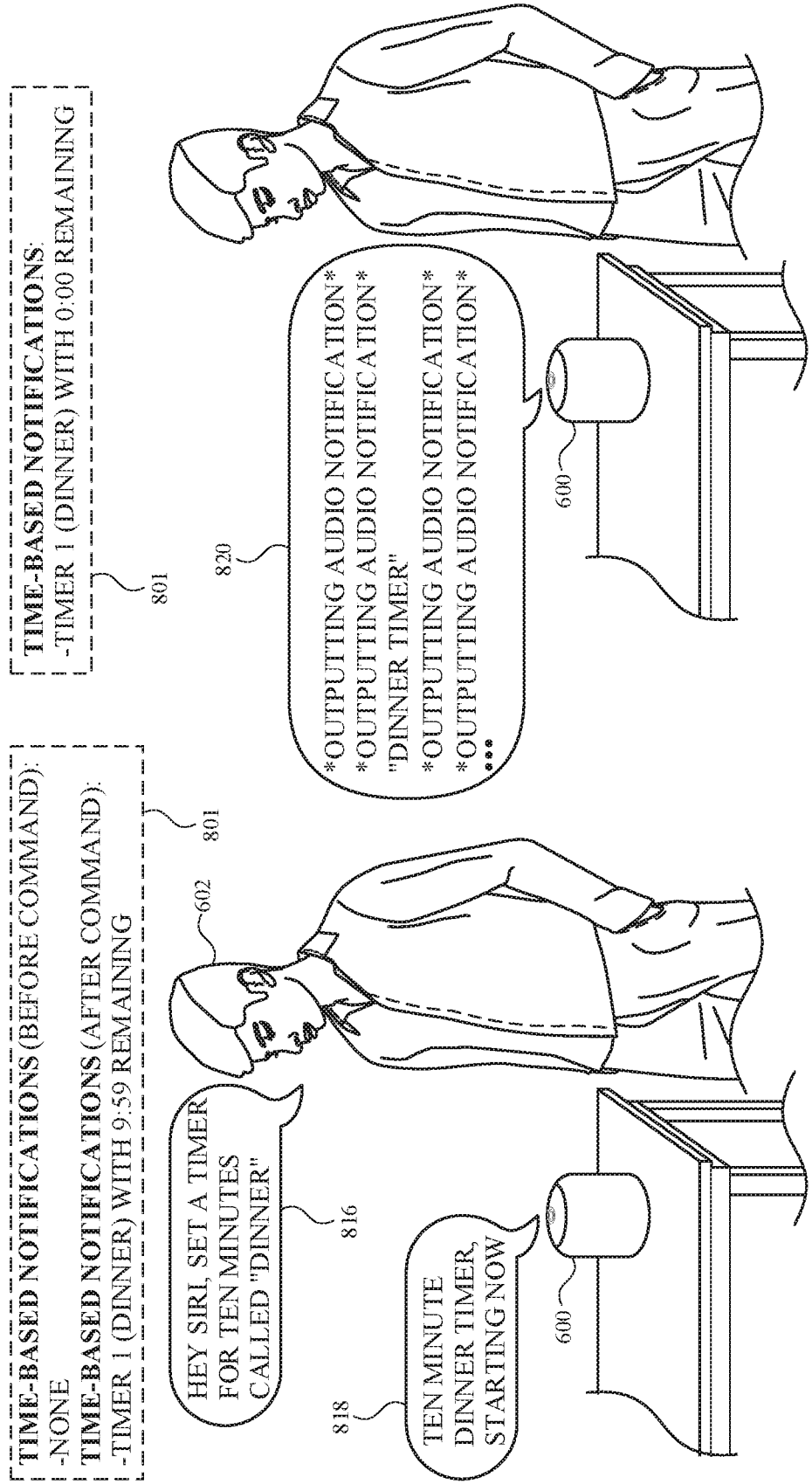

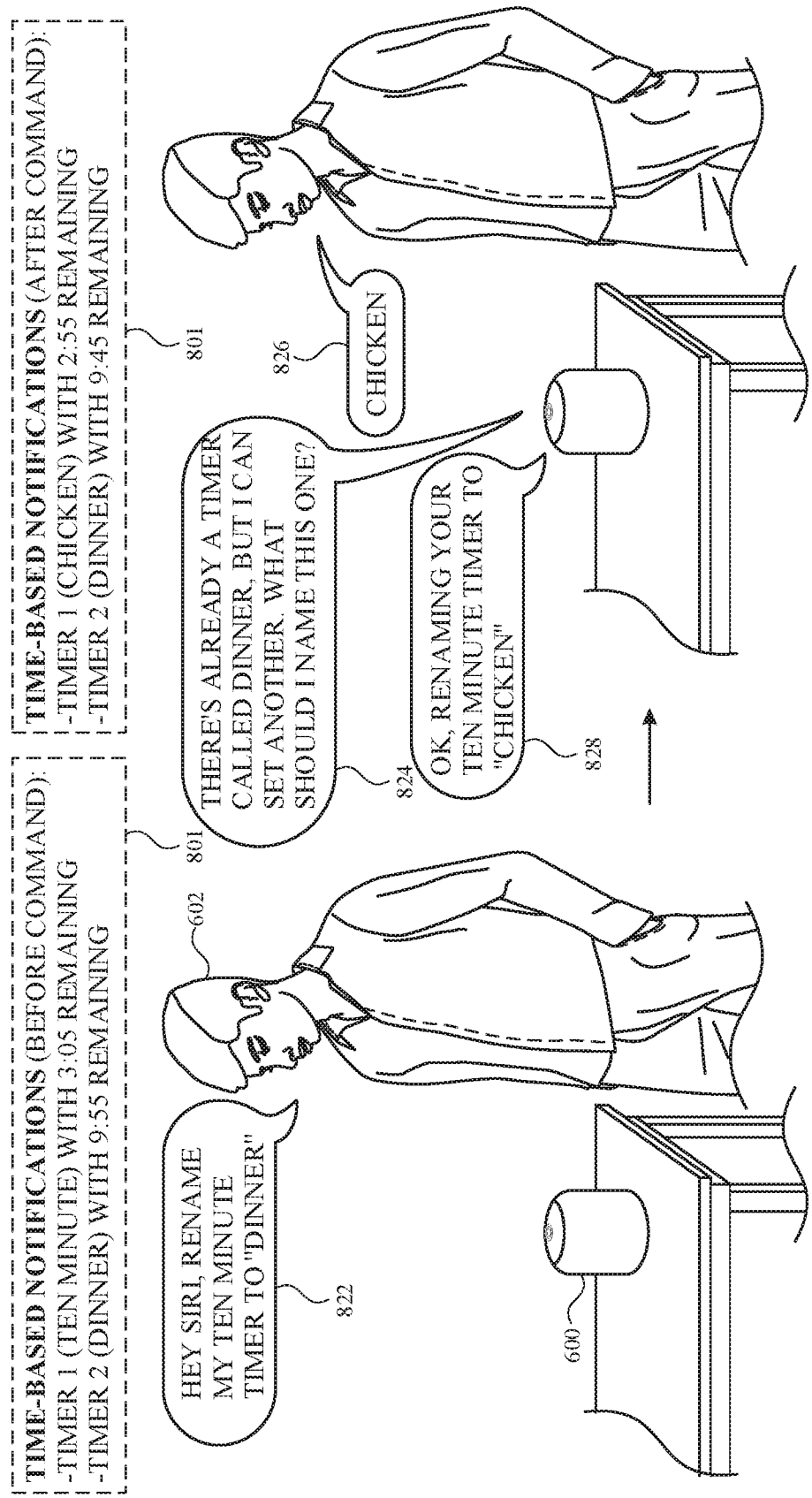

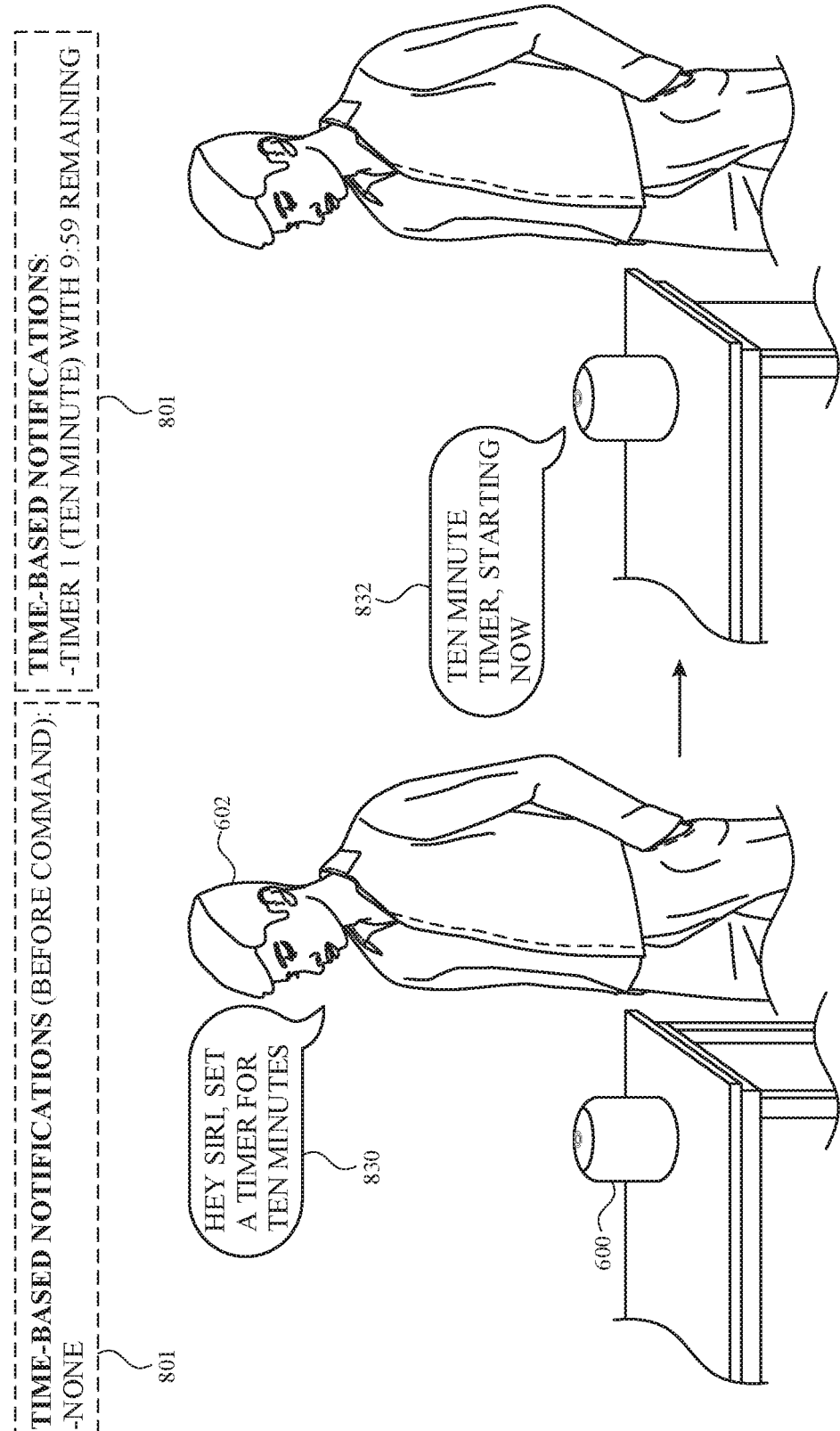

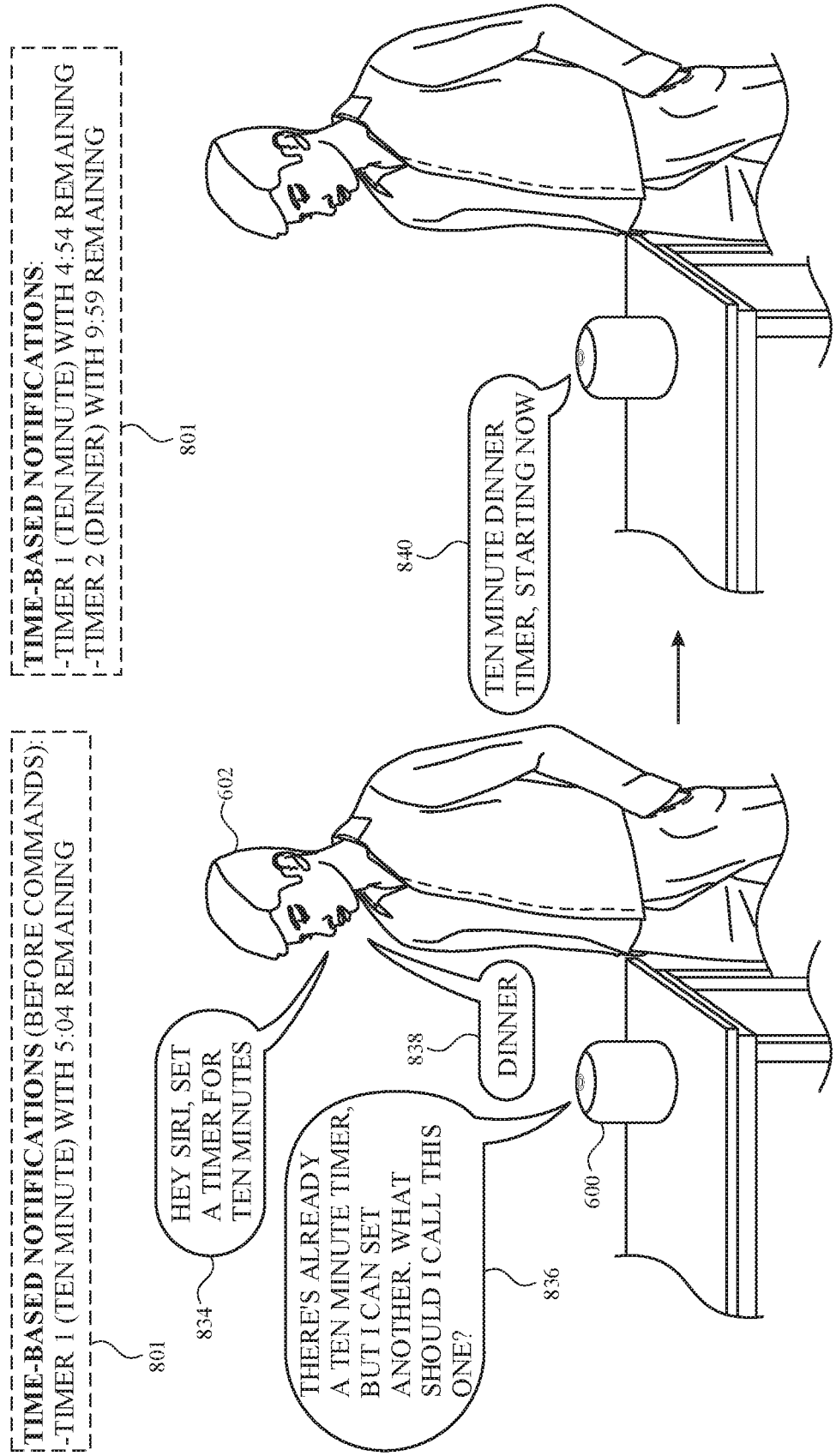

| NOTIFICATION TYPE OF NOTIFICATION CONDITION THAT HAS OCCURRED (NOTIFICATION 1) | NOTIFICATION TYPE OF OTHER ACTIVE NOTIFICATION (NOTIFICATION 2) | ANNOUNCE NAME OF NOTIFICATION 1? |
|---|---|---|
| FIRST | FIRST | YES |
| FIRST | SECOND | NO |
| SECOND | FIRST | NO |
| SECOND | SECOND | YES |

*FIG. 80*

906
In response to a determination that the first time-based notification condition has occurred:

911
In accordance with a determination that the set of one or more name output conditions is not satisfied, forgo causing output of the audio identifier that identifies the first time-based notification.

912
Wherein the set of one or more name output conditions includes a first condition that is satisfied when a second time-based notification is active when the first time-based notification condition occurs.

914
Wherein a determination that the first condition is satisfied further includes a determination that the first time-based notification and the second time-based notification are of a same type of time-based notification.

913
Wherein the set of one or more name output conditions is satisfied when at least one name output condition in the set of one or more name output conditions is satisfied.

920
Wherein a name of the first time-based notification is configurable via input representing a request to set the name of the first time-based notification, and wherein the set of one or more name output conditions includes a third condition that is satisfied when the name of the first time-based notification has been configured via input representing a request to set the name of the first time-based notification.

*FIG. 9B*

MULTIPLE NOTIFICATION USER INTERFACE

CROSS-REFERENCE TO RELATED APPLICATIONS

This application claims priority to U.S. Provisional Application No. 62/729,939, entitled "MULTIPLE NOTIFICATION USER INTERFACE", filed Sep. 11, 2018, the entire contents of which are hereby incorporated by reference.

FIELD

The present disclosure relates generally to computer user interfaces, and more specifically to techniques for time-based notification audio output.

BACKGROUND

The number of electronic devices, and particularly smart devices, in users' homes continues to increase. These devices are increasingly being interconnected with each other, are increasingly more capable, and are performing more complex tasks. As such, these devices are increasingly expected to have thoughtfully-designed user interfaces.

BRIEF SUMMARY

Some techniques for time-based notification audio output using electronic devices, however, are not informative and are generally cumbersome and inefficient. For example, some existing techniques use a complex and time-consuming user interface, which may include multiple key presses or keystrokes. For another example, some existing techniques do not sufficiently indicate and/or identify multiple expired time-based notifications. Some existing techniques are confusing, and require more time than necessary, wasting user time and device energy. This latter consideration is particularly important in battery-operated devices.

Accordingly, the present technique provides electronic devices with faster, more efficient methods and interfaces for time-based notification audio output. Such methods and interfaces optionally complement or replace other methods for time-based notification audio output. Such methods and interfaces reduce the cognitive burden on a user and produce a more efficient human-machine interface. For battery-operated computing devices, such methods and interfaces conserve power and increase the time between battery charges. Such methods and interfaces also reduce the number of repetitive, unnecessary, and/or extraneous inputs required by a user and produce a more efficient human-machine interface.

In accordance with some embodiments, a method is performed at an electronic device. The method comprises: receiving information representing a first time-based notification condition; setting a first time-based notification based on the first time-based notification condition; and in response to a determination that the first time-based notification condition has occurred: in accordance with a determination that the electronic device is not currently causing output of an audio notification based on at least one time-based notification other than the first time-based notification, causing output of a first audio notification; and in accordance with a determination that the electronic device is currently causing output of the audio notification based on at least one time-based notification other than the first time-based notification, causing output of a second audio notification different from the first audio notification.

In accordance with some embodiments, a non-transitory computer-readable storage medium is described. The non-transitory computer-readable storage medium stores one or more programs configured to be executed by one or more processors of an electronic device, the one or more programs including instructions for: receiving information representing a first time-based notification condition; setting a first time-based notification based on the first time-based notification condition; and in response to a determination that the first time-based notification condition has occurred: in accordance with a determination that the electronic device is not currently causing output of an audio notification based on at least one time-based notification other than the first time-based notification, causing output of a first audio notification; and in accordance with a determination that the electronic device is currently causing output of the audio notification based on at least one time-based notification other than the first time-based notification, causing output of a second audio notification different from the first audio notification.

In accordance with some embodiments, an electronic device is described. The electronic device comprises: one or more processors; and memory storing one or more programs configured to be executed by the one or more processors, the one or more programs including instructions for: receiving information representing a first time-based notification condition; setting a first time-based notification based on the first time-based notification condition; and in response to a determination that the first time-based notification condition has occurred: in accordance with a determination that the electronic device is not currently causing output of an audio notification based on at least one time-based notification other than the first time-based notification, causing output of a first audio notification; and in accordance with a determination that the electronic device is currently causing output of the audio notification based on at least one time-based notification other than the first time-based notification, causing output of a second audio notification different from the first audio notification.

In accordance with some embodiments, an electronic device is described. The electronic device comprises: means for receiving information representing a first time-based notification condition; means for setting a first time-based notification based on the first time-based notification condition; and responsive to a determination that the first time-based notification condition has occurred: in accordance with a determination that the electronic device is not currently causing output of an audio notification based on at least one time-based notification other than the first time-based notification, means for causing output of a first audio notification; and in accordance with a determination that the electronic device is currently causing output of the audio notification based on at least one time-based notification other than the first time-based notification, means for causing output of a second audio notification different from the first audio notification.

In accordance with some embodiments, a transitory computer-readable storage medium is described. The transitory computer-readable storage medium stores one or more programs configured to be executed by one or more processors of an electronic device with a display, the one or more programs including instructions for: receiving information representing a first time-based notification condition; setting a first time-based notification based on the first time-based notification condition; and in response to a determination that the first time-based notification condition has occurred: in accordance with a determination that the electronic device is not currently causing output of an audio notification based on at least one time-based notification other than the first time-based notification, causing output of a first audio notification; and in accordance with a determination that the electronic device is currently causing output of the audio notification based on at least one time-based notification other than the first time-based notification, causing output of a second audio notification different from the first audio notification.

In accordance with some embodiments, a method is performed at an electronic device. The method comprises: receiving information representing a first time-based notification condition; setting a first time-based notification based on the first time-based notification condition; and in response to a determination that the first time-based notification condition has occurred: causing output of an audio notification; in accordance with a determination that a set of one or more name output conditions is satisfied, causing output of an audio identifier that identifies the first time-based notification; and in accordance with a determination that the set of one or more name output conditions is not satisfied, forgoing causing output of the audio identifier that identifies the first time-based notification, wherein the set of one or more name output conditions includes a first condition that is satisfied when a second time-based notification is active when the first time-based notification condition occurs, and wherein the set of one or more name output conditions is satisfied when at least one name output condition in the set of one or more name output conditions is satisfied.

In accordance with some embodiments, a non-transitory computer-readable storage medium is described. The non-transitory computer-readable storage medium stores one or more programs configured to be executed by one or more processors of an electronic device, the one or more programs including instructions for: receiving information representing a first time-based notification condition; setting a first time-based notification based on the first time-based notification condition; and in response to a determination that the first time-based notification condition has occurred: causing output of an audio notification; in accordance with a determination that a set of one or more name output conditions is satisfied, causing output of an audio identifier that identifies the first time-based notification; and in accordance with a determination that the set of one or more name output conditions is not satisfied, forgoing causing output of the audio identifier that identifies the first time-based notification, wherein the set of one or more name output conditions includes a first condition that is satisfied when a second time-based notification is active when the first time-based notification condition occurs, and wherein the set of one or more name output conditions is satisfied when at least one name output condition in the set of one or more name output conditions is satisfied.

In accordance with some embodiments, an electronic device is described. The electronic device comprises: one or more processors; and memory storing one or more programs configured to be executed by the one or more processors, the one or more programs including instructions for: receiving information representing a first time-based notification condition; setting a first time-based notification based on the first time-based notification condition; and in response to a determination that the first time-based notification condition has occurred: causing output of an audio notification; in accordance with a determination that a set of one or more name output conditions is satisfied, causing output of an audio identifier that identifies the first time-based notification; and in accordance with a determination that the set of one or more name output conditions is not satisfied, forgoing causing output of the audio identifier that identifies the first time-based notification, wherein the set of one or more name output conditions includes a first condition that is satisfied when a second time-based notification is active when the first time-based notification condition occurs, and wherein the set of one or more name output conditions is satisfied when at least one name output condition in the set of one or more name output conditions is satisfied.

In accordance with some embodiments, an electronic device is described. The electronic device comprises: means for receiving information representing a first time-based notification condition; means for setting a first time-based notification based on the first time-based notification condition; and responsive to a determination that the first time-based notification condition has occurred: means for causing output of an audio notification; in accordance with a determination that a set of one or more name output conditions is satisfied, means for causing output of an audio identifier that identifies the first time-based notification; and in accordance with a determination that the set of one or more name output conditions is not satisfied, means for forgoing causing output of the audio identifier that identifies the first time-based notification, wherein the set of one or more name output conditions includes a first condition that is satisfied when a second time-based notification is active when the first time-based notification condition occurs, and wherein the set of one or more name output conditions is satisfied when at least one name output condition in the set of one or more name output conditions is satisfied.

In accordance with some embodiments, a transitory computer-readable storage medium is described. The transitory computer-readable storage medium stores one or more programs configured to be executed by one or more processors of an electronic device with a display, the one or more programs including instructions for: receiving information representing a first time-based notification condition; setting a first time-based notification based on the first time-based notification condition; and in response to a determination that the first time-based notification condition has occurred: causing output of an audio notification; in accordance with a determination that a set of one or more name output conditions is satisfied, causing output of an audio identifier that identifies the first time-based notification; and in accordance with a determination that the set of one or more name output conditions is not satisfied, forgoing causing output of the audio identifier that identifies the first time-based notification, wherein the set of one or more name output conditions includes a first condition that is satisfied when a second time-based notification is active when the first time-based notification condition occurs, and wherein the set of one or more name output conditions is satisfied when at least one name output condition in the set of one or more name output conditions is satisfied.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for time-based notification audio output, thereby increasing the effectiveness, efficiency, and user satisfaction with such devices. Such methods and interfaces may complement or replace other methods for time-based notification audio output.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 7A-7B is a flow diagram illustrating a process for outputting multiple-event audio notifications.

FIGS. 9A-9B is a flow diagram illustrating a process for outputting audio identifiers for time-based notifications.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for audio output of time-based notifications. For example, techniques that sufficiently indicate and/or identify multiple expired time-based notifications. Such techniques can reduce the cognitive burden on a user who interacts with time-based notifications, thereby enhancing productivity. Further, such techniques can reduce processor and battery power otherwise wasted on redundant user inputs.

Figures 6A, 6B:
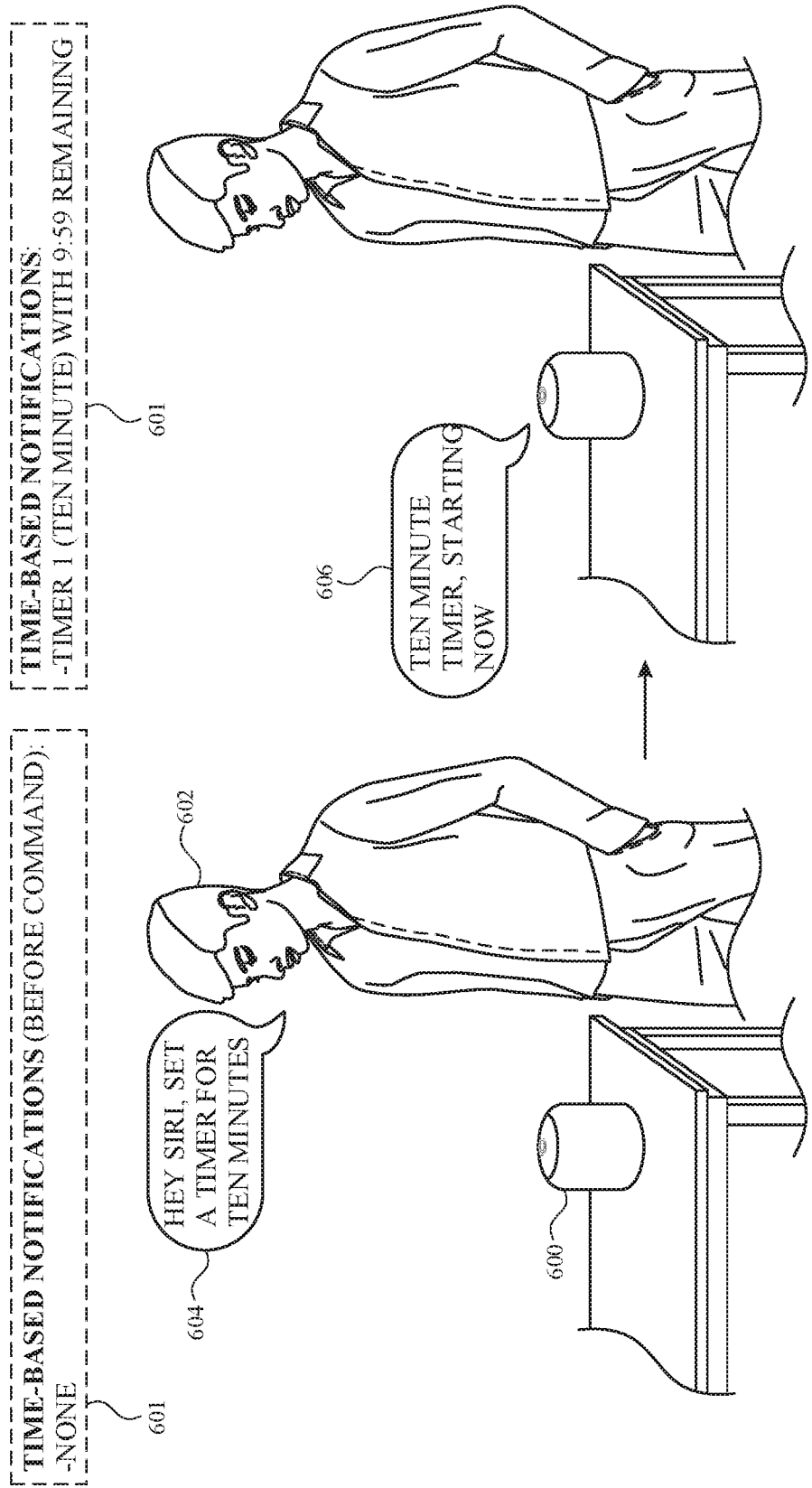
FIGS. 6A-6O illustrate exemplary techniques and user interfaces for outputting multiple-event audio notifications.
Figure 6O:
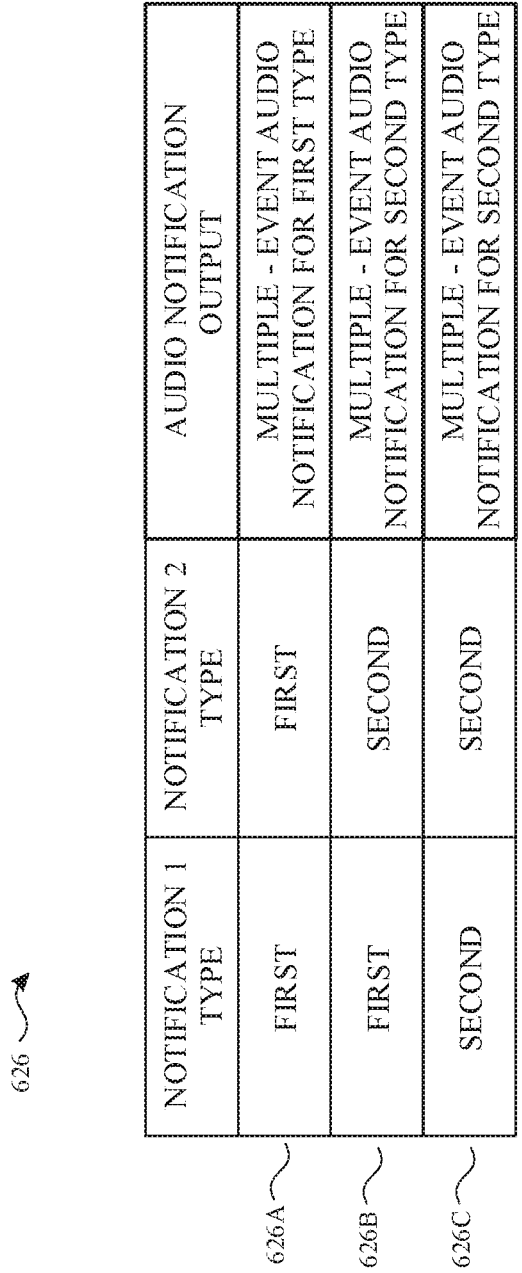
Figure 7A:
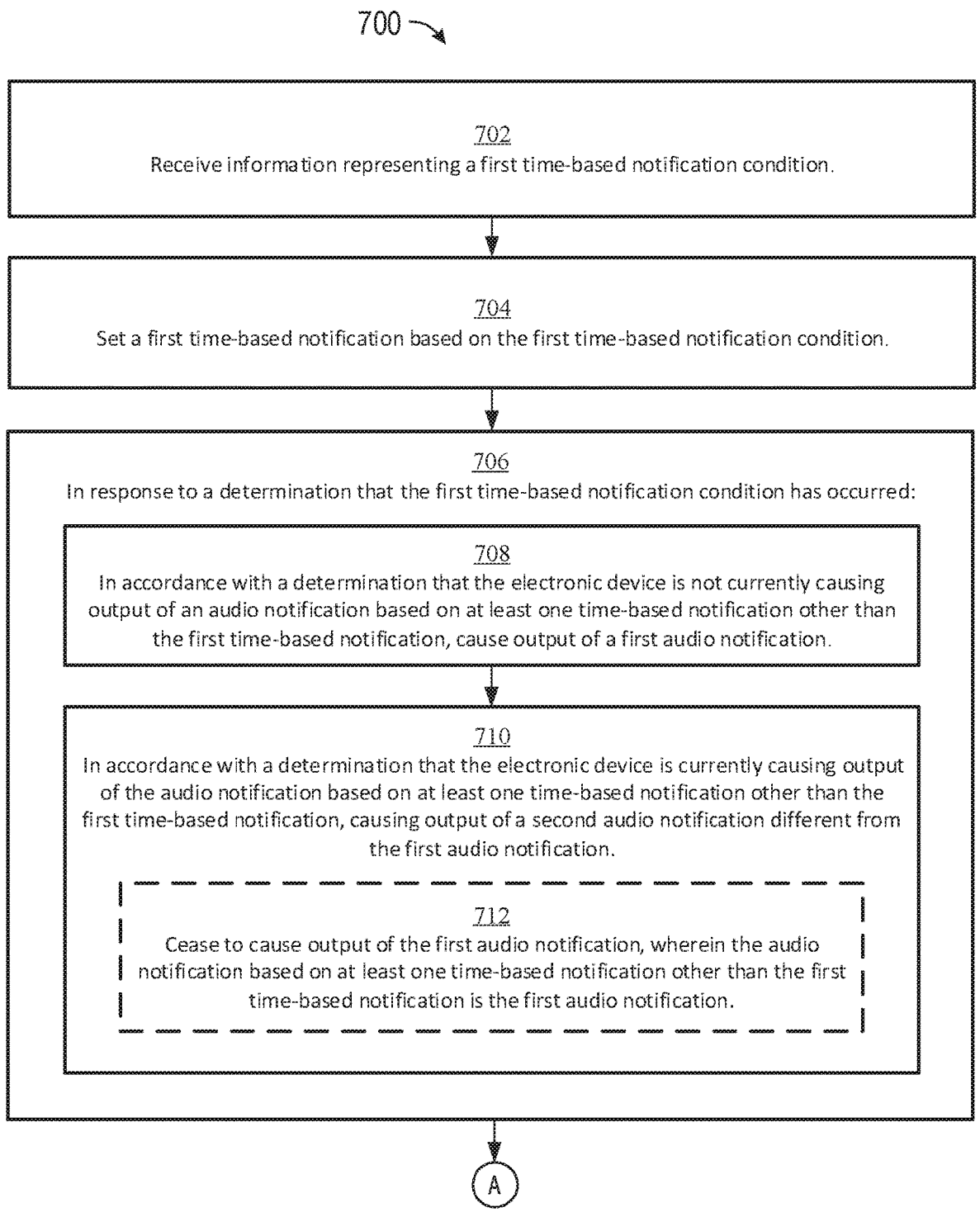

Below, FIGS. 1A-1B, 2, 3, 4A-4B, and 5A-5D provide a description of exemplary devices for performing the techniques for managing event notifications. FIGS. 6A-6O illustrate exemplary user interfaces for managing event notifications. FIGS. 7A-7B is a flow diagram illustrating methods of managing event notifications in accordance with some embodiments. The user interfaces in FIGS. 6A-6G are used to illustrate the processes described below, including the processes in FIGS. 7A-7B. FIGS. 8A-8O illustrate exemplary user interfaces for accessing event notifications. FIGS. 9A-9B is a flow diagram illustrating methods of accessing event notifications in accordance with some embodiments. The user interfaces in FIGS. 8A-8O are used to illustrate the processes described below, including the processes in FIGS. 9A-9B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
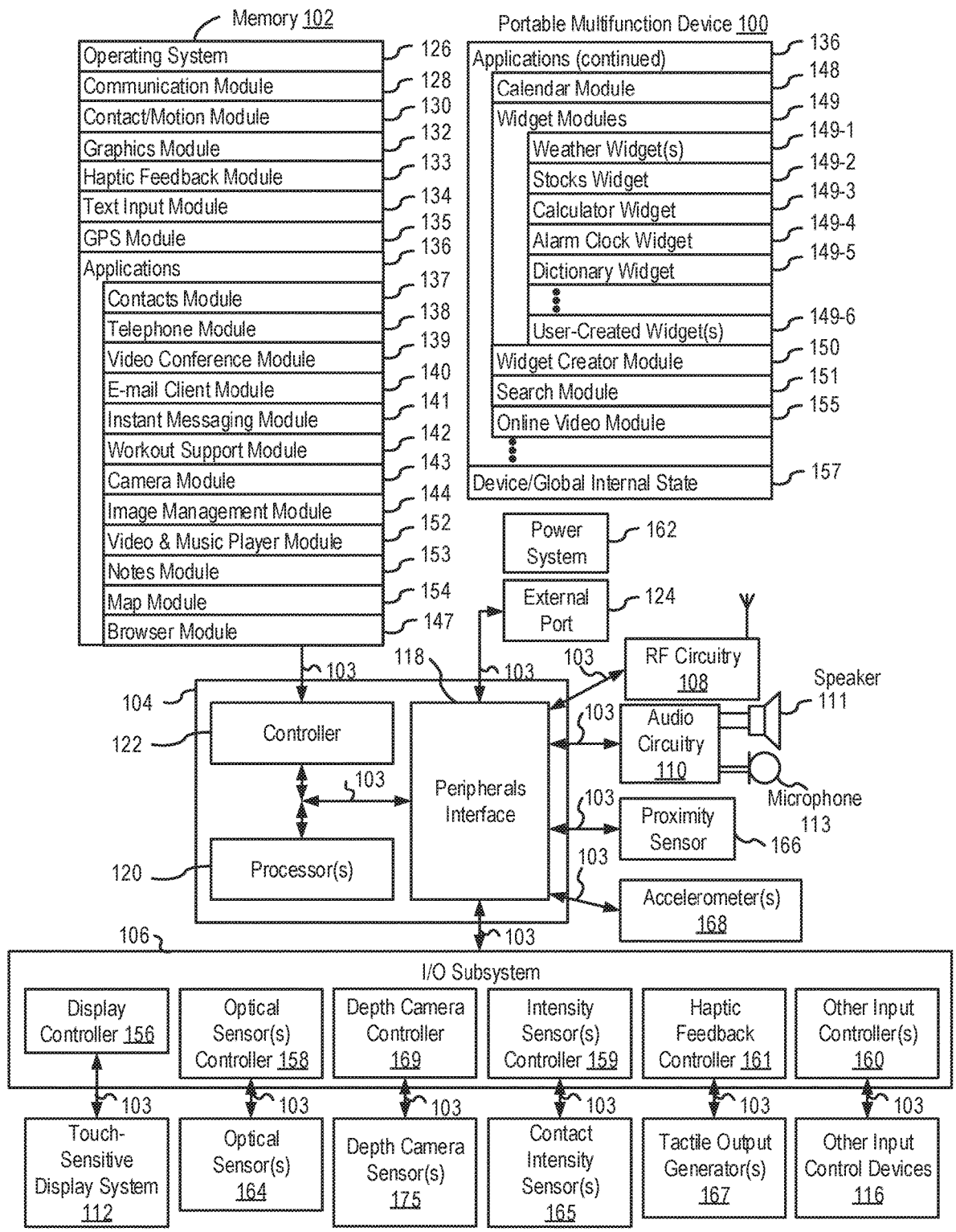
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
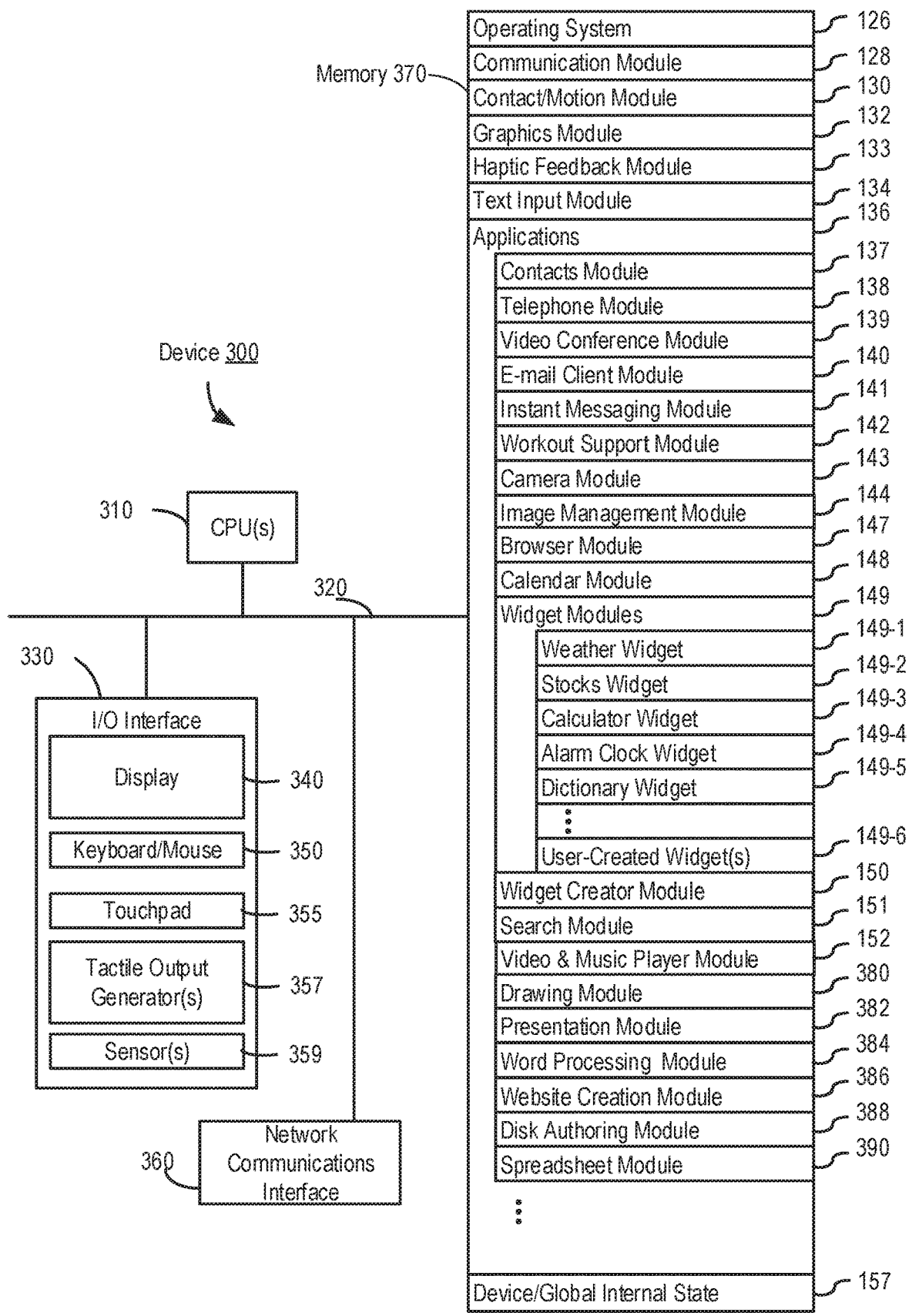
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
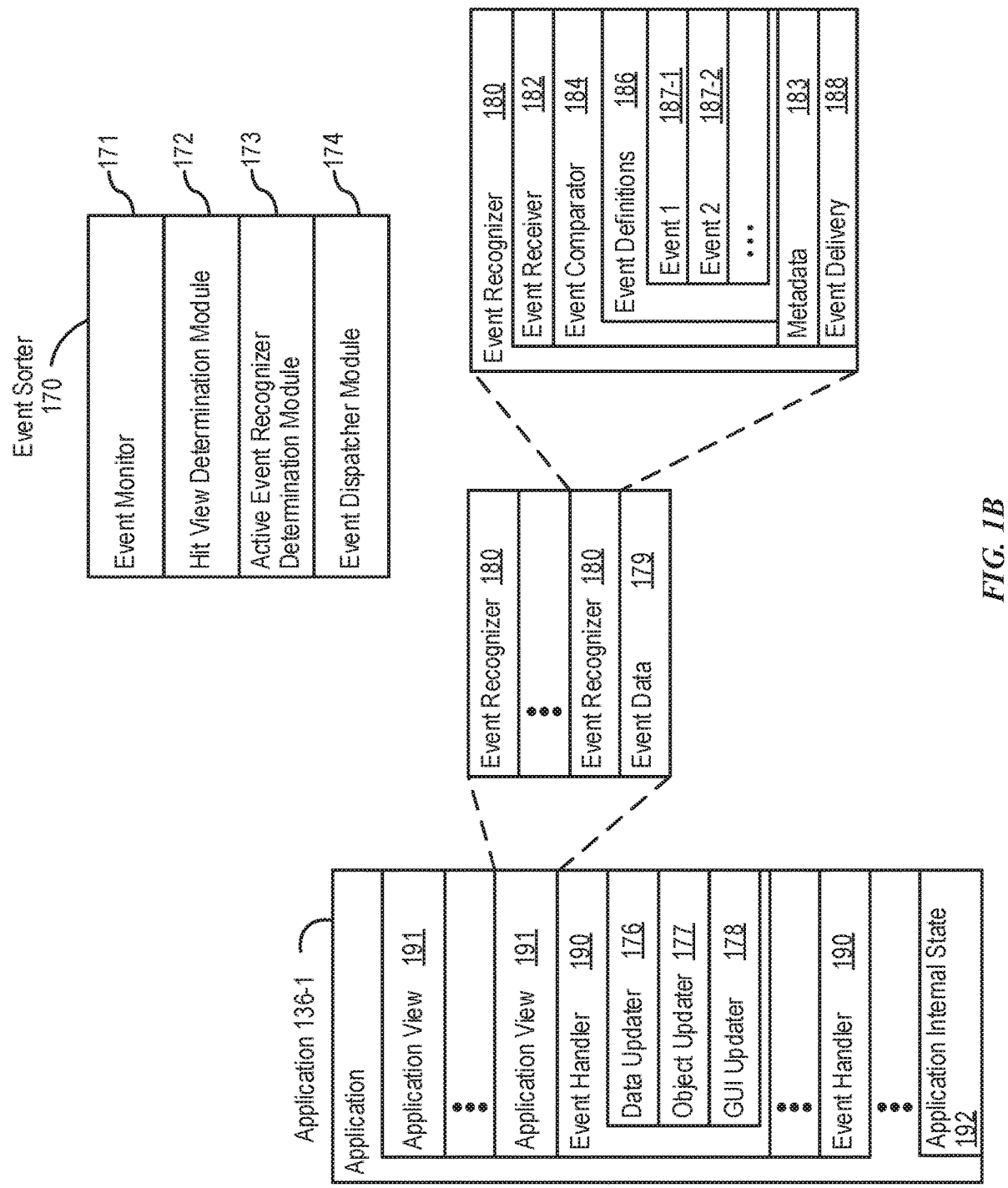
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
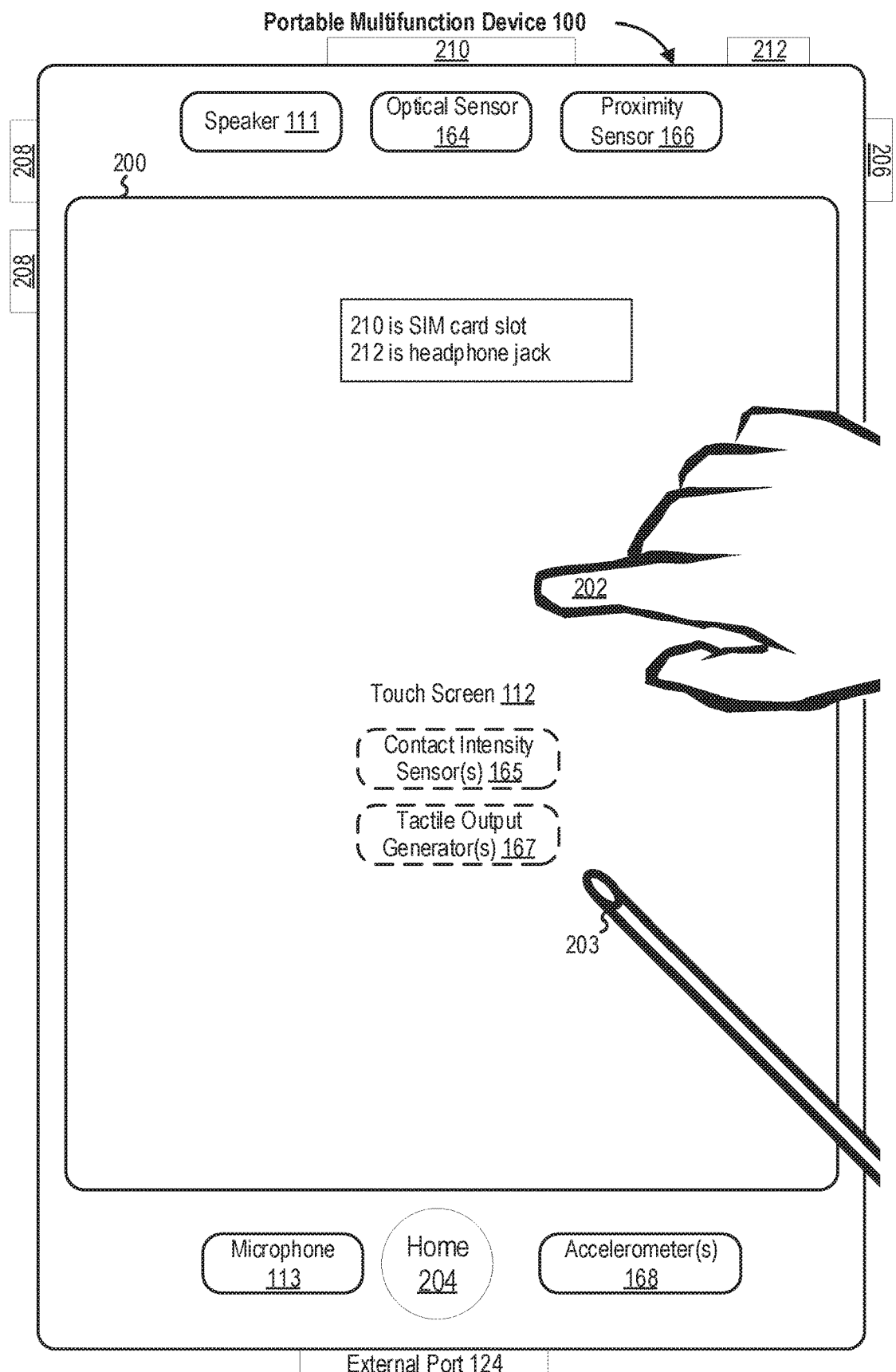
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
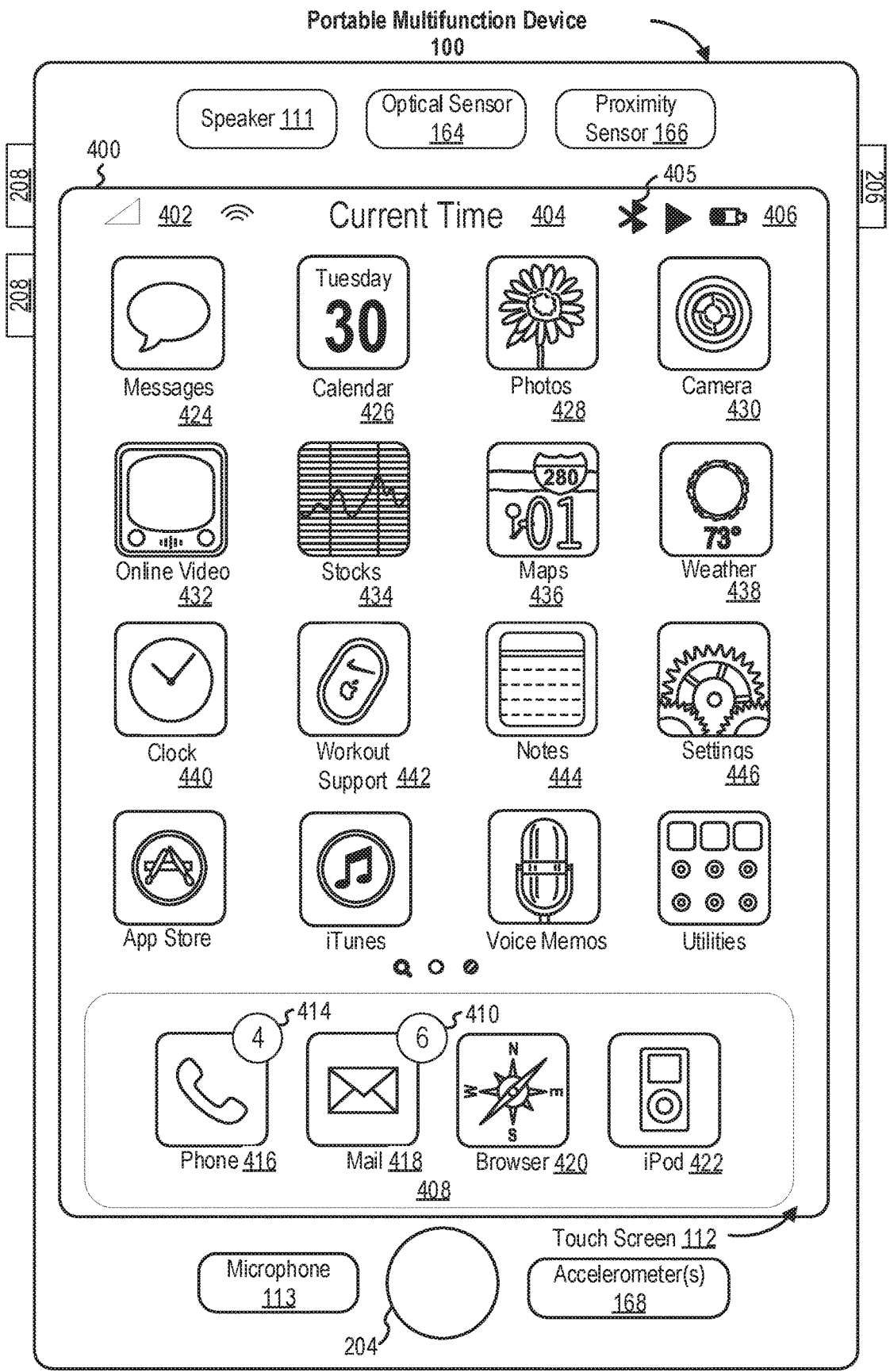
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
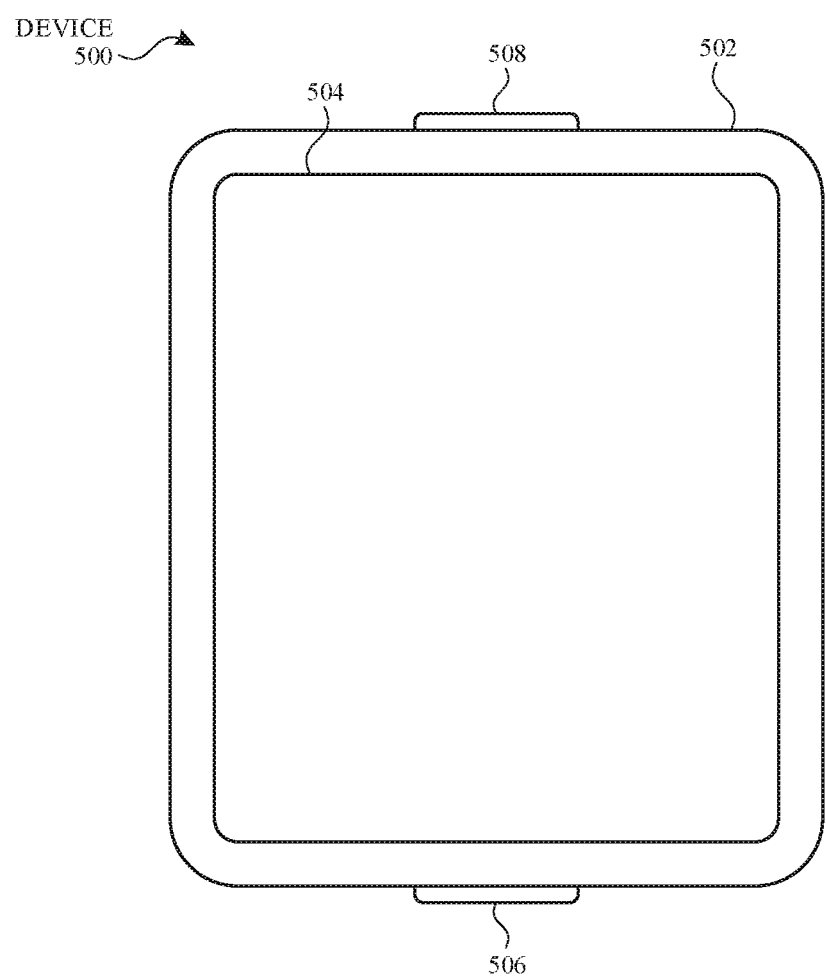
FIG. 5A illustrates a personal electronic device in accordance with some embodiments.
Figure 6L:
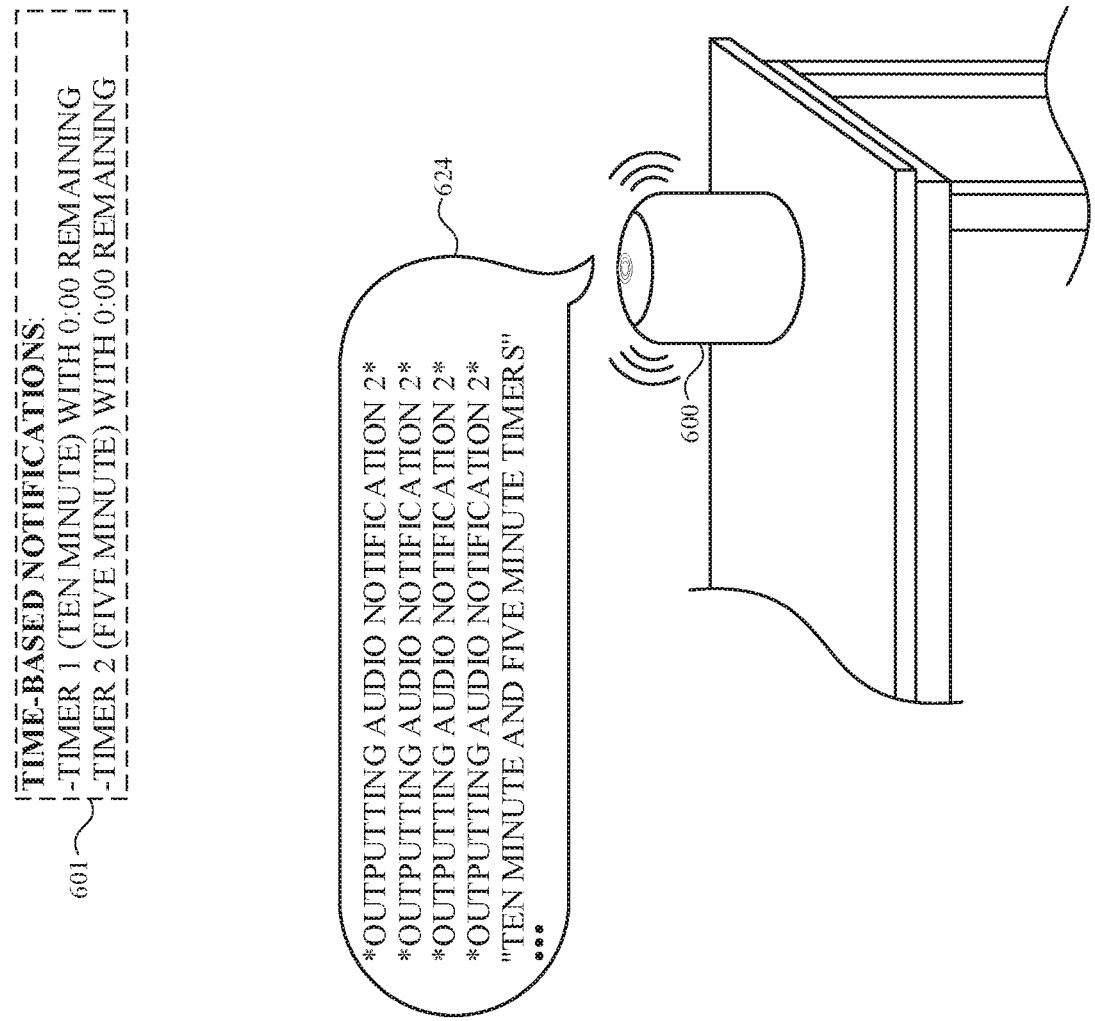

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
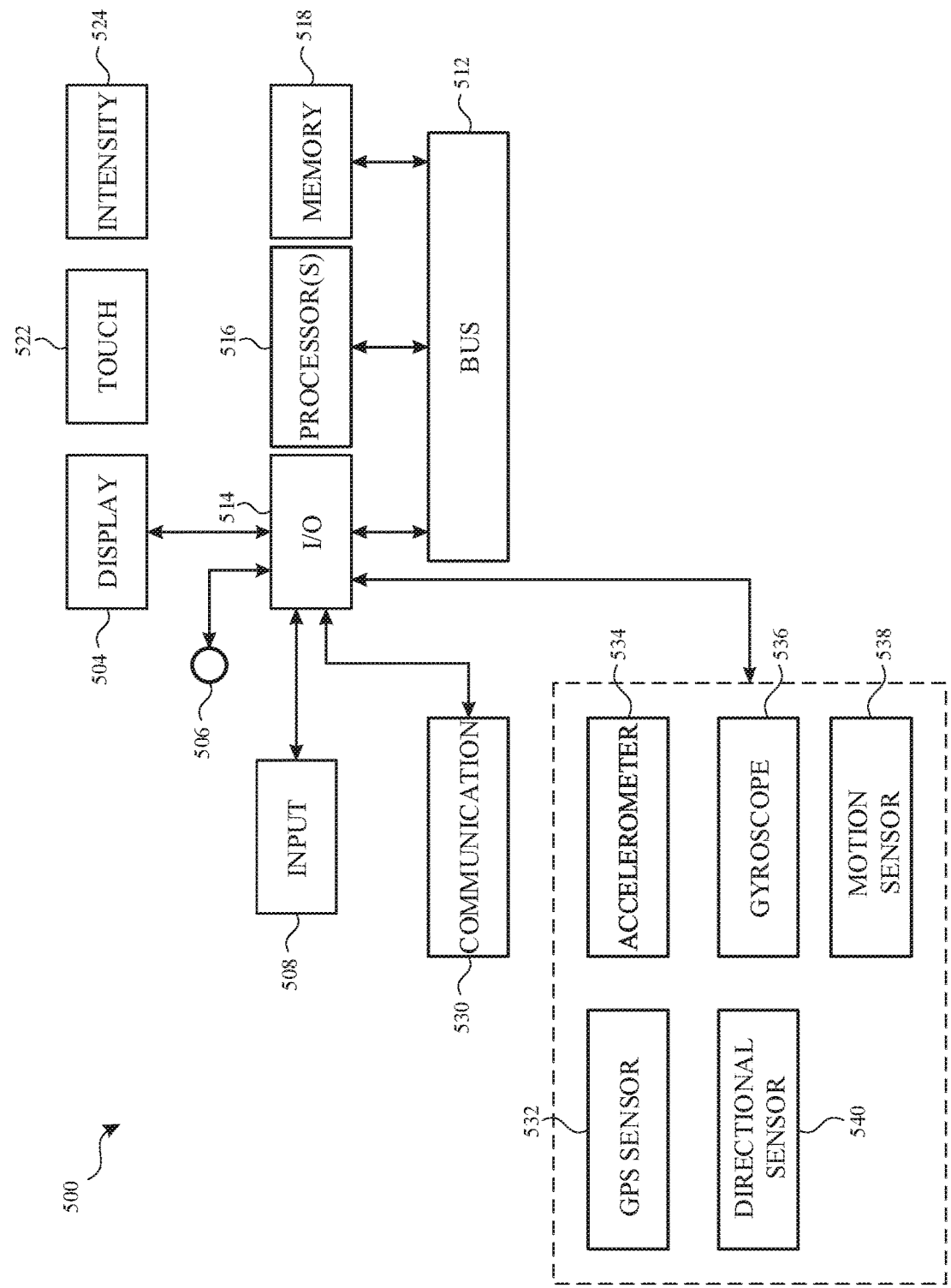
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5C:
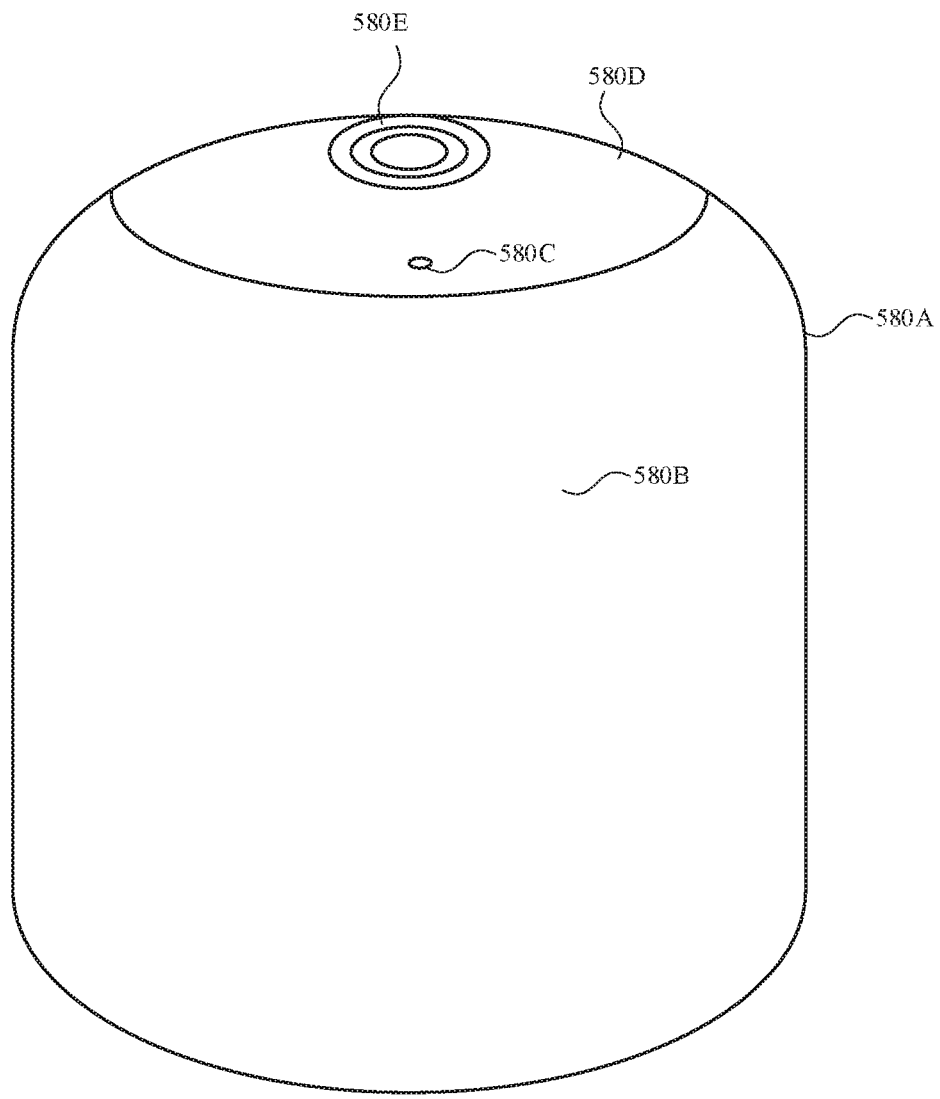
FIG. 5C illustrates an electronic device in accordance with some embodiments.

FIG. 5C illustrates exemplary electronic device 580. Device 580 includes body 580A. In some embodiments, device 580 can include some or all of the features described with respect to devices 100, 300, and 500 (e.g., FIGS. 1A-5B). In some embodiments, device 580 has one or more speakers 580B (concealed in body 580A), one or more microphones 580C, one or more touch-sensitive surfaces 580D, and one or more displays 580E. Alternatively, or in addition to a display and touch-sensitive surface 580D, the device has a touch-sensitive display (also referred to as a touchscreen). As with devices 100, 300, and 500, in some embodiments, touch-sensitive surface 580D (or the touch screen) optionally includes one or more intensity sensors for detecting intensity of contacts (e.g., touches) being applied. The one or more intensity sensors of touch-sensitive surface 580D (or the touchscreen) can provide output data that represents the intensity of touches. The user interface of device 580 can respond to touches based on their intensity, meaning that touches of different intensities can invoke different user interface operations on device 580. In some embodiments, the one or more displays 580E are one or more light-emitting diodes (LEDs). For example, a display can be a single LED, an LED cluster (e.g., a red, a green, and a blue LED), a plurality of discrete LEDs, a plurality of discrete LED clusters, or other arrangement of one or more LEDs. For example, the display 580E can be an array of nine discrete LED clusters arranged in a circular shape (e.g., a ring). In some examples, the one or more displays are comprised of one or more of another type of light-emitting elements.

Figure 5D:
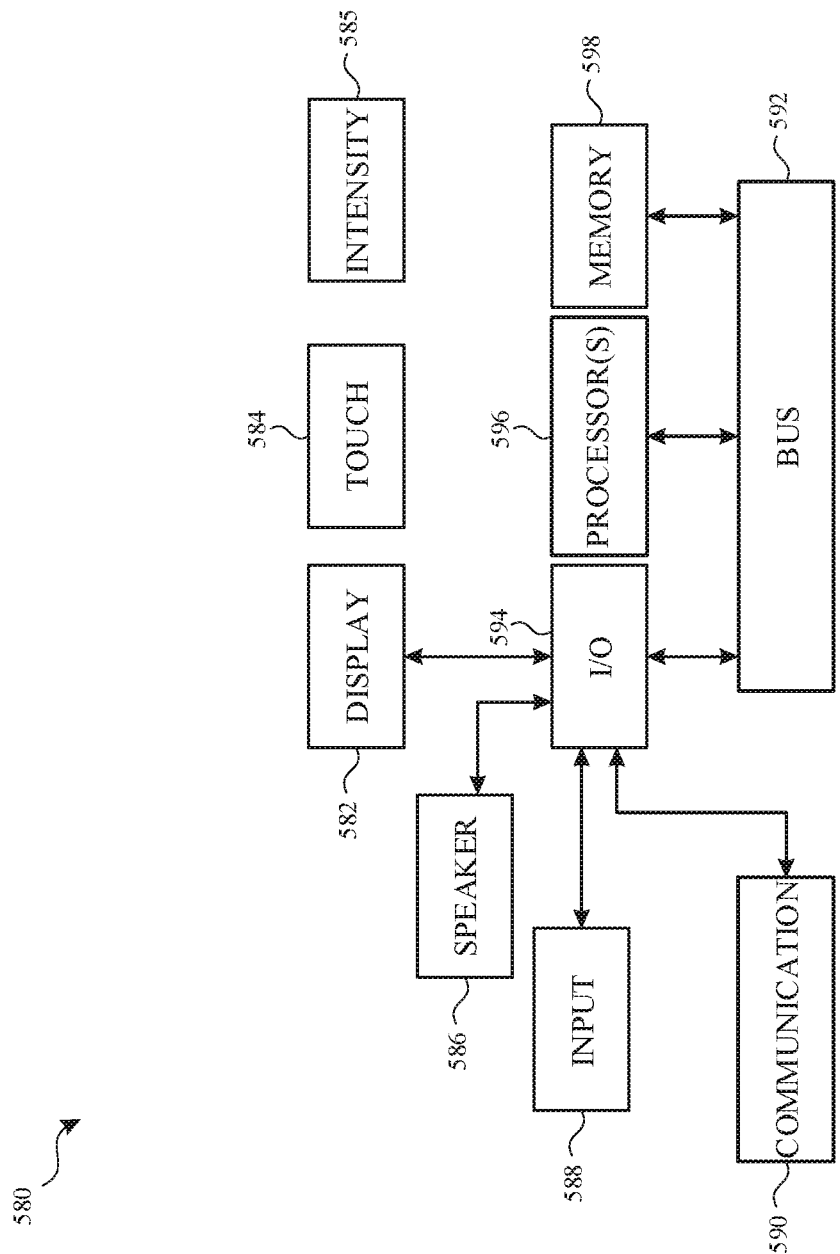
FIG. 5D is a block diagram illustrating an electronic device in accordance with some embodiments.

FIG. 5D depicts exemplary personal electronic device 580. In some embodiments, device 580 can include some or all of the components described with respect to FIGS. 1A, 1B, 3, and 5A-5B. Device 580 has bus 592 that operatively couples I/O section 594 with one or more computer processors 596 and memory 598. I/O section 594 can be connected to display 582, which can have touch-sensitive component 584 and, optionally, intensity sensor 585 (e.g., contact intensity sensor). In some embodiments, touch-sensitive component 584 is a separate component than display 582. In addition, I/O section 594 can be connected with communication unit 590 for receiving application and operating system data, using Wi-Fi, Bluetooth, near field communication (NFC), cellular, and/or other wireless communication techniques. Device 580 can include input mechanisms 588. Input mechanism 588 is, optionally, a button, in some examples. Input mechanism 588 is, optionally, a microphone, in some examples. Input mechanism 588 is, optionally, a plurality of microphones (e.g., a microphone array).

Electronic device 580 includes one or more speakers 586 for outputting audio. Device 580 can include audio circuitry (e.g., in I/O section 594) that receives audio data, converts the audio data to an electrical signal, and transmits the electrical signal to speaker 586. Speaker 586 converts the electrical signal to human-audible sound waves. The audio circuitry (e.g., in I/O section 594) also receives electrical signals converted by a microphone (e.g., input mechanism 588) from sound waves. The audio circuitry (e.g., in I/O section 594) converts the electrical signal to audio data. Audio data is, optionally, retrieved from and/or transmitted to memory 598 and/or RF circuitry (e.g., in communication unit 590) by I/O section 594.

Memory 598 of personal electronic device 580 can include one or more non-transitory computer-readable storage mediums, for storing computer-executable instructions, which, when executed by one or more computer processors 596, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 580 is not limited to the components and configuration of FIG. 5D, but can include other or additional components in multiple configurations.

Attention is now directed towards embodiments of user interfaces ("UI") and associated processes that are implemented on an electronic device, such as portable multifunction device 100, device 300, or device 500.

FIGS. 6A-6O illustrate exemplary user interfaces and techniques for outputting multiple-event audio notifications, in accordance with some embodiments. The user interfaces in these figures are used to illustrate the processes described below, including the processes in FIGS. 7A-7B.

FIGS. 6A-6B illustrate an exemplary technique for causing an electronic device to set a time-based notification. In some embodiments, device 600 includes one or more features of devices 100, 300, 500, or 580. In FIGS. 6A-6N, a device status box 601 indicates a status of the state of electronic device 600 and is provided as a visual indication of a status of any time-based indicators that are set (e.g., in memory of device 600) in the respective example scenario depicted in each respective figure. Device status box 601 is provided merely as a visual aid for ease of the reader's understanding, and is not necessarily displayed by a device (e.g., 600). Additionally, unless otherwise noted in a figure or herein, device status box 601 indicates the status of device 600 after any voice input (which can also referred to as a "command", "voice input command", or "voice command") and any audio output depicted in the respective figure.

Turning to FIG. 6A, as noted in device status box 601, no time-based notifications are set (e.g., in memory of device 600) before voice input 604. That is, in FIG. 6A, status box 601 identifies that no time-based notifications are set ("NONE") before the device 600 receives voice input command 604.

In some embodiments, an electronic device (e.g., 600) receives information (e.g., 604) representing a time-based notification condition. In some embodiments, the information is received as a voice input (e.g., 604). For example, as illustrated in FIG. 6A, device 600 detects (e.g., via one or more microphones) exemplary voice input 604 provided by user 602 that includes information representing a time-based notification condition. In this example, the time-based notification condition is ten minutes elapsing (e.g., a timer of length ten minutes).

In some embodiments, the information representing the time-based notification condition is part of a request to create a time-based notification. For example, voice input 604 includes the phrase: "HEY SIRI, SET A TIMER FOR TEN MINUTES". Thus, voice input 604 includes the following information: a timer should be set (an exemplary request to set a timer type of time-based notification), the timer having a length of ten minutes (an exemplary time-based notification condition).

In some embodiments, voice input (e.g., that includes information about a time-based notification condition) includes information other than (e.g., in addition to) a time-based notification condition. In some embodiments, a voice input includes a trigger phrase. For example, as shown in FIG. 6A, voice input 604 includes the exemplary trigger phrase "HEY SIRI". In some embodiments, an electronic device (e.g., 600) listens for the trigger phrase and, once the trigger phrase is detected, begins transcribing and parsing the voice input that follows the trigger phrase. The trigger phrase "HEY SIRI" is used here merely as an example, and any other trigger phrase (or none) can be used when detecting voice input. In some embodiments, the electronic device listens for voice input in response to a non-voice input (e.g., a touch input). For example, a touch gesture on an affordance or a touch-sensitive surface (e.g., 580D) of electronic device 600 can cause the device to begin listening for voice input (e.g., and transcribing and parsing such voice input). In some embodiments, the electronic device transcribes and parses voice input to determine information. For example, as shown in FIG. 6A, the device 600 transcribes and parses the phrase "HEY SIRI, SET A TIMER FOR TEN MINUTES" to determine that the trigger phrase was detected ("HEY SIRI"), that a timer should be set ("SET A TIMER"), and that a notification condition for the timer will be occurrence of ten minutes elapsing ("FOR TEN MINUTES").

FIG. 6B illustrates an exemplary response to receiving information representing a time-based notification condition. In some embodiments, the electronic device (e.g., 600) sets a first time-based notification based on the received information representing the time-based notification condition. For example, in response to detecting voice input 604, electronic device 600 sets a timer having a notification condition that occurs when ten minutes have passed. As shown in FIG. 6B, in response to voice input 604, electronic device 600 has set TIMER 1 named "TEN MINUTE", as indicated by device status box 601 in FIG. 6B. Device status box 601 in FIG. 6B also indicates the time remaining on the timer named "TEN MINUTE", which is 9:59 (nine minutes and fifty-nine seconds). In this example, one second has elapsed since creation of the "TEN MINUTE" timer, which had an original duration of ten minutes. In some embodiments, setting a time-based notification includes invoking a software routine, software subroutine, software program, software application, and/or hardware to begin monitoring for occurrence of the time-based notification condition of the time-based notification. For example, electronic device 600 begins a timer (for ten minutes) that creates an event or flag in software upon occurrence of ten minutes passing.

In some embodiments, the electronic device (e.g., 600) causes output of an acknowledgement (e.g., audio output 606) of voice input (e.g., 604). In some embodiments, the electronic device outputs the acknowledgement in response to a command (e.g., "SET A TIMER") detected in received voice input. For example, as shown in FIG. 6B, in response to detecting voice input 604 (FIG. 6A), device 600 outputs audio output 606, which is an acknowledgement of voice input 604 and indicates that the electronic device 600 set a ten minute timer.

In some embodiments, information representing a time-based notification condition and/or a request to set a time-based notification are received from a second device that is connected to the electronic device (e.g., 600). For example, a user can use a companion device (e.g., a device, other than device 600, that includes one or more features of devices 100, 300, 500, or 580) to send data to the electronic device 600 (e.g., the data including the information regarding the time-based notification condition and that causes the notification to be set). For example, the companion device can communicate with electronic device 600 via a Wi-Fi connection, a Bluetooth connection, or other suitable communication link.

FIGS. 6C-6D illustrate an exemplary technique for outputting an audio notification for a single time-based notification. FIG. 6C depicts the electronic device 600 just before TIMER 1 named "TEN MINUTE" (e.g., set as shown in FIGS. 6A-6B) expires. As shown in status box 601, the timer (TIMER 1) named "TEN MINUTE" has 0:01 remaining (zero minutes and one second), and there is no other time-based notification (e.g., timer, alarm) currently set.

FIG. 6D depicts the electronic device 600 just after TIMER 1 named "TEN MINUTE" (e.g., set as shown in FIGS. 6A-6B) expires. In some embodiments, in response to a determination that a time-based notification condition has occurred, the electronic device (e.g., 600) causes output of an audio notification. As shown in status box 601, the timer (TIMER 1) named "TEN MINUTE" has 0:00 remaining (no time remaining), and there is no other time-based notification (e.g., timer, alarm) currently set and that has expired but has not been dismissed. In some embodiments, in accordance with a determination that the electronic device is not currently causing output of an audio notification (e.g., for any time-based notification) when the time-based notification condition occurs, the electronic device causes output of a first audio notification. For example, when a timer's determined length of time expires (e.g., ten minutes have elapsed from the TEN MINUTE timer), the time-based notification's notification condition occurs (which can also be referred to as the timer "going off"). As a result, the electronic device outputs (e.g., via an audio output device of the device) and/or causes output of (e.g., by an external audio output device, such as a speaker (e.g., 586), via a connection (e.g., via communication unit 590)) an audio notification. The audio notification acts as an alert (e.g., to a user) that the notification condition has occurred. As shown in FIG. 6D, device 600 is outputting audio output 608, which includes output of an exemplary audio notification referred to as "AUDIO NOTIFICATION 1".

In this example, audio output 608 is provided as an illustration of the audio notification that is output in the scenario depicted, and is not intended to preclude the output of an audio identifier (e.g., a name) for a time-based notification in the given exemplary scenario. For example, audio output 608 can represent a simplified representation of audio output 622 (FIG. 6K) or audio output 624 (FIG. 6L). Techniques for determining whether to output an audio identifier are discussed in greater detail below.

In some embodiments, an audio notification is a media entity played back by an electronic device (e.g., 600). For example, an audio notification can be a media entity (e.g., a sound file) that lasts for some length of time (e.g., a beginning time and an end time). The media entity can be played back once, or repeated one or more times (e.g., if it has a short length of time). A media entity, for example, can include one or more audio tones (e.g., an ascending scale of notes, a descending scale of notes, a song, or the like).

In some embodiments, a first audio notification is a single-event audio notification. For example, electronic device 600 plays a single-event audio notification when there is only one time-based notification condition that has occurred that has not been dismissed (e.g., by user action, or by timing out after some amount of time, or other dismissal event). For example, "AUDIO NOTIFICATION 1" is an exemplary single-event audio notification.

In some embodiments, the electronic device is capable of setting a first type of time-based notification and a second type of time-based notification. For example, a first type can be a timer type of notification and a second type can be an alarm type of notification. In another example, the first type is alarm and the second type is timers. In some embodiments, a single-event audio notification is a single-event audio notification for a first type of time-based notification. When a single time-based notification has expired and is a first type of time-based notification, the audio notification output is a single-event audio notification for the first type. In some embodiments, a single-event audio notification is a single-event audio notification for a second type of time-based notification. When a single time-based notification has expired and is a second type of time-based notification, the audio notification output is a single-event audio notification for the second type. In some embodiments, the single-event audio notification for the first type and the single-event audio notification for the second type are different. For example, they can be different media entities that sound different when played back, thus providing an indication of the type of time-based notification going off.

FIGS. 6E-6H illustrate an exemplary technique for outputting an audio notification for multiple time-based notifications. In some embodiments, the electronic device sets a first time-based notification and a second time-based notification. For example, as shown in status box 601 in FIG. 6E, an exemplary first time-based notification is already set: TIMER 1 (named "TEN MINUTE"), created as shown in FIGS. 6A-6B, that has 7:59 (seven minutes and fifty-nine seconds) remaining before the command in voice input 610 is received (as indicated in status box 601). Additionally, in FIG. 6E, electronic device detects voice input 610 (uttered by user 602), representing a request to create a second time-based notification (e.g., a timer) that includes a second time-based notification condition (e.g., five-minute length of time).

Turning to FIG. 6F, in response to receiving voice input 610, electronic device sets a second time-based notification based on the second time-based notification condition. As shown in FIG. 6F, status box 601 now indicates that an exemplary second-time based notification TIMER 2 (named "FIVE MINUTE") is set on electronic device 600, and has 4:59 (four minutes and fifty-nine seconds) remaining. Additionally, in FIG. 6F, four seconds have elapsed from TIMER 1 since before voice input 610 was detected in FIG. 6E-in FIG. 6F, TIMER 1 is now has 7:55 (seven minutes and fifty-five seconds) remaining. In some embodiments, the electronic device (e.g., 600) causes output of an audio acknowledgement of audio input. For example, in FIG. 6F, electronic device 600 outputs (e.g., text-to-speech dictation output) acknowledgement 612 which states "FIFTEEN MINUTE TIMER, STARTING NOW" and acknowledges that a second timer (TIMER 2) has been set and is starting.

It should be appreciated that the exact moment that the timer begins is not necessarily tied to the timing of the text-to-speech output (e.g., acknowledgement 612) of an electronic device (e.g., 600). For example, an acknowledgement (e.g., 612) can be provided as merely a general indication to a user (e.g., 602) that a timer has just been started. Thus, for instance, TIMER 2 can be started after voice input 610 but before acknowledgement 612 is output, during output of acknowledgement 612, or after output of acknowledgement 612.

Notably, as described herein, the time remaining on a timer represents the time remaining until expiration of a timer (e.g., a length of time that counts down). However, a timer can also be represented (e.g., implemented in a program) as an amount of time that counts up to a goal value. Either are intended to be within the scope of this disclosure with respect to the term "timer".

In some embodiments, the electronic device (e.g., 600) receives a request for a status of a time-based notification. For example, device 600 receives voice input "HEY SIRI, HOW MUCH TIME IS LEFT ON MY TEN MINUTE TIMER?" in the scenario depicted in FIG. 6F. As shown in FIG. 6F, the TEN MINUTE timer has 7:55 (seven minutes and fifty-five seconds) remaining. In some embodiments, in response to receiving a request for a status of a time-based notification, the electronic device (e.g., 600) provides a status of the corresponding time-based notification. In some embodiments, the status includes an amount of time remaining until the corresponding time-based notification condition occurs. For example, in response to the voice input, device 600 outputs "THERE ARE SEVEN MINUTES AND FIFTY-FIVE SECONDS REMAINING ON YOUR TEN MINUTE TIMER". In some embodiments, the status includes information about the corresponding time-based notification condition. For example, device 600 receives voice input "WHAT TIME IS MY WAKE UP ALARM SET FOR?" and responds with the output "YOUR WAKE UP ALARM IS SET FOR SEVEN FIFTEEN A.M.".

In some embodiments, the electronic device (e.g., 600) receives a request to change a time-based notification condition for an active time-based notification. For example, with reference to the scenario depicted in FIG. 6F, device 600 can receive voice input "HEY SIRI, CHANGE MY TEN MINUTE TIMER TO A TWENTY MINUTE TIMER". As shown in FIG. 6F, the TEN MINUTE timer has 7:55 (seven minutes and fifty-five seconds) remaining. In some embodiments, in response to receiving a request for a status of a time-based notification, the electronic device (e.g., 600) changes the corresponding time-based notification condition based on the request. For example, the TEN MINUTE timer can be extended to have 17:55 (seventeen minutes and fifty-five seconds) remaining (e.g., the difference between original length and the new length added to the currently running timer). A timer can be shortened, such as by "HEY SIRI, CHANGE MY TEN MINUTE TIMER TO A FOUR MINUTE TIMER"-thus, the TEN MINUTE timer can be shorted to have 1:55 (one minute and fifty-five seconds) remaining (e.g., the difference between original length and the new length removed from the currently running timer). In some embodiments, in response to receiving a request for a status of a time-based notification, the electronic device (e.g., 600) changes the name of the time-based notification based on the change to the corresponding time-based notification condition. For example, a ten minute timer being extended to twenty minutes as described above causes renaming from TEN MINUTE to TWENTY MINUTE, or being shortened as described above causes renaming from TEN MINUTE to FOUR MINUTE. In some embodiments, the time-based notification is only renamed if the name of the time-based notification was not set by user input. For example if the timer being extended or shortened was named DINNER by the user, then the name DINNER would not be changed based on the change to the corresponding time-based notification condition.

FIGS. 6G-6H illustrate an exemplary technique for outputting an audio notification for multiple time-based notifications. FIG. 6G depicts the electronic device 600 just before TIMER 1 named "TEN MINUTE" (e.g., set as shown in FIGS. 6A-6B) expires. As shown in status box 601 of FIG. 6G, the timer (TIMER 1) named "TEN MINUTE" has 0:01 (zero minutes and one second) remaining. Thus, FIG. 6G illustrates a similar scenario as that shown in FIG. 6C. However, in FIG. 6G, status box 601 also indicates that electronic device 600 has a second-time based notification currently set, TIMER 2 (named "FIVE MINUTE") with 0:00 (no time) remaining. Accordingly, because the second time-based notification condition has occurred (five minutes elapsed) for the second time-based notification ("FIVE MINUTE" timer), and because only a single notification is currently causing audio output (e.g., only the FIVE MINUTE timer is going off), electronic device outputs the exemplary single-event audio notification "AUDIO NOTIFICATION 1" as discussed above.

In this example, audio output 614 is provided as an illustration of the audio notification that is output in the scenario depicted, and is not intended to preclude the output of an audio identifier (e.g., a name) for a time-based notification in the given exemplary scenario. For example, audio output 608 can represent a simplified representation of audio output 622 (FIG. 6K) or audio output 624 (FIG. 6L). Techniques for determining whether to output an audio identifier are discussed in greater detail below.

Turning to FIG. 6H, an exemplary technique for causing output of a multiple-event notification is illustrated. For example, FIG. 6H illustrates an exemplary scenario in which multiple time-based notifications have expired and have not been dismissed. In some embodiments, in accordance with a determination that the electronic device (e.g., 600) is currently causing output of the audio notification based on at least one (e.g., TIMER 2) other time-based notification (e.g., other than TIMER 1), the electronic device causes output of a second audio notification (e.g., AUDIO NOTIFICATION 2 in audio output 616) different from the first audio notification (e.g., AUDIO NOTIFICATION 1 in audio output 614 of FIG. 6G). For example, the electronic device 600 determines that AUDIO NOTIFICATION 1 is currently being output when the notification condition for TIMER 1 occurs, and thus causes output of AUDIO NOTIFICATION 2 as shown in audio output 616 of FIG. 6H.

In this example, audio output 616 is provided as an illustration of the audio notification that is output in the scenario depicted, and is not intended to preclude the output of an audio identifier (e.g., a name) for a time-based notification in the given exemplary scenario. For example, audio output 608 can represent a simplified representation of audio output 622 (FIG. 6K) or audio output 624 (FIG. 6L). Techniques for determining whether to output an audio identifier are discussed in greater detail below.

In some embodiments, the second audio notification (e.g., AUDIO NOTIFICATION 2) is a multiple-event audio notification. For example, status box 601 in FIG. 6H indicates that both TIMER 1 and TIMER 2 have expired and have not been dismissed. In the example in FIG. 6H, electronic device 600 outputs exemplary multiple-event audio notification named AUDIO NOTIFICATION 2 when both the TEN MINUTE timer and the FIVE MINUTE timer are going off concurrently.

In the situation where two or more time-based notifications have expired, it can be useful to provide a multiple-event audio notification that is distinguishable from a single-event audio notification. By providing a multiple-event audio notification that is distinguishable from a single-event audio notification, a listener (e.g., user 602) can easily determine that multiple time-based notifications are concurrently going off (e.g., their notification conditions have occurred and the notifications have not been dismissed). Thus, for example, when a single timer expires and is causing an audio notification to be output, and then a second timer expires, the user can easily determine that the second timer has expired based on a change in the audio notification that the electronic device outputs (e.g., a change in audio output from a single-event audio notification to a multiple-event audio notification). For example, a user can set multiple timers, each serving as a reminder to the user that they need to perform a respective task (e.g., remove a first item of food from the oven for a first timer, and check on a second item of food for a second timer)—thus, providing an indication that distinguishes when multiple timers are concurrently going off provides the user with additional and useful information about the state of the device.

In some embodiments, a multiple-event audio notification that is output depends on the number of time-based notifications that are concurrently going off. For example, there can be an audio notification for two time-based notifications, another audio notification for three time-based notifications, and so on.

In some embodiments, the electronic device (e.g., 600) ceases output of a first audio notification in accordance with a determination that causes output of a second audio notification. For example, in FIG. 6H, device 600 has ceased to output AUDIO NOTIFICATION 1 (as was output in FIG. 6G) and has begun to output AUDIO NOTIFICATION 2.

In some embodiments, the second audio notification cuts off the first audio notification. For example, an audio notification can be a media entity (e.g., a sound file) that lasts for some length of time (e.g., a playback time, such as three seconds) as described above. If the second audio notification cuts off the first audio notification, the first audio notification stops playing abruptly (e.g., in the middle of the length of time, immediately in response to a multiple-event condition occurring) and the second audio notification begins playing (e.g., upon the first audio notification ceasing to be output). Thus, in FIG. 6H, AUDIO NOTIFICATION 1 stops being output in response to TIMER 1 expiring and AUDIO NOTIFICATION 2 begins being output.

As used herein, a "multiple-event condition" occurring includes a situation in which a second time-based notification condition has occurred while a first time-based notification is going off and has not been dismissed. A multiple-event condition occurring includes a situation in which two or more time-based notification conditions have occurred and have not been dismissed. As used herein, a "single-event condition" occurring includes a situation in which a first time-based notification condition has occurred while no other time-based notification is going off.

In some embodiments, the first audio notification is output until the end of its length of time (e.g., the full three seconds of playback) before device begins causing output of the second audio notification. For example, in FIG. 6G, AUDIO NOTIFICATION 1 can be allowed to finish playback (e.g., until its end time) before device 600 begins outputting AUDIO NOTIFICATION 2 as shown in FIG. 6H. In some examples, had the second time-based notification condition not occurred, the device repeatedly plays back (loops) the first audio notification until dismissed.

In some embodiments, a multiple-event audio notification adds onto an existing single-event audio notification. For example, AUDIO NOTIFICATION 2 can be a second media entity that includes the audio tones of AUDIO NOTIFICATION 1 (a first media entity), but include additional tones (e.g., when playback of AUDIO NOTIFICATION 1 normally ends), thus sounding like AUDIO NOTIFICATION 1 has been extended or augmented. In this way, a transition from a single-event audio notification to a multiple-event audio notification is easily perceived due to the apparent change to the single-event audio notification (e.g., change to a familiar sound that is already playing can be perceived by the user).

In some embodiments, the first audio notification and the second audio notification are different, and the electronic device outputs both during a multiple-event condition. For example, the first audio notification is output during a single-event condition (e.g., TIMER 2 expiring in FIG. 6G) and upon occurrence of a multiple-event condition (e.g., TIMER 1 expiring in FIG. 6H while TIMER 2 has not been dismissed), the electronic device 600 additionally causes output of the second audio notification. For example, the first audio notification and the second audio notification can be concurrently output (e.g., layered, played back at the same time) or sequentially output (e.g., one followed by the other), or the like. By causing playback of two or more audio notifications, the electronic device indicates to a user that a multiple-event condition exists (e.g., is distinguishable from only one of the audio notifications being output).

In some embodiments, a time-based notification is a timer type of notification. In some embodiments, a timer type of notification includes a notification condition that occurs when a determined length of time lapses (also referred to as a timer expiring). For example, a timer type of notification causes output of a notification (e.g., audio notification) at a particular length of time after it begins, such as thirty seconds, five minutes, ten minutes, two hours, or the like. In some embodiments, a timer can be paused (e.g., via user input). For example, if a timer is paused, the length of time ceases to progress (e.g., count down) until the timer is restarted (unpaused).

In some embodiments, a time-based notification is an alarm type of notification. In some embodiments, an alarm type of notification includes a notification condition that occurs upon reaching a particular time of day (also referred to as an alarm expiring). In some embodiments, the time of day is on a particular date. For example, an alarm type of notification causes output of a notification (e.g., audio notification) at a particular time (e.g., in the future), such as 4:32 pm, 8:15 pm, 7:30 am, or the like. An alarm can be created in the same way as a timer type of notification, as described above. For example, electronic device 600 can detect the voice input "HEY SIRI, SET AN ALARM FOR 6:32 PM" and, in response, set an alarm based on the notification condition 6:32 pm (e.g., occurrence of that time). In this example, once the time 6:32 pm arrives (e.g., the next time a clock of the device reaches that time), the device causes output of an audio notification (e.g., a single-event or a multi-event notification). Thus, if the time was 5:00 pm when the alarm was created, the alarm would cause an audio notification to be output approximately one hour and thirty-two minutes after being created. Further, the notification condition of an alarm can be a particular day or days (e.g., daily, weekdays). Thus, if the electronic device detects the voice input "HEY SIRI, SET AN ALARM FOR 6:32 PM ON WEDNESDAY" at 5:00 pm on a Monday, Sep. 21, 2020, the electronic device would wait until 6:32 pm on the next Wednesday (Sep. 23, 2020) (e.g., forty-nine hours and thirty-two minutes) until outputting the audio notification due to the occurrence of the condition.

FIGS. 6I-6J illustrate exemplary interfaces for dismissing one or more time-based notifications. FIG. 6I illustrates electronic device outputting exemplary audio output 618 (which includes AUDIO NOTIFICATION 2) due to the existence of a multiple-event condition—the expiration of two timers, TIMER 1 and TIMER 2, similar to the scenario shown in FIG. 6H. In some embodiments, the electronic device (e.g., 600) receives input (e.g., voice input 620) representing a request to cease output of an audio notification. For example, in FIG. 6I, electronic device 600 detects voice input 620 that includes the words "HEY SIRI, STOP".

In this example, audio output 618 is provided as an illustration of the audio notification that is output in the scenario depicted, and is not intended to preclude the output of an audio identifier (e.g., a name) for a time-based notification in the given exemplary scenario. For example, audio output 608 can represent a simplified representation of audio output 622 (FIG. 6K) or audio output 624 (FIG. 6L). Techniques for determining whether to output an audio identifier are discussed in greater detail below.

In some embodiments, in response to receiving input (e.g., 620) representing a request to cease output of an audio notification, the electronic device (e.g., 600) ceases to output an audio notification (e.g., audio output 618 that includes AUDIO NOTIFICATION 2). For example, in FIG. 6J, the electronic device 600 has ceased output of audio output 618 (including AUDIO NOTIFICATION 2). As shown, device 600 is no longer causing output of any audio notification (e.g., is silent). In some embodiments, in response to receiving input (e.g., 620) representing a request to cease output of an audio notification, the electronic device (e.g., 600) dismisses one or more time-based notifications whose corresponding notification conditions have occurred (e.g., and that have not yet been dismissed). For example, as shown in status box 601 of FIG. 6J, both TIMER 1 and TIMER 2 have been dismissed as they are no longer depicted, standing in contrast to status box 601 of FIG. 6I when both TIMER 1 and TIMER 2 were expired (e.g., had no time remaining on each timer) but not dismissed.

In some embodiments, the occurrence of a second time-based notification causes a single-event audio notification to be replaced by a multiple-event audio notification. For example, in FIGS. 6G-6H, device 600 is outputting AUDIO NOTIFICATION 1 because TIMER 2 has expired, and then begins output of AUDIO NOTIFICATION 2 upon TIMER 1 expiring. In some embodiments, in response to a request to cease output of an audio notification, the electronic device (e.g., 600) ceases output of the current audio notification and does not resume output of another audio notification (e.g., because the device dismisses all expired time-based notifications). For example, after changing from AUDIO NOTIFICATION 1 (an exemplary single-event audio notification) to AUDIO NOTIFICATION 2 (an exemplary multiple-event audio notification) in FIGS. 6G-6H, electronic device 600 does not resume output of AUDIO NOTIFICATION 1 in response to receiving input 620 in FIG. 6I. Rather, as shown in FIG. 6J, the device dismisses both time-based notifications and does not revert to a single-event notification scenario.

In some embodiments, the input representing a request to cease output of an audio notification is a touch input. For example, device 600 receives an input via touch-sensitive surface (e.g., 580D). For example, while outputting an audio notification, a detected touch gesture (e.g., a tap, a tap and hold) on a touch-sensitive surface of device 600 can represent the request to cease output of an audio notification, as described above.

In some embodiments, in response to a request to cease output of an audio notification, the electronic device (e.g., 600) dismisses fewer than all of the time-based notifications that have expired. In some embodiments, the electronic device dismisses one notification per request to cease output of an audio notification. For example, a single tap on touch-sensitive surface of device 600 in the scenario depicted in FIG. 6H (outputting exemplary multiple-event audio notification AUDIO NOTIFICATION 2) can dismiss only one time-based notification that is going off at a time (e.g., sequentially, such as in order of which time-based notification expired first; in this example, TIMER 2). In such case, if TIMER 2 was dismissed in response to a first input, the electronic device would have one remaining time-based notification that has not been dismissed and that has expired (TIMER 1), and thus can begin output of a single-event audio notification (e.g., AUDIO NOTIFICATION 2). A second input (e.g., voice input, touch on touch-sensitive surface) can cause device 600 to then dismiss TIMER 1.

FIGS. 6K-6L illustrate exemplary techniques for causing output of an audio identifier identifying a time-based notification. In some embodiments, the electronic device (e.g., 600) causes output of an audio identifier that identifies a time-based notification. For example, in response to a notification condition for a time-based notification condition occurring, the electronic device can output an audio identifier (e.g., a text-to-speech dictation output of a name or other identifying information) for the corresponding time-based notification. For example, in FIG. 6K, TIMER 1 has the name "TEN MINUTE", and electronic device is outputting audio output 622 which includes the text-to-speech dictation "TEN MINUTE AND FIVE MINUTE TIMERS". Thus, audio output 622 includes the audio identifier "TEN MINUTE" that identifies that the timer named TEN MINUTE is currently going off. In some embodiments, the electronic device (e.g., 600) causes output of audio identifiers that identify a plurality of time-based notifications. For example, audio output 622 also includes the audio identifier "FIVE MINUTE" that identifies that the timer named FIVE MINUTE is currently going off, in addition to identifying that the timer named TEN MINUTE is going off.

In some embodiments, the electronic device (e.g., 600) outputs an audio notification (e.g., one or more) and an audio identifier (e.g., one or more) in a predetermined pattern. For example, as shown in FIG. 6K, an audio notification (AUDIO NOTIFICATION 2) is output twice, followed by output of audio identifiers ("TEN MINUTE AND FIVE MINUTE TIMERS"). Thus, in this example, the predetermined pattern is two repetitions of an audio notification (AUDIO NOTIFICATION 2) followed by a single output of audio identifiers ("TEN MINUTE AND FIVE MINUTE TIMERS").

In some embodiments, the predetermined pattern repeats until the notification(s) is/are dismissed. In this example, the pattern repeats—as shown in audio output 622, the audio notification "AUDIO NOTIFICATION 2" is output another two times after the audio identifiers (e.g., which will be followed by output of the audio identifiers "TEN MINUTE AND FIVE MINUTE TIMERS"), and so on.

In some embodiments, the predetermined pattern changes after the electronic device outputs the pattern one or more times without the notification(s) being dismissed. For example, as shown in FIG. 6L, the predetermined pattern has changed to four repetitions of an audio notification (AUDIO NOTIFICATION 2) followed by the output of audio identifiers ("TEN MINUTE AND FIVE MINUTE TIMERS"), as indicated by audio output 624. Thus, the time between output of the audio identifiers has increased (e.g., from two to four repetitions of the audio notification). In this example, the predetermined pattern changed after being output twice. In some embodiments, the predetermined pattern changes two or more times. For example, after another number (e.g., two, or some other number) of repetitions of the modified pattern, the predetermined pattern can change again to eight repetitions of an audio notification (e.g., AUDIO NOTIFICATION 2) followed by the output of audio identifiers (e.g., "TEN MINUTE AND FIVE MINUTE TIMERS"), and then to sixteen, and so on.

Figure 6M:
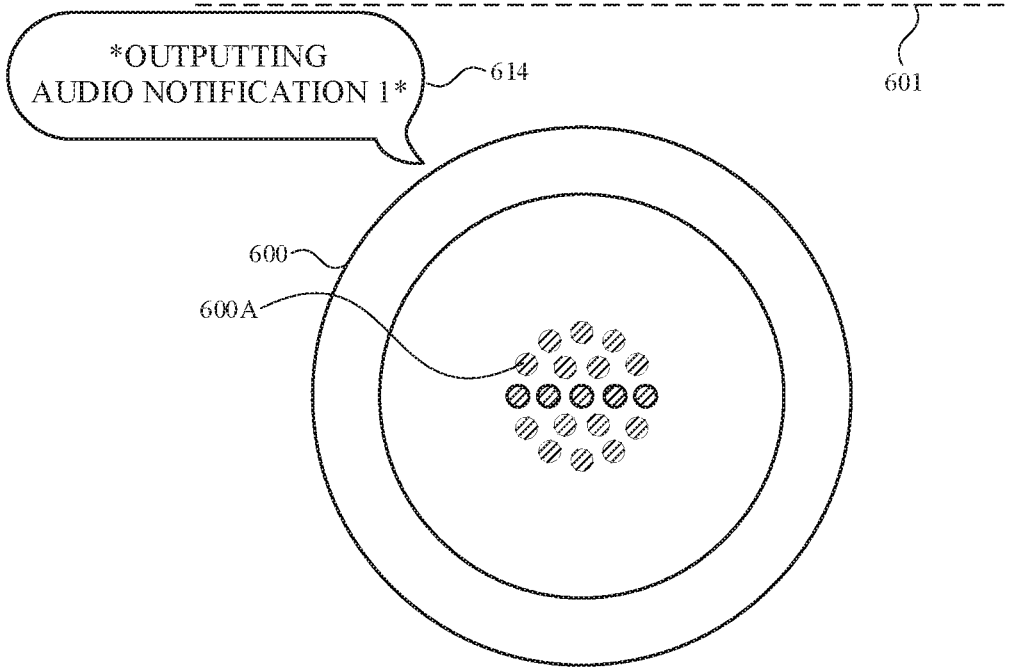
Figure 6N:
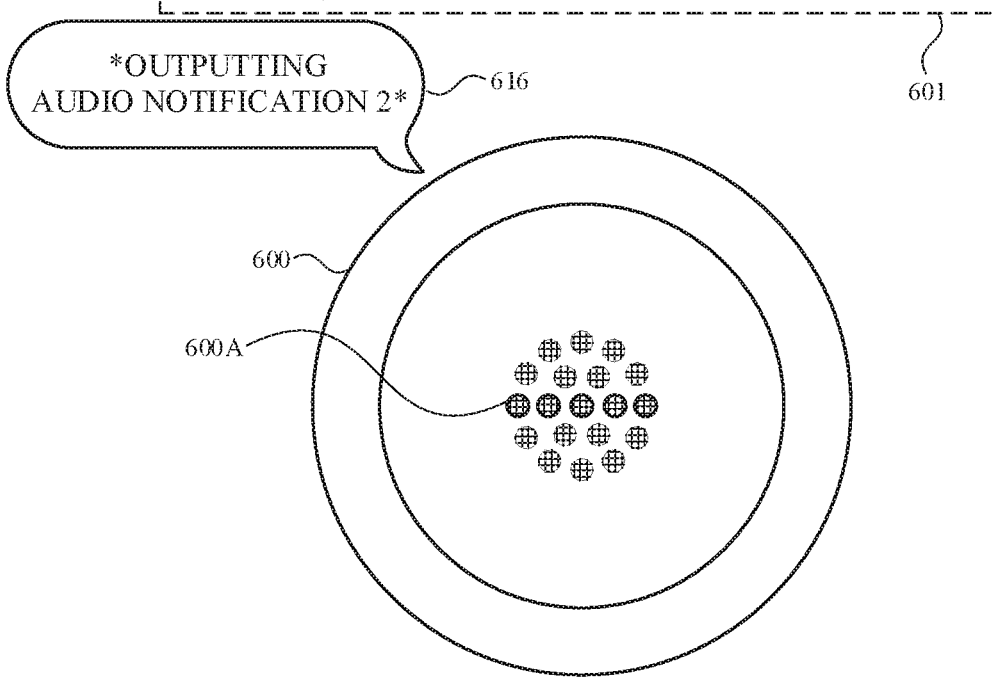

FIGS. 6M-6N illustrate exemplary interfaces for providing a visual indication of a single-event and a multiple-event condition. In some embodiments, the electronic device provides a visual indication that a single-event condition exists. In some embodiments, the visual indication is provided using one or more light emitting devices (e.g., 580E) (e.g., a light-emitting diode, a display screen). For example, in FIG. 6M, indicator 600A (a plurality of LEDs) are shown outputting light in a first color (e.g., indicated visually in FIG. 6M by the pattern in each LED) concurrently with outputting AUDIO NOTIFICATION 1, an exemplary single-event audio notification. As shown in FIG. 6M, status box 601 illustrates that TIMER 2 has expired, but TIMER 1 still has 0:01 (one second) remaining.

In some embodiments, the electronic device provides a visual indication that a multiple-event condition exists. In some embodiments, the visual indication is provided using one or more light emitting devices (e.g., a light-emitting diode, a display screen). For example, in FIG. 6N, indicator 600A (a plurality of LEDs) are shown outputting light in a second color (e.g., indicated visually in FIG. 6N by the pattern in each LED) concurrently with outputting AUDIO NOTIFICATION 2, an exemplary multiple-event audio notification. In this example, the second color of FIG. 6N is different than the first color of FIG. 6M (e.g., depicted as a different pattern in each LED of indicator 600A). Thus, based on the different visual indicators for each event condition, a user could tell that a multiple-event condition exists in contrast to a single-event condition. As shown in FIG. 6N, status box 601 illustrates that both TIMER 1 and TIMER 2 have expired and have not been dismissed. It should be appreciated that other visual indications can be used in addition to or instead of different colors for the single and multiple-event conditions. For example, the device can output (e.g., using indicator 600A) different animated patterns (e.g., swirling, pulsing, and/or sizing based on the number of time-based notifications going off), identifying text and/or numbers, or other visual indications that can be differentiated from one another.

In some embodiments, a multiple-event audio notification is a multiple-event audio notification for a first type of time-based notification. When multiple time-based notifications have expired and are a first type of time-based notification, the audio notification output is a multiple-event audio notification for the first type. In some embodiments, a multiple-event audio notification is a multiple-event audio notification for a second type of time-based notification. When multiple time-based notifications have expired and are a second type of time-based notification, the audio notification output is a multiple-event audio notification for the second type. In some embodiments, the multiple-event audio notification for the first type and the multiple-event audio notification for the second type are different. For example, they can be different media entities that sound different when played back, thus providing an indication of the type of time-based notifications going off.

FIG. 6O illustrates an exemplary technique for determining which type of multiple-event audio notification to output when there are multiple types of multiple-event audio notifications. The rows of table 626 in FIG. 6O respectively illustrate one of three exemplary scenarios where two notifications (NOTIFICATION 1 and NOTIFICATION 2) have expired and have not been dismissed. In some embodiments, the electronic device is capable of setting a first type of time-based notification and a second type of time-based notification. For example, a first type can be a timer type of notification and a second type can be an alarm type of notification. In another example, the first type is alarm and the second type is timer. Accordingly, when at least two notifications of the first type have expired and have not been dismissed, and no notifications of the second type have expired, the electronic device 600 causes output of a multiple-event audio notification for the first type of time-based notification. For example, row 626A in table 626 illustrates that when NOTIFICATION 1 is a first type and a NOTIFICATION 2 is also the first type, the audio notification output is a multiple-event audio notification for the first type. Likewise, when at least two notifications of the second type have expired and have not been dismissed, and no notifications of the first type have expired, the electronic device 600 causes output of a multiple-event audio notification for the second type of time-based notification. For example, row 626C in table 626 illustrates that when NOTIFICATION 1 is a second type and a NOTIFICATION 2 is also the second type, the audio notification output is a multiple-event audio notification for the second type.

In some embodiments, when at least one of the first type and at least one of the second type of time-based notification have expired and have not been dismissed, the electronic device (e.g., 600) causes output of the multiple-event notification for one of the first type or the second type of time-based notifications. For example, the multiple-event audio notification for an alarm type of notification can take priority over the multiple-event audio notification for a timer type of notification. Thus, when at least one alarm has expired and at least one other time-based notification has expired (e.g., alarm or timer), the electronic device 600 causes output of the multiple-event audio notification corresponding to the alarm type of notification. For example, row 626B in table 626 illustrates that when NOTIFICATION 1 is a first type (e.g., a timer) and a NOTIFICATION 2 is the second type (e.g., an alarm), the audio notification output is a multiple-event audio notification for the second type (e.g., an alarm). This is useful, for instance, where one type of time-based notification has priority such that notifying the user that at least one instance of that type of notification is preferable. Thus, an alarm type can be more important than a timer, and thus the multiple-event audio notification for the alarm takes precedent when an alarm is one of at least two notifications going off concurrently.

FIGS. 7A-7B is a flow diagram illustrating a method for outputting multiple-event audio notifications using an electronic device in accordance with some embodiments. Method 700 is performed at a device (e.g., 100, 300, 500, 580). Some operations in method 700 are, optionally, combined, the orders of some operations are, optionally, changed, and some operations are, optionally, omitted.

As described below, method 700 provides an intuitive way for outputting multiple-event audio notifications. The method reduces the cognitive burden on a user for determining whether a multiple-event condition exists, thereby creating a more efficient human-machine interface. For battery-operated computing devices, enabling a user to determine whether a multiple-event condition exists faster and more efficiently conserves power and increases the time between battery charges.

The electronic device (e.g., 600) receives (702) information (e.g., audio input 604) representing a first time-based notification condition (e.g., a timer length or an alarm time). For example, device 600 receives voice input 604 in FIG. 6A, which includes the exemplary first time-based notification condition: a timer length often minutes.

The electronic device (e.g., 600) sets (704) a first time-based notification (e.g., TIMER 1 in FIG. 6B) based on the first time-based notification condition (e.g., length often minutes).

In response to a determination (706) that the first time-based notification condition has occurred (e.g., timer expires, alarm time arrives), and in accordance with a determination that the electronic device (e.g., 600) is not currently causing output (e.g., as shown in FIG. 6C) of an audio notification based on at least one time-based notification other than the first time-based notification (e.g., TIMER 1 in FIG. 6C), the electronic device (e.g., 600) causes (708) output (e.g., via a speaker of the electronic device, or one or more other associated/connected devices/speakers) of a first audio notification (e.g., AUDIO NOTIFICATION 1 in audio output 608 of FIG. 6D) (e.g., a single-event audio notification). For example, the electronic device is not currently outputting an audio notification for another expired time-based notification (e.g., timer or alarm) when the first time-based notification condition occurs.

In response to the determination (706) that the first time-based notification condition has occurred (e.g., timer expires, alarm time arrives), and in accordance with a determination that the electronic device (e.g., 600) is currently causing output (e.g., as shown in FIG. 6G) of the audio notification (e.g., AUDIO NOTIFICATION 1 in FIG. 6G) based on at least one time-based notification (e.g., TIMER 2 in FIG. 6G) other than the first time-based notification (e.g., TIMER 1 in FIG. 6G), the electronic device (e.g., 600) causes (710) output of a second audio notification (e.g., AUDIO NOTIFICATION 2 in FIG. 6H) (e.g., a multiple-event audio notification) different from the first audio notification.

Outputting a second audio notification different from the first audio notification when an electronic device is already causing output of an audio notification provides the user with audio feedback about the number of time-based notification conditions that have occurred. Providing improved audio feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after causing output of the second audio notification (e.g., and dismissal thereof), the electronic device sets a subsequent time-based notification based on the same first time-based notification condition as the first time-based notification. For example, another ten-minute timer is created after TIMER 1 of FIG. 6D has expired and has been dismissed. As another example, the device 600 sets a first alarm for the time of day 6:32 pm, and a subsequent alarm for 6:32 pm (which will occur on the subsequent day as the first alarm). In response to a determination that the first time-based notification condition has occurred the first time, the electronic device (e.g., 600) causes output of the second audio notification. For example, the first time that the first time-based notification condition occurs, the device is currently causing output of an audio notification (e.g., another alarm or timer has expired and is causing audio output), so the device causes output of the second audio notification (e.g., AUDIO NOTIFICATION 2, an exemplary multiple-event audio notification). In response to a determination that the first time-based notification condition has occurred the second time, the electronic device (e.g., 600) causes output of the first audio notification. For example, the second time that the first time-based notification condition occurs (e.g., when used to set a subsequent time-based notification), the device is not currently causing output of an audio notification (e.g., another alarm or timer has not expired and causing audio output), so the device causes output of the first audio notification (e.g., AUDIO NOTIFICATION 1, an exemplary single-event audio notification). The audio notification that is output (e.g., AUDIO NOTIFICATION 1 or AUDIO NOTIFICATION 2) can depend on the state of the electronic device (e.g., 600) when the corresponding time-based notification condition expires. Thus, a second time-based notification can cause output of a different audio notification than a first time-based notification that are both set based on the same time-based notification condition because the state of the device at the time a time-based notification condition expires can affect which audio notification a device outputs. Accordingly, for the same time-based notification condition, the audio notification that is output upon occurrence of the condition can depend on whether one or more other time-based notification conditions have occurred and are causing output of an audio notification.

In some embodiments, the audio notification based on at least one time-based notification other than the first time-based notification is the first audio notification (e.g., exemplary single-event audio notification AUDIO NOTIFICATION 1 in audio output 614, which device 600 is causing output of as shown in FIG. 6G). Further in accordance with the determination that the electronic device (e.g., 600) is currently causing output of the audio notification (e.g., AUDIO NOTIFICATION 1, as shown in FIG. 6G) based on at least one time-based notification (e.g., TIMER 2 in FIG. 6G) other than the first time-based notification (e.g., TIMER 1 in FIG. 6G), the electronic device (e.g., 600) ceases (712) to cause output of the first audio notification. For example, in FIG. 6H, device 600 has ceased causing output of AUDIO NOTIFICATION 1. Thus, in this example, the first notification condition occurring (expiration of TIMER 1 in FIGS. 6G-6H) causes device 600 to stop playing a single-event notification because a multiple-event condition now exists.

Ceasing to cause output of a first audio notification when an electronic device enters a multiple-event condition and begins causing output of a second audio notification provides the user with audio feedback about the number of time-based notification conditions that have occurred. Providing improved audio feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device causes output of both the first and second audio notifications (e.g., sequentially, or layered) in accordance with the determination that the electronic device is currently causing output of the audio notification based on at least one time-based notification other than the first time-based notification. For example, the first and second audio notifications can be played back to back (sequentially), played concurrently (layered), or some combination thereof.

In some embodiments, causing output of the second audio notification comprises causing output of the second audio notification to begin upon ceasing to cause output of the first audio notification. For example, the output of the second audio notification cuts off the first audio notification (e.g., in the middle of playback of the first audio notification where it has a length of time). In some embodiments, the device waits for the end of the first audio notification (e.g., where it has a length of time) before causing output of the second audio notification. For example, if the first audio notification is a media entity having some length of time when played back, electronic device 600 waits until the end of the length of time (e.g., plays back the first audio notification for the full length) before beginning output of the second audio notification.

In some embodiments, receiving the information representing the first time-based notification condition comprises receiving a voice input (e.g., 604) representing a request to set the first time-based notification (e.g., "HEY SIRI, SET A TIMER FOR TEN MINUTES"), wherein the voice input includes the information representing the first time-based notification condition (e.g., "TIMER FOR TEN MINUTES" in voice input 604). In some examples, the electronic device transcribes (or causes to be transcribed via a connection to one or more other devices, such as one or more cloud-based servers) the voice input (e.g., using a speech-to-text algorithm) and determines the information representing the first time-based notification condition from the transcription.

In some embodiments, receiving the information representing the first time-based notification condition comprises receiving data from a second electronic device (e.g., a device including one or more features of devices 100, 300, 500, 580), connected to the electronic device (e.g., 600), representing a request to set the first time-based notification, wherein the data includes the information representing the first time-based notification condition (e.g., timer for ten minutes). For example, a second device can be a smartphone that is used to input a time-based notification for a timer or alarm to be set, which is then communicated to device 600.

In some embodiments, while causing output of the second audio notification (e.g., a multi-event audio notification) (e.g., audio output 618 of AUDIO NOTIFICATION 2, as shown in FIG. 6I), the electronic device (e.g., 600) receives (714) an input (e.g., voice input 620) representing a request to cease audio notification output (e.g., "HEY SIRI, STOP"). In response to receiving the input representing the request to cease audio notification output, the electronic device (e.g., 600) ceases (716) to cause output of the second audio notification (e.g., as shown in FIG. 6J). For example, a single input dismisses all time-based notifications that are going off concurrently and that have not yet been dismissed. In some embodiments, the input representing the request to cease audio notification output is a voice input (e.g., voice input 620). In some embodiments, the input representing the request to cease audio notification output is a touch input (e.g., a touch gesture on a touch-sensitive surface of device 600).

In some embodiments, a single input dismisses only time-based notifications of the same type. For example, the single input can dismiss all timers concurrently going off but not any alarms that are also concurrently going off, or can dismiss all alarms concurrently going off but not any timers that are also concurrently going off.

In some embodiments, discrete user inputs cause the electronic device (e.g., 600) to sequentially dismiss each notification of a plurality of notifications that are concurrently going off. For example, if two time-based notifications are concurrently going off, a first input dismisses a first one, and electronic device continues to cause output of an audio notification based on the remaining non-dismissed notification (the second one). A subsequent, second input dismisses the remaining non-dismissed (second) notification, and the device then ceases audio notification output because all time-based notifications have now been dismissed. In some embodiments, the audio notification being output by the device changes from a multiple-event audio notification to a single-event audio notifications between inputs. For example, in response to the first input that dismisses a time-based notification that results in the device 600 going from a multiple-event condition to a single-event condition (e.g., that leaves only one time-based notification that is going off and has not been dismissed), then the audio notification output changes from a multiple-event audio notification to a single-event audio notification.

In some embodiments, prior to the determination that the first time-based notification condition has occurred: the electronic device (e.g., 600) sets a second time-based notification (e.g., TIMER 2 of FIG. 6F) based on a second time-based notification condition (e.g., five minute timer); and while the electronic device is not currently causing output of an audio notification based on at least one time-based notification other than the second time-based notification (e.g., the device is not currently outputting another time-based notification (e.g., timer or alarm) when the second time-based notification condition occurs), and in response to a determination that the second time-based notification condition has occurred (e.g., timer expires, alarm time arrives) (e.g., TIMER 2 expires as shown in FIG. 6G), the electronic device (e.g., 600) causes output of the first audio notification (e.g., a single-event audio notification) (e.g., AUDIO NOTIFICATION 1 in audio output 614 as shown in FIG. 6G, an exemplary single-event audio notification). Further in response to the determination (706) that the first time-based notification condition has occurred, and in accordance with the determination that the electronic device is currently causing output of the audio notification (e.g., AUDIO NOTIFICATION 1 in audio output 614, as shown in FIG. 6G, an exemplary single-event audio notification) based on at least one time-based notification other than the first time-based notification, the electronic device (e.g., 600) ceases to cause output of the first audio notification (e.g., AUDIO NOTIFICATION 1 in audio output 614, as shown in FIG. 6G), wherein the first time-based notification occurs while the electronic device is currently causing output of the first audio notification based on the second time-based notification (e.g., audio output 614 of FIG. 6G). For example, device 600 ceases output of a single-event audio notification (e.g., AUDIO NOTIFICATION 1 in audio output 614, as shown in FIG. 6G, an exemplary single-event audio notification), in addition to causing output of a multiple-event audio notification (e.g., AUDIO NOTIFICA-TION 2 in audio output 616, as shown in FIG. 6H, an exemplary multiple-event audio notification). For example, when a single-event condition has changed to a multiple-event condition by virtue of the first time-based notification condition expiring, the audio output changes from a single-event audio notification to a multiple-event audio notification.

In some embodiments, while the electronic device is currently causing output of the second audio notification (e.g., as shown in FIG. 6I), wherein the first time-based notification condition and the second time-based notification condition have occurred (e.g., TIMER 1 and TIMER 2 have expired, as shown in status box 601 of FIG. 6I), and wherein the first time-based notification (e.g., TIMER 1 of FIG. 6I) and the second time-based notification (e.g., TIMER 2 of FIG. 6I) have not been dismissed (e.g., TIMER 1 and TIMER 2 have not been dismissed, as shown in status box 601 of FIG. 6I), the electronic device (e.g., 600) receives the input (e.g., 620) representing the request to cease audio notification output. Further in response to receiving the input (e.g., 620) representing the request to cease audio notification output: the electronic device (e.g., 600) dismisses the first time-based notification and the second time-based notification (e.g., TIMER 1 and TIMER 2 have been dismissed, as shown in status box 601 of FIG. 6J), wherein upon ceasing to cause output of the second audio notification the electronic device does not begin to cause output of the first audio notification (e.g., as shown in FIG. 6J).

Ceasing to cause output of a second audio notification and dismissing concurrently expired time-based notifications when an electronic device is in a multiple-event condition reduces the number of inputs needed to dismiss concurrently expired time-based notifications. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first time-based notification condition includes one or more of: a first type of notification condition that occurs upon expiration of a determined length of time (e.g., a timer); and a second type of notification condition that occurs upon arrival of a determined time of day (e.g., an alarm).

In some embodiments, the at least one time-based notification other than the first time-based notification is a third time-based notification (e.g., TIMER 2 in FIG. 6K), and wherein the third time-based notification condition was previously set by the electronic device based on a third time-based notification condition (e.g., five-minute timer). While causing output of the second audio notification (e.g., AUDIO NOTIFICATION 2 in audio output 622 of FIG. 6K), and subsequent to the determination that the first time-based notification condition has occurred (e.g., TIMER 1 is expired in FIG. 6K) and a determination that the third time-based notification condition has occurred (e.g., TIMER 2 is expired in FIG. 6K), and while the first time-based notification and the third time-based notification have not been dismissed (e.g., TIMER 1 and TIMER 2 have not been dismissed in FIG. 6K): the electronic device (e.g., 600) causes (718) output of audio identifiers (e.g., names) that identify the first time-based notification and the third time-based notification (e.g., audio output 622 includes the identifiers TEN MINUTE and FIVE MINUTE in the text-to-speech output of the statement "TEN MINUTE AND FIVE MINUTE TIMERS" in FIG. 6K). In some embodiments, an audio identifier (e.g., the name TEN MINUTE) that identifies a time-based notification is a name given to the time-based notification via user input. For example, if the user names a timer "DINNER" then the electronic device can cause output of a dictation that says "DINNER TIMER" upon that timer expiring. In some embodiments, an audio identifier that identifies a time-based notification is a time value associated with a notification condition of the time-based notification. In some embodiments, the audio identifier is a time value by default if a name is not otherwise specified for the time-based notification (e.g., specified by user input setting the name). For example, an audio identifier (e.g., name) for a ten-minute timer that was not named can be set by default to "ten minute" based on the time value of the notification condition, and upon expiration the audio identifier that is announced is "TEN MINUTE TIMER".

Outputting audio identifiers that identify time-based notifications that have expired provides the user with audio feedback about the identity of which time-based notifications have expired. Providing improved audio feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, causing output of the second audio notification and causing output of the audio identifiers comprises causing output of the second audio notification (e.g., AUDIO NOTIFICATION 2 in FIG. 6K) and the audio identifiers (e.g., "TEN MINUTE AND FIVE MINUTE TIMERS" in FIG. 6K) in a predetermined pattern that includes causing output of the second audio notification a first predetermined number of times (e.g., two times as shown in FIG. 6K) and causing output of the audio identifiers that identify the first time-based notification and the third time-based notification a second predetermined number of times (e.g., one time as shown in FIG. 6K). For example, as shown in FIG. 6K, audio output 622 includes a predetermined pattern in which an audio notification (AUDIO NOTIFICATION 2) is output twice, followed by output of an audio identifier (two in this example, "TEN MINUTE AND FIVE MINUTE TIMERS"). In some embodiments, the second audio notification is output the first predetermined number of times, followed by the audio identifiers. In some embodiments, the device outputs the audio identifiers followed by the second audio notification.

In some embodiments, the electronic device (e.g., 600) causes output of the predetermined pattern to repeat (e.g., until dismissal of the notifications or expiration of a predetermined amount of time (e.g., 15 minutes)). For example, in FIG. 6K, the pattern repeats (e.g., AUDIO NOTIFICATION 2 is shown being output another two times after the audio identifiers "TEN MINUTE AND FIVE MINUTE TIMERS" are announced the first time).

In some embodiments, the first predetermined number of times (e.g., two times) increases to a third predetermined number of times (e.g., four times) after the electronic device has caused output of the predetermined pattern a fourth predetermined number of times (e.g., after the pattern has repeated two times). For example, in FIG. 6L, the number of times that the audio notification AUDIO NOTIFICATION 2 is output during one repetition of the predetermined pattern has increased to four. For example, a predetermined pattern can include: audio notification is output X number of times (e.g., 2) before voice assistant output that includes audio identifier(s), then the pattern changes to audio notification being output Y number of times (e.g., 4) followed by the audio identifier output after the pattern has been output Z number times (e.g., 2). For example, the pattern can be: (audio notification, audio notification, announce audio identifier), (audio notification, audio notification, announce audio identifier), (audio notification (four times), announce audio identifier) and repeat until a timeout (e.g., fifteen minutes). In some embodiments, after the predetermined pattern changes to Y number of times (e.g., 4), it can subsequently again change to N number of times (e.g., 8) after one or more cycles (e.g., Z number of times). In some embodiments, audio output (e.g., including audio notification and/or audio identifier) automatically ceases after a period of time (e.g., times out after fifteen minutes).

In some embodiments, the first audio notification is a single-event audio notification that indicates occurrence of a time-based notification condition of a single time-based notification that has not been dismissed (e.g., a single-event condition), and the second audio notification is a multiple-event audio notification that indicates the occurrence of time-based notification conditions of multiple time-based notifications that have not been dismissed (e.g., a multiple-event condition).

Outputting a first audio notification that is a single-event audio notification different from a second audio notification that is a multiple-event audio notification provides the user with audio feedback about the number of time-based notification conditions that have occurred. Providing improved audio feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the at least one time-based notification includes a third type of time-based notification (e.g., an alarm) or that the first time-based notification is the third type of time-based notification (e.g., an alarm), the second audio notification is a first multiple-event audio notification (e.g., a multiple-event audio notification for an alarm type of time-based notification). For example, in FIG. 6O, rows 626B and 626C of table 626 illustrate that if at least one time-based notification going off NOTIFICATION 1 (e.g., an exemplary first time-based notification) and NOTIFICATION 2 (e.g., an exemplary at least one time-based notification) is the SECOND type (e.g., an exemplary third type of time-based notification), then the multiple-event audio notification output is for the SECOND type. In accordance with a determination that each of the at least one time-based notification is a fourth type of time-based notification (e.g., a timer) different from the third type (e.g., an alarm) and that the first time-based notification is the fourth type of time-based notification (e.g., a timer), the second audio notification is a second multiple-event audio notification (e.g., a multiple-event audio notification for a timer type of time-based notification) different from the first multiple-event audio notification. For example, in FIG. 6O, row 626A of table 626 illustrates that if the only time-based notifications already going off NOTIFICATION 1 and NOTIFICATION 2 are both the FIRST type (e.g., an exemplary fourth type of time-based notification), then the multiple-event audio notification output is for the FIRST type. In some embodiments, the third type is an alarm type notification and the fourth type is a timer type notification. In some embodiments, the third type is a timer type notification and the fourth type is an alarm type notification.

In some embodiments, while causing output of the first audio notification (e.g., audio output 614 including AUDIO NOTIFICATION 1 as shown in FIG. 6M), the electronic device (e.g., 600) causes output of a first visual indication (e.g., 600A as shown in FIG. 6M). While causing output of the second audio notification (e.g., audio output 616 including AUDIO NOTIFICATION 2 as shown in FIG. 6N), the electronic device (e.g., 600) causes output of a second visual indication (e.g., 600A as shown in FIG. 6N) different from the first visual indication.

In some embodiments, the first audio notification and the first visual indication correspond to each other, and the stimulus that causes the output of the first audio notification also causes the outputting of the first visual indication (e.g., without causing output of the second visual indication). In some examples, the second audio notification and the second visual indication correspond to each other, and the stimulus that causes the output of the second audio notification also causes the outputting of the second visual indication (e.g., without causing output of the first visual indication).

Outputting a first visual indication while causing output of a first audio notification and outputting a second visual indication while causing output of a second audio notification provides the user with visual feedback about the number of time-based notifications that have expired. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 700 (e.g., FIGS. 7A-7B) are also applicable in an analogous manner to the methods described below. For example, method 900 optionally includes one or more of the characteristics of the various methods described above with reference to method 700. For example, the technique for determining the type of audio notification to output can be combined with the technique for determining whether to output an audio identifier. For brevity, these details are not repeated below.

FIGS. 8A-8O illustrate exemplary user interfaces and techniques for outputting audio identifiers for time-based notifications, in accordance with some embodiments. The user interfaces in these figures are used to illustrate the processes described below, including the processes in FIGS. 9A-9B.

FIGS. 8A-8F illustrate exemplary techniques for announcing an audio identifier that identities an audio notification (e.g., that has expired). As illustrated herein, an electronic device that is capable of setting multiple time-based notifications that are concurrently active (e.g., set, not dismissed, and expired) can, under certain conditions, announce the name of one or more time-based notifications that have expired in order to provide useful information regarding the cause of an audio notification output.

FIGS. 8A-8B illustrate an exemplary technique for causing an electronic device to set a time-based notification. In FIGS. 8A-8N, a device status box 801 indicates a status of the state of electronic device 600 and is provided as a visual indication of a status of any time-based indicators that are set (e.g., in memory of device 600) in the respective example scenario depicted in each respective figure. Like device status box 601, device status box 801 is provided merely as a visual aid, and is not necessarily displayed by a device (e.g., 600). Additionally, unless otherwise noted in a figure or herein, device status box 801 indicates the status of device 600 after any voice input and audio output depicted in the respective figure.

Turning to FIG. 8A, as noted in device status box 801, no time-based notifications are set (e.g., in memory of device 600) before voice input 804. That is, in FIG. 8A, box 801 identifies that no time-based notifications are set ("NONE") before the device 600 receives voice input command 804.

In some embodiments, an electronic device (e.g., 600) receives information (e.g., 804) representing a time-based notification condition (e.g., ten-minute length). In some embodiments, the information is received as a voice input. For example, as illustrated in FIG. 8A, device 600 detects (e.g., via one or more microphones, such as input mechanism 588) voice input 804 provided by user 602 that includes information representing a time-based notification condition, a length of time minutes for a timer. In some embodiments, the information representing the time-based notification condition is part of a request to create a time-based notification. In this example, the voice input 804 includes the phrase: "HEY SIRI, SET A TIMER FOR TEN MINUTES". Thus, the voice input 804 includes the following information: a timer should be set (an exemplary request to set a timer type time-based notification), the timer having a length often minutes (an exemplary time-based notification condition).

As described above, a time-based notification can be an alarm. For example, in response to a voice input that includes "HEY SIRI, SET AN ALARM FOR TEN MINUTES", electronic device 600 can set an alarm for the time of day (e.g., 6:40 pm) that is ten minutes from the current time of day (e.g., 6:30 pm). In some embodiments, in response to a request to create an alarm, the electronic device (e.g., 600 outputs an acknowledgement that includes a time-based notification condition. For example, after setting the alarm, device 600 can output "OK, I'VE SET AN ALARM FOR SIX FORTY P.M." Thus, even though the voice input indicated that the alarm should be for the time of day in ten minutes, the device indicates the actual notification condition, which is the occurrence of 6:40 pm. Likewise, an acknowledgement that includes the time-based notification condition can also be output when the input includes the time-based notification condition, such as in response to "HEY SIRI, SET AN ALARM FOR SIX FORTY P.M."

FIG. 8B illustrates an exemplary response to receiving information representing a time-based notification condition (e.g., a request to set a time-based notification). In some embodiments, the electronic device (e.g., 600) sets a first time-based notification based on the received information representing the time-based notification condition. For example, in response to detecting voice input 804, electronic device 600 sets a timer having a notification condition that occurs when ten minutes have passed. As shown in FIG. 8B, in response to voice input 804, electronic device 600 has set a timer (TIMER 1) named "TEN MINUTE", as indicated by device status box 801 in FIG. 8B. Device status box 801 in FIG. 8B also indicates the time remaining on the timer named "TEN MINUTE", which is 9:59 (nine minutes and fifty-nine seconds). In this example, one second has elapsed since creation of the "TEN MINUTE" timer, which had an original duration often minutes. Additionally, as shown in FIG. 8B, in response to detecting voice input 804 (FIG. 8A) device 600 outputs audio output 806, which is an acknowledgement of voice input 804 and indicates that the electronic device set a ten-minute timer.

In some embodiments, in response to occurrence of a time-based notification condition of a time-based notification, the electronic device (e.g., 600) causes output of a name of the time-based notification. In some embodiments, the device causes output of the name in accordance with a determination that a name output condition is met. In some embodiments, the device causes output of the name in accordance with a determination that one or more name output conditions in a set of name output conditions is met. For example, if at least one name output condition in the set of name output conditions is met, an electronic device (e.g., 600) causes output of an audio identifier (e.g., name) for a time-based notification (e.g., that has expired). In another example, the device can require that more than one or all name output conditions in the set of name output conditions are met in order to cause output of the name of the time-based notification.

Figure 8C:
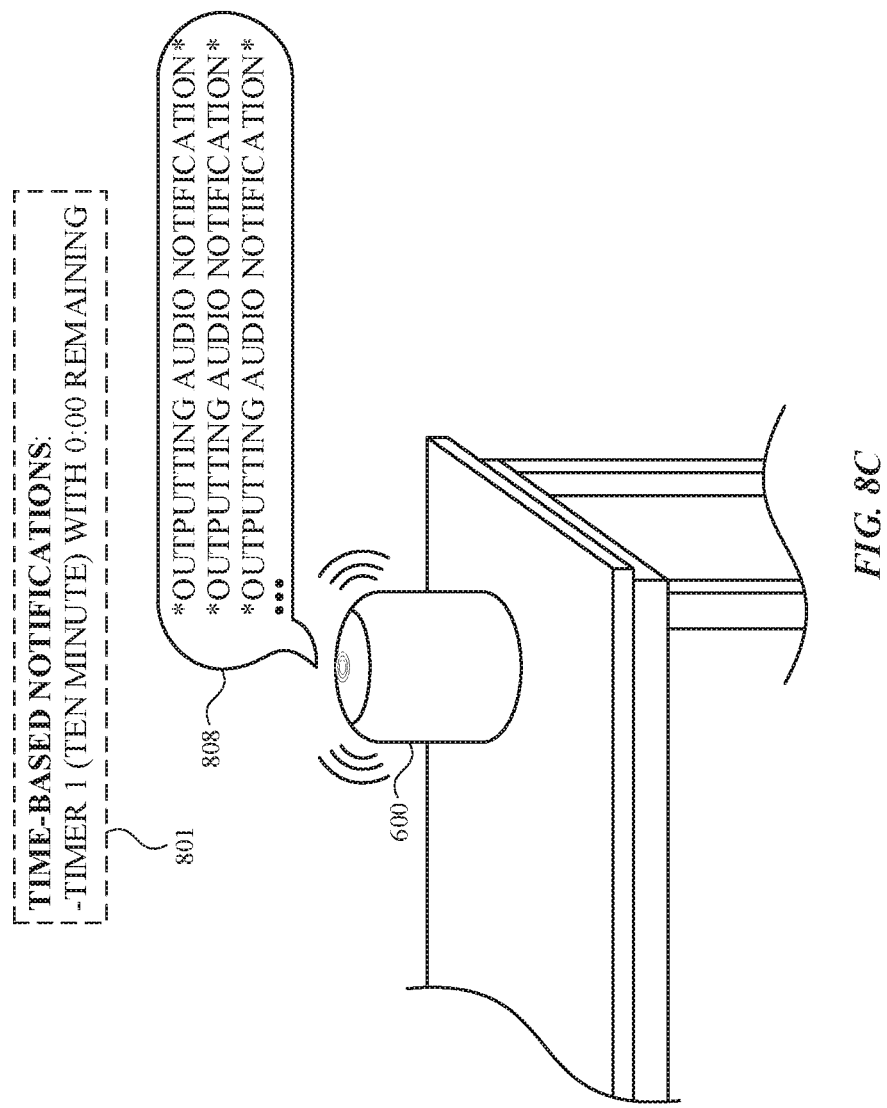
FIGS. 8A-8O illustrate exemplary techniques and user interfaces for outputting audio identifiers for time-based notifications.
Figure 9A:
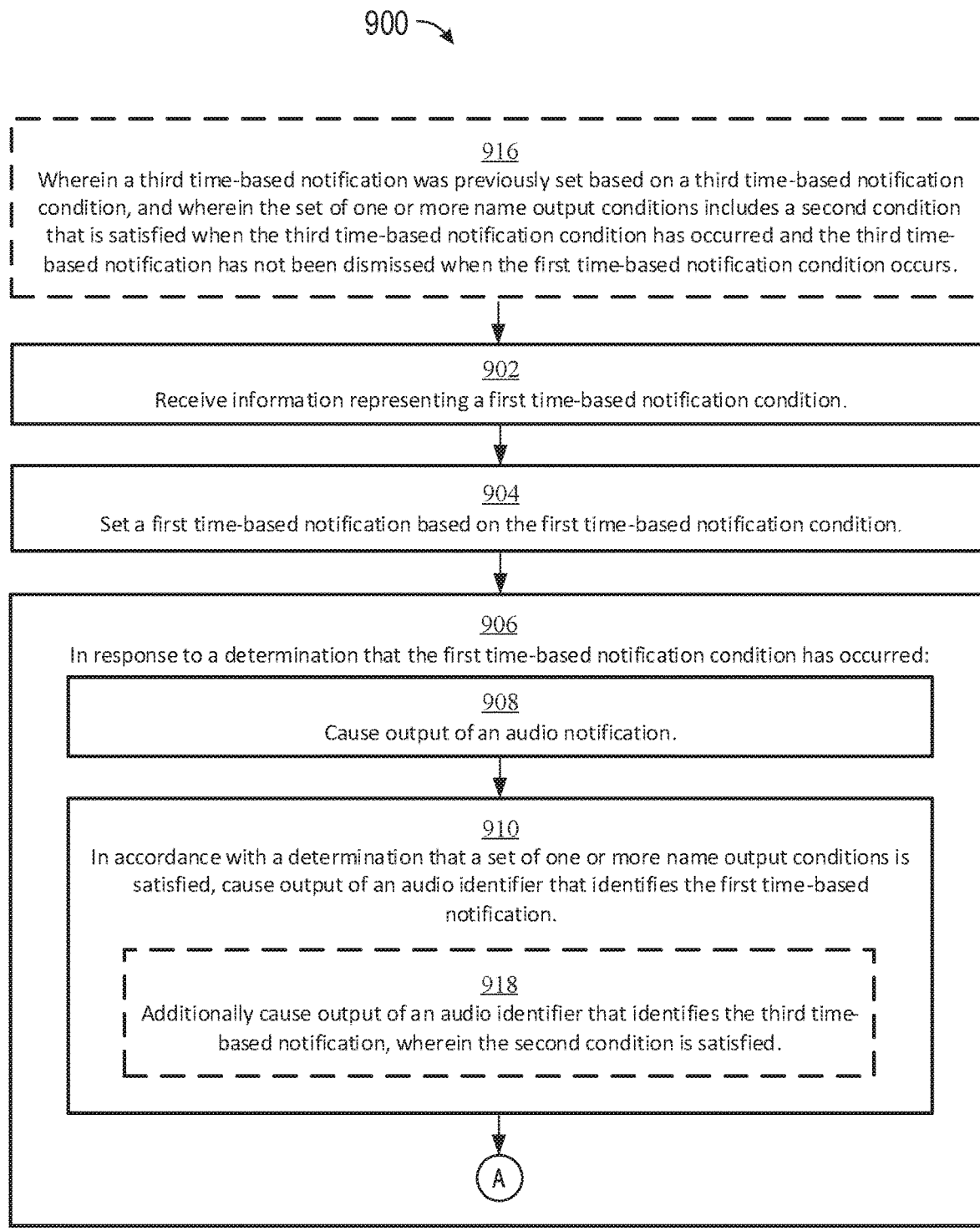

FIG. 8C illustrates an exemplary audio output when a name output condition is not met. For example, in FIG. 8C, electronic device 600 causes output of audio output 808. Audio output 808 includes output of an audio notification (illustrated by the text "*OUTPUTTING AUDIO NOTIFICATION*") but does not output a name of the time-based notification that has expired. In FIG. 8C, the TIMER 1 named "TEN MINUTE" has expired, as shown in status box 801. Thus, for example, instead of outputting an audio notification and a name in a predetermined pattern as described above (e.g., audio notification twice, followed by the name), device 600 outputs the audio notification continuously (e.g., the audio notification is shown three times in a row in audio output 808, followed by an ellipsis " . . . " indicating that the output continues). In this example, the audio notification in audio output 808 is a single-event audio notification associated with the timer type of time-based notification, because only a single time-based notification is going off, in accordance with embodiments described above.

Figure 8F:
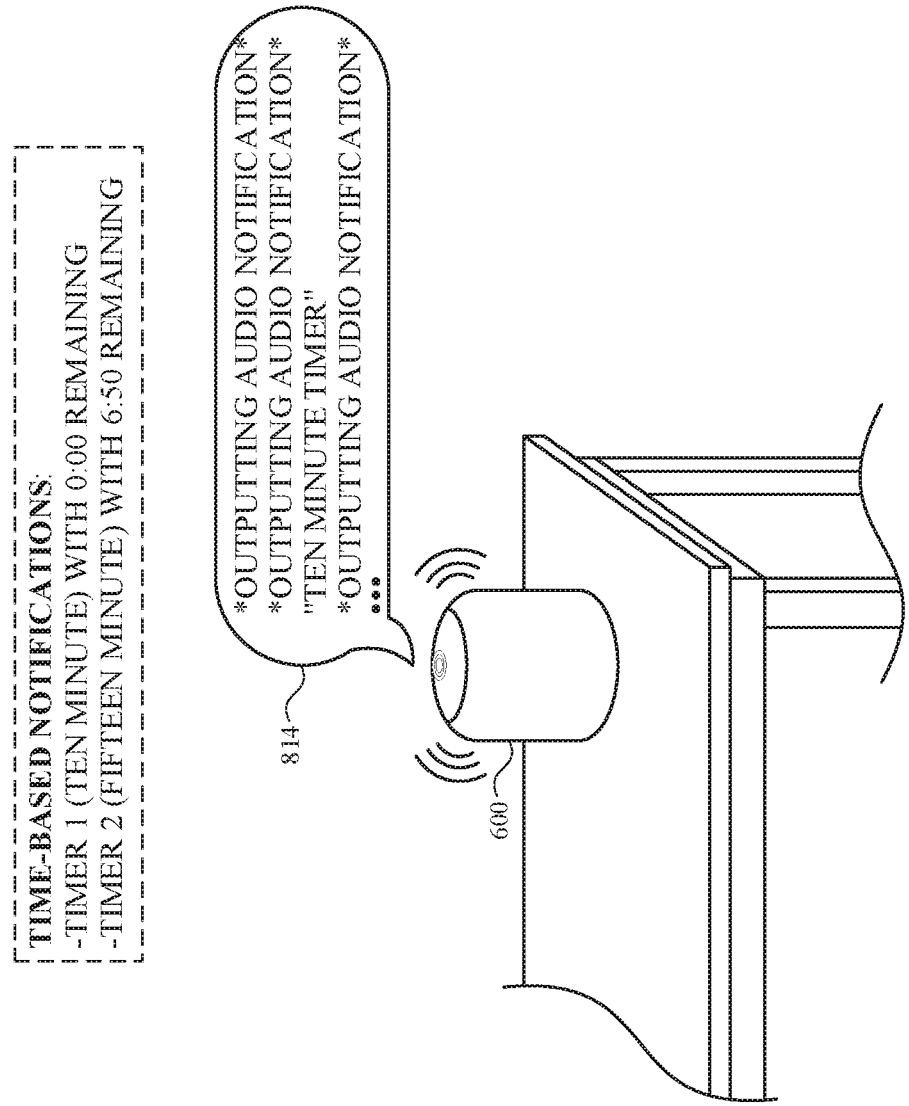

FIGS. 8D-8F illustrate an exemplary audio output when a name output condition is met. Turning to FIG. 8D, the TIMER 1 named "TEN MINUTE" that was set in FIG. 8B is active (e.g., set and not expired), and now has 8:13 (eight minutes and thirteen seconds) remaining before device 600 receives voice input 810. In FIG. 8D, the user 602 provides voice input 810 representing a request to create a new timer. Voice input 810 includes the text "HEY SIRI, SET A TIMER FOR FIFTEEN MINUTES". Device 600 detects voice input 810 and in response creates a timer, as shown in FIG. 8E.

In FIG. 8E, device 600 has set TIMER 2 named "FIFTEEN MINUTE" in response to voice input 810. For example, as shown in status box 801 of FIG. 8E, the FIFTEEN MINUTE timer has 14:59 (fourteen minutes and fifty-nine seconds) remaining (of an original length of fifteen minutes), while the TEN MINUTE timer (TIMER 1) has elapsed four seconds since before voice input 810 (FIG. 8D) and now has 8:09 (eight minutes and nine seconds) remaining. Also shown in FIG. 8E, electronic device 600 outputs acknowledgement 812 ("FIFTEEN MINUTE TIMER, STARTING NOW").

Turning to FIG. 8F, an exemplary audio output when a name output condition is met is illustrated. In FIG. 8F, electronic device outputs audio output 814, which includes output of an audio notification (illustrated by the text "*OUTPUTTING AUDIO NOTIFICATION*") and output (e.g., a text-to-speech dictation) of a name of the timer that has expired (illustrated by the text "TEN MINUTE TIMER").

In some embodiments, a name output condition includes a condition that is met when at least one other time-based notification is active when a first time-based notification's notification condition occurs. For example, as shown in FIG. 8F, the TEN MINUTE timer has expired, but the FIFTEEN MINUTE timer is still active (e.g., has been previously set and has not expired or been dismissed or deleted). Thus, when the notification condition for the TEN MINUTE TIMER occurs (ten minutes elapse), the FIFTEEN MINUTE timer has 6:50 (six minutes and fifty seconds) remaining—for example, the same time differential that existed between the timers in FIG. 8E—which is the amount shown in status box 801 of FIG. 8F. Thus, in FIG. 8F, the name output condition that at least one other time-based notification is active (FIFTEEN MINUTE timer) when a first time-based notification's notification condition occurs (TEN MINUTE timer) would be met. Accordingly, in FIG. 8F, audio output 814 includes output of the name of the time-based notification that is currently going off, the text-to-speech dictation "TEN MINUTE TIMER" in addition to output of an audio notification. Audio output 814 is output in a predetermined pattern, as described above (e.g., output of the audio notification twice, followed by output of the audio identifier, after which the pattern repeats). Also, in this example, the audio notification is a single-event audio notification for the timer type of time-based notification, because only a single time-based notification is going off, in accordance with embodiments described above.

Accordingly, output of an audio identifier when two or more time-based notifications were previously set and at least one is still active while one is going off provides the user with useful information regarding which of the time-based notifications is currently causing output of an audio notification. For example, a user can start the TEN MINUTE timer a few minutes after the FIFTEEN MINUTE timer (as shown in FIGS. 8D-8E), but be unsure of which will expire first (e.g., the user does not have knowledge of whether at least five minutes have elapsed from the FIFTEEN MINUTE timer when the TEN MINUTE timer is set). Thus, announcing the name of a single time-based notification going off when there is at least one other time-based notification active, even though only a single-event condition exists, provides useful information about the state of the device.

In some embodiments, the name output condition that is met when at least one other time-based notification is active when a first time-based notification's notification condition occurs additionally requires that the at least one other time-based notification is a notification of the same type. For example, where the at least one other time-based notification is a notification of a different type, an audio identifier (e.g., name) of the time-based notification that has expired will not be announced. For example, if FIFTEEN MINUTE timer (TIMER 2) active in FIG. 8F was instead an alarm type of notification, electronic device 600 would not output the name of the TEN MINUTE timer upon expiration (e.g., would instead output audio output 808 of FIG. 8C, which only includes an audio notification). For example, the alarm type of notification could be an alarm that expires fifteen minutes from the time of its creation, such as an alarm created at 6:15 pm that expires at 6:30 pm. In this example, even if the FIFTEEN MINUTE timer would have expired at the exact same time (e.g., 6:30 pm) if the user had set a timer (e.g., TIMER 2 of FIG. 8F) instead of an alarm, because the alarm is of a different type than the TEN MINUTE timer, an audio identifier (e.g., name) for the alarm would not be output because the condition that the time-based notifications be the same type would not be met.

Accordingly, when there is only one of a first type (e.g., a timer) and one of a second type (e.g., an alarm) that were active before one of them expired, the device can indicate which expired by outputting a type-specific audio notification. For example, as described above, the first type of time-based notification can have a single-event audio notification for the first type, and the second type of time-based notification can have a single-event audio notification for the second type. Thus, when a single event occurs, the particular single-event audio notification that is output provides an indication to the user about which of the two types of time-based notifications have expired and are currently causing audio notification output. In such case, an audio identifier is not necessary.

In some embodiments, a name output condition is met when two or more time-based notifications have expired and have not been dismissed. For example, turning briefly back to FIG. 6K, it illustrates the scenario in which two timers (TIMER 1 named "TEN MINUTE" and TIMER 2 named "FIVE MINUTE") have both expired and have not been dismissed. As shown, audio output 622 includes an audio indicator for the time-based notification that has just expired (TEN MINUTE timer, as shown about to expire in FIG. 6G while FIVE MINUTE timer has already expired). Additionally, audio output 622 includes an audio indicator for the other time-based notification that has expired (FIFTEEN MINUTE timer). Thus, audio output 622 includes the text-to-speech dictation "TEN MINUTE AND FIFTEEN MINUTE TIMERS" that identifies each of the timers that have expired.

In some embodiments, the name output condition that is met when two or more time-based notifications have expired and have not been dismissed is met regardless (independent of) of the type(s) of the two or more time-based notifications. For example, if an alarm and a timer have expired and not been dismissed, the electronic device will output the names of both (e.g., together with a multiple-event audio notification). For example, if the two time-based notifications in FIG. 6K were a timer and an alarm, electronic device would still output audio identifiers for both time-based notifications, such as "SIX THIRTY P.M. ALARM AND TEN MINUTE TIMER". Further, if an alarm type multiple-event audio notification takes priority over a timer type multiple-event audio notification (e.g., a multiple-event audio notification for the alarm type of notification is output so long as the multiple-event condition includes at least one alarm going off), then the output of audio identifiers serves to indicate that at least one timer has also expired, even though the multiple-event audio notification corresponding to alarms is being output. Thus, while a multiple-event audio notification indicates that multiple time-based notification conditions have occurred, the output of audio indicators can provide an indication of which time-based notifications have expired. Such information is useful, for example, where multiple time-based notifications have expired, but there is still one or more other unexpired time-based notification.

FIGS. 8G-8N illustrate exemplary techniques for setting a name of a time-based notification.

FIGS. 8G-8H illustrate a technique for setting a name of a time-based notification when creating the time-based notification. In some embodiments, the electronic device (e.g., 600) receives a request to create a time-based notification that includes a request to set a name of the time-based notification. For example, in FIG. 8G, electronic device 600 receives voice input 816 that includes both a request to create a time-based notification (e.g., "HEY SIRI, SET A TIMER FOR TEN MINUTES . . . ") and a request to set a name for that time-based notification (e.g., " . . . CALLED DINNER"). In response to receiving voice input 816, electronic device 600 sets a ten minute timer called "DINNER". For example, as shown in status box 801 of FIG. 8G, before voice input 816, no timers are set, and after voice input 816, TIMER 1 (called "DINNER") has been set and has 9:59 (nine minutes and fifty-nine seconds) remaining. Additionally, in this example, electronic device 600 provides acknowledgement 818 that the requested time-based notification has been created. In this example, acknowledgement 818 also includes confirmation that the timer was successfully named "DINNER" by the output of: "TEN MINUTE DINNER TIMER, STARTING NOW".

FIG. 8H illustrates expiration of a single time-based notification that was set based on a name received via user input. In some embodiments, a name output condition is met when a time-based notification has been named based on a received (e.g., via user input) request to set a name of the time-based notification. For example, as shown in FIG. 8H, in response to expiration of the DINNER timer (status box 801 in FIG. 8H shows it has no time remaining), the electronic device 600 outputs audio output 820. Audio output 820 includes an audio notification (e.g., a single-event audio notification for a timer type notification) as well as an audio identifier for the time-based notification (e.g., the text-to-speech dictation output of the name "DINNER TIMER"). In this situation, the name output condition is satisfied because device 600 received an explicit request to set the name of the timer to a particular name specified via user input (e.g., 816). Accordingly, in this example, since a user specifically set a particular name for a timer, device 600 announces that name when the timer expires.

As described above with respect to timers, a name can be set for an alarm in similar fashion. For example, a voice input of "HEY SIRI, SET A WAKE UP ALARM FOR SEVEN FIFTEEN A.M." causes device 600 to set an alarm type of time-based notification with the notification condition being the occurrence of the next 7:15 am time of day, and to set the name to be "WAKE UP". Upon occurrence of the 7:15 am notification condition, device 600 can output an audio identifier using the name WAKE UP (e.g., when a name output condition is satisfied). For example, device 600 causes output (e.g., in a predetermined pattern) of an alarm type audio notification and the statement "WAKE UP ALARM".

In some embodiments, the electronic device (e.g., 600) sets a default name for a time-based notification if no request to set a name is received. For example, turning back to FIGS. 8A-8B, they illustrate the scenario in which the user does not specify a name for the ten minute timer to be created (e.g., voice input 804 only includes a request to create the timer: "HEY SIRI, SET A TIMER FOR TEN MINUTES"). Accordingly, as shown in status box 801 in FIG. 8B, the name of the resulting timer that is set (TIMER 1) is named "TEN MINUTE" (the name being specified within the parentheses). In some embodiments, the default name is a time value representing the time-based notification condition of the time-based notification. In some embodiments, a time value is a length of time of the timer. For example, because no name is specified in FIG. 8A, in FIG. 8B, TIMER 1 was given the name "TEN MINUTE" because its original length of time was ten minutes. In some embodiments, a time value is a time of day at which an alarm expires. For example, if an alarm had been set in FIG. 8A instead of a timer (e.g., via the voice input "HEY SIRI, SET AN ALARM FOR SEVEN FIFTEEN A.M."), a default name could be the time value based on the notification condition of the time of day "7:15 am". Thus, upon output of a text-to-speech dictation of the default name, device 600 would output "SEVEN FIFTEEN A.M. ALARM, starting now" (e.g., in an acknowledgement) and "SEVEN FIFTEEN A.M. ALARM" (e.g., upon occurrence of the notification condition—the clock reaching 7:15 am).

FIGS. 8I-8J illustrate exemplary techniques for renaming a time-based notification after is has been set, and an exemplary scenario in which a requested name is not available. In some embodiments, the electronic device (e.g., 600) receives a request to set a name of a time-based notification after the time-based notification has already been set (e.g., in memory of device 600). For example, as shown in FIG. 8I, before device 600 receives voice input 822, TIMER 1 (named "TEN MINUTE") is currently set and has not yet expired. Voice input 822 includes the statement: "HEY SIRI, RENAME MY TEN MINUTE TIMER TO "DINNER"". Electronic device 600 parses voice input 822 to determine that the timer named "TEN MINUTE" should be renamed to be called "DINNER". Notably, a timer (TIMER 2) named DINNER already exists, as shown in status box 801 in FIG. 8I.

Turning to FIG. 8J, a technique for outputting a prompt to provide a new name when a requested name is unavailable is illustrated. In some embodiments, in accordance with a determination that a requested name is unavailable, the electronic device outputs a prompt to provide an alternate name (e.g., different than the requested name). For example, in FIG. 8J, in response to receiving voice input 822, electronic device 600 outputs prompt 824 (e.g., a text-to-speech dictation) to provide another name that includes the statement: "THERE'S ALREADY A TIMER CALLED DINNER, BUT I CAN SET ANOTHER. WHAT SHOULD I NAME THIS ONE?" In some embodiments, a name is unavailable if another time-based notification exists that already has that name. In this example, because TIMER 2 is already named DINNER, the name DINNER is not available for TIMER 1.

In some embodiments, a name is unavailable if it does not meet one or more naming criterion. For example, the one or more naming criterion can include one or more of: a maximum length (e.g., number of characters), a minimum length, a requirement that the name does not contain unacceptable words and/or characters, or the like. In some embodiments, a name is unavailable if it cannot be understood by the electronic device (e.g., transcribed by a speech-to-text algorithm).

In the example in FIG. 8J, after the electronic device 600 outputs audio prompt 824, the device detects voice input 826. Voice input 826 includes a new name, "CHICKEN", different than the first name requested by the user (DINNER). In some embodiments, in response to receiving a new name (e.g., via voice input) and in accordance a determination that the new name is available, the electronic device (e.g., 600) renames the time-based notification with the new name. For example, in FIG. 8J, after receiving the new name CHICKEN in voice input 826, device 600 renames the TEN MINUTE timer (TIMER 1 in FIG. 8I) to be named "CHICKEN" (as shown in status box 801 in FIG. 8J). In this example, the name CHICKEN was available, so the electronic device sets the name of TIMER 1 to CHICKEN. Optionally, electronic device 600 provides an exemplary acknowledgement 828 including the statement: "OK, RENAMING YOUR TEN MINUTE TIMER TO "CHICKEN"", confirming that the time-based notification has been renamed, and confirming the new name.

In some embodiments, in accordance with a determination that no new name is received, the electronic device does not rename the time-based notification. For example, if device 600 does not receive voice input 826 (e.g., the user does not respond to prompt 824), the device does not rename the TEN MINUTE timer. In some embodiments, the electronic device waits for a new name for a predetermined amount of time. For example, the device may wait and listen (e.g., using a microphone) for the new name for five seconds before ceasing to wait and ending the interaction (e.g., after which voice input of "CHICKEN" would have no effect on device 600 until the user makes another request such as 822).

In some embodiments, in accordance with a determination that a requested name is available, the electronic device forgoes outputting a prompt to provide an alternate name (e.g., 824) and renames the time-based notification based on the request. For example, if TIMER 2 was not named DINNER in FIG. 8I when voice input 822 is received, then electronic device would not output prompt 824, but would instead cause TIMER 1 to be renamed to DINNER. In such case, the electronic device 600 could output an audio acknowledgement such as "OK, RENAMING YOUR TEN MINUTE TIMER TO "DINNER"".

FIGS. 8K-8N illustrate exemplary techniques for outputting a prompt to provide a name when a time-based notification already exists that has the same default name as a new requested time-based notification. FIGS. 8K-8L illustrate the creation of a first timer. In FIG. 8K, device 600 receives voice input 830 requesting creation of a first time-based notification, a timer for ten minutes. Voice input 830 includes the phrase: "HEY SIRI, SET A TIMER FOR TEN MINUTES". Before voice input 830 is received, no time-based notifications are active.

Turning to FIG. 8L, in response to receiving voice input 830, electronic device 600 sets a timer (TIMER 1) called "TEN MINUTE" having a length of ten minutes (e.g., shown to have elapsed one second with 9:59 (nine minutes and fifty-nine seconds) remaining in status box 801 of FIG. 8L. Additionally, electronic device 600 outputs acknowledgement 832: "TEN MINUTE TIMER, STARTING NOW". In this example, because electronic device has not received a request to set the name of the timer, it has assigned a default name to the timer, which is "TEN MINUTE" (based on the time value of the notification condition of the time-based notification).

FIGS. 8M-8N illustrate an exemplary technique for handling a request to create a second time-based notification that would have the same default name as an existing time-based notification. In FIG. 8M, TIMER 1 is active (created as shown in FIGS. 8K-8L) and is named "TEN MINUTE" (e.g., a default name), as shown in status box 801. While TIMER 1 is active, electronic device receives voice input 834, that includes a request to set another ten minute timer and that does not include a request to set the name of the new timer to a custom name. In some embodiments, in accordance with a determination that a request to create a time-based notification would result in a time-based notification that has the same default name of an existing time-based notification, the electronic device outputs a prompt (e.g., 836) to provide an alternative name. For example, in FIG. 8M, device 600 outputs prompt 836, which includes the statement: "THERE'S ALREADY A TEN MINUTE TIMER, BUT I CAN SET ANOTHER. WHAT SHOULD I CALL THIS ONE?" In this example, after outputting prompt 836, electronic device 600 awaits input (e.g., voice input) of a new name (e.g., waits for a predetermined amount of time). As shown in FIG. 8M, after outputting prompt 836, electronic device receives voice input 838 that includes a new name "DINNER".

Turning to FIG. 8N, in response to receiving the new name "DINNER" (FIG. 8M), the electronic device sets a second ten minute timer (TIMER 2) named "DINNER", in addition to the first, existing ten minute timer named "TEN MINUTE", as shown in status box 801. Additionally, electronic device 600 provides an exemplary acknowledgement 840 "TEN MINUTE DINNER TIMER, STARTING NOW". As can be seen, exemplary acknowledgement 840 includes an acknowledgement of the type (e.g., timer), the notification condition (e.g., ten minute), and the name (e.g., DINNER) for the time-based notification that was just set.

FIG. 8O illustrates an exemplary technique for determining whether an audio identifier (e.g., a name) of a time-based notification will be announced (e.g., upon expiration of the time-based notification). The rows of table 842 in FIG. 8O respectively illustrate one of four exemplary scenarios involving two time-based notifications (NOTIFICATION 1 and NOTIFICATION 2), where one time-based notification (NOTIFICATION 1) has expired and has not been dismissed and one time-based notification (NOTIFICATION 2) is active (e.g., has not expired). As described above, an electronic device is capable of setting a first type of time-based notification and a second type of time-based notification. For example, a first type can be a timer type of notification and a second type can be an alarm type of notification. In another example, the first type is an alarm and the second type is a timer. As described above, in some embodiments, an exemplary name output condition is met when a first time-based notification expires when another time-based notification is active and both are of the same type. Thus, to illustrate, in rows 842A and 842D, both NOTIFICATION 1 and NOTIFICATION 2 are the same type (e.g., both a first type or both a second type), so the name of NOTIFICATION 1 will be announced (e.g., similar to as shown in audio output 814 in FIG. 8F). Standing in contrast, in rows 842B and 842C, NOTIFICATION 1 and NOTIFICATION 2 are not the same type (e.g., in each scenario, one is a first type and the other is a second type), so the name of NOTIFICATION 1 will not be announced (e.g., similar to as shown in audio output 808 in FIG. 8C).

FIGS. 9A-9B is a flow diagram illustrating a method for outputting audio identifiers for time-based notifications using an electronic device in accordance with some embodiments. Method 900 is performed at a device (e.g., 100, 300, 500, 580). Some operations in method 900 are, optionally, combined, the orders of some operations are, optionally, changed, and some operations are, optionally, omitted.

As described below, method 900 provides an intuitive way of outputting audio identifiers for time-based notifications. The method reduces the cognitive burden on a user for identifying expired time-based notifications, thereby creating a more efficient human-machine interface. For battery-operated computing devices, enabling a user to identify expired time-based notifications faster and more efficiently conserves power and increases the time between battery charges.

The electronic device (e.g., 600) receives (902) information representing a first time-based notification condition (e.g., a timer length or an alarm time). For example, device 600 receives voice input 804 in FIG. 8A, including the time-based notification condition of a timer of length ten minutes.

The electronic device (e.g., 600) sets (904) a first time-based notification (e.g., TIMER 1 in FIG. 8B) based on the first time-based notification condition (e.g., timer of length ten minutes).

In response to a determination (906) that the first time-based notification condition has occurred (e.g., timer expires, alarm time arrives) (e.g., TIMER 1 expires in FIG. 8C or 8F): the electronic device (e.g., 600) causes (908) output of an audio notification (e.g., a single-event or multiple-event notification audio notification) (e.g., audio output 808 of FIG. 8C, or audio output 814 of FIG. 8F), and in accordance with a determination that a set of one or more name output conditions is satisfied, the electronic device (e.g., 600) causes (910) output of an audio identifier (e.g., name) that identifies the first time-based notification (e.g., audio output 814 of FIG. 8F, which includes the audio identifier "TEN MINUTE TIMER" identifying of the expired exemplary first time-based notification TIMER 1).

In some embodiments, the set of one or more name output conditions includes (912) a first condition that is satisfied when a second time-based notification is active (e.g., the second time-based notification was previously set based on a (second) time-based notification condition, that condition has not yet occurred, and the second time-based notification has not been canceled) when the first time-based notification condition occurs. For example, if a second timer or second alarm is set (e.g., for a future time) and is not expired at the time that the first timer or first alarm goes off, the electronic device announces the name of the first timer or first alarm going off). In some embodiments, the set of one or more name output conditions is satisfied (913) when at least one name output condition in the set of one or more name output conditions is satisfied. For example, if the set of one or more name output conditions includes two or more (e.g., independent) conditions that can be satisfied (e.g., independently), then satisfaction of fewer than (e.g., one) all can satisfy the set of one or more name output conditions.

Outputting an audio identifier in accordance with a set of one or more name output conditions being satisfied provides the user with audio feedback about the particular time-based notification that has expired. Providing improved audio feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to the determination (906) that the first time-based notification condition has occurred, and in accordance with a determination that the set of one or more name output conditions is not satisfied, the electronic device (e.g., 600) forgoes (911) causing output of the audio identifier that identifies the first time-based notification (e.g., audio output 808 of FIG. 8C, which does not include an audio identifier).

In some embodiments, a determination that the first condition is satisfied further includes a determination (914) that the first time-based notification and the second time-based notification are of a same type of time-based notification. For example, such a condition is satisfied when both time-based notifications are alarm type of time-based notifications, or when are both time-based notifications are timer type time-based notifications (e.g., but not when one is a timer and one is an alarm). As shown in FIG. 8F, exemplary first timer has expired, TIMER 1, is the same type (a timer type) of time-based notification as exemplary second time-based notification TIMER 2 (active), so an audio identifier (e.g., name) identifying TIMER 1 is output by device 600. FIG. 8O illustrates exemplary scenarios for determining when a condition requiring that notifications be of a same type is satisfied. In some embodiments, the condition can work for one type but not the other (e.g., satisfied by two timers, but not by two alarms).

Outputting an audio identifier in accordance with a name output condition that includes a determination that a first (expired) and second (active) time-based notification are the same type of time-based notification provides the user with audio feedback about the particular time-based notification that has expired. Providing improved audio feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first time-based notification and the second time-based notification are each either a first type of time-based notification (e.g., a timer) or a second type of time-based notification (e.g., an alarm). In some embodiments, a notification condition for the first type of time-based notification occurs upon expiration of a determined length of time (e.g., non-zero length of time, such as five minutes). In some embodiments, a notification condition for the second type of time-based notification occurs upon arrival of a determined time of day (e.g., 5:32 pm).

In some embodiments, a third time-based notification (e.g., TIMER 2 of FIG. 6K) was previously set (916) based on a third time-based notification condition (e.g., five-minute length of time), and the set of one or more name output conditions includes a second condition that is satisfied when the third time-based notification condition has occurred and the third time-based notification has not been dismissed when the first time-based notification condition occurs. For example, as shown in FIG. 6K, when at least two time-based notifications are currently expired and not dismissed, the audio identifier (e.g., "TEN MINUTE") identifying the first time-based notification (e.g., TIMER 1) is output by device 600. In some embodiments, the audio identifier identifying the first time-based notification is output when at least two time-based notifications (e.g., including the first time-based notification) are currently expired and not dismissed, regardless of the type of the at least two time-based notifications. For example, if an alarm and a timer are both going off, the name for one (or both) can be output.

Outputting an audio identifier in accordance with a name output condition that is satisfied when two (e.g., or more) time-based notifications have expired provides the user with audio feedback about the particular time-based notification that has expired. Providing improved audio feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second condition is satisfied, and in accordance with the determination (910) that the set of one or more name output conditions is satisfied, the electronic device (e.g., 600) additionally causes output (918) of: the audio identifier that identifies the first time-based notification; and an audio identifier that identifies the third time-based notification. For example, as shown in FIG. 6K, when at least two time-based notifications are currently expired and not dismissed, an audio identifier (e.g., "TEN MINUTE") identifying an exemplary first time-based notification (e.g., TIMER 1) and an audio identifier (e.g., "FIVE MINUTE") identifying an exemplary third time-based notification (e.g., TIMER 2) are output by device 600 as audio output 622, which includes the statement: "TEN MINUTE AND FIVE MINUTE TIMERS".

Outputting audio identifiers that identify each of two time-based notifications corresponding to time-based notification conditions that have occurred provides the user with audio feedback about the particular time-based notifications that have expired. Providing improved audio feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a name of the first time-based notification is configurable via input (e.g., voice input) representing a request to set the name of the first time-based notification (e.g., voice input 816 of FIG. 8G). In some embodiments, the set of one or more name output conditions includes (920) a third condition that is satisfied when the name of the first time-based notification has been configured via input representing a request to set the name of the first time-based notification. For example, device 600 receives user input that provides a name for the timer or alarm at the time of creation (e.g., voice input 816 of FIG. 8G), or after creation (e.g., renaming a time-based notification) (e.g., voice input 822 of FIG. 8I, voice input 838 of FIG. 8M).

Outputting an audio identifier in accordance with a name output condition that is satisfied when a request to set the name of a first time-based notification is received provides the user with audio feedback about the particular time-based notification that has expired. Providing improved audio feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 600) receives input representing a request to set the name of the first time-based notification to a first name (e.g., voice input 816 of FIG. 8G, voice input 822 of FIG. 8I, voice input 838 of FIG. 8M). In response to receiving the input representing the request to set the name of the first time-based notification to the first name: in accordance with a determination that the first name is available (e.g., is not being used, is permissible (e.g., not too long)), the electronic device (e.g., 600) sets the name of the first time-based notification to the first name (e.g., in FIG. 8G, TIMER 1 is named DINNER after receiving voice input 816); and in accordance with a determination that the first name is not available (e.g., there is already a timer with that name, name is not permissible), the electronic device (e.g., 600) forgoes setting the name of the first time-based notification to the first name (e.g., in FIG. 8J, device 600 forgoes naming TIMER 1 to DINNER). In some embodiments, a default name is used instead (e.g., if an alternative name is not provided).

In some embodiments, causing output of the audio identifier comprises, while the name of the first time-based notification is set to the first name, causing audio output of the first name. For example, as shown in FIG. 8H, the audio identifier in audio output 820 is the output of the name of the time-based notification. In FIG. 8H, the name is the user specified name "DINNER".

In some embodiments, receiving the input representing the request to set the name of the first time-based notification comprises receiving input representing a request to create the first time-based notification (e.g., voice input 816 in FIG. 8G includes a request to create and a request to name), wherein the request to create the first time-based notification includes: the information representing the first time-based notification condition (e.g., a timer of length ten minutes); and the request to set the name of the first time-based notification (e.g., "SET A TIMER"). In some embodiments, further in response to receiving the request to create the first time-based notification: the electronic device (e.g., 600) sets the name of the first time-based notification to the first name (e.g., in FIG. 8H, TIMER 1 has been named DINNER).

In some embodiments, receiving the input representing the request to set the name of the first time-based notification comprises receiving the input representing the request to set the name of the first time-based notification subsequent to setting the first time-based notification based on the first time-based notification condition (e.g., receiving voice input 822 of FIG. 8I, after TIMER 1 was already set). For example, electronic device 600 receives the input and renames an existing timer to the first name, and upon the notification condition occurring, uses the new (first) name as the audio identifier, instead of the previous name (e.g., default name before renaming).

In some embodiments, further in accordance with a determination that the first name is not available (e.g., as shown in FIGS. 8I-8J, there's already a timer called DINNER when voice input 822 is received): the electronic device (e.g., 600) causes output of a prompt (e.g., an audio prompt) (e.g., audio output 824) to provide an alternative name different from the first name (e.g., "THERE'S ALREADY A TIMER CALLED DINNER, BUT I CAN SET ANOTHER. WHAT SHOULD I NAME THIS ONE?"); and the electronic device (e.g., 600) awaits input of the alternative name. While awaiting input of the alternative name (e.g., for a threshold amount of time after outputting the prompt), the electronic device (e.g., 600) receives input (e.g., voice input 826) representing a second name (e.g., CHICKEN) different from the first name (e.g., DINNER). In response to receiving the input (e.g., 838) representing the second name (e.g., CHICKEN): in accordance with a determination that the second name is available, the electronic device (e.g., 600) sets the name of the first time-based notification to the second name (e.g., TIMER 1 is named CHICKEN in FIG. 8J); and in accordance with a determination that the second name is not available, forgoing setting the name of the first time-based notification to the second name. In some embodiments, if input representing the second name is not received (e.g., within a threshold amount of time after outputting the prompt), the electronic device does not set the time-based notification if the naming request was included in the request to create the time-based notification. For example, if voice input 838 is not provided in response to prompt output 836, then device 600 would not create a second ten minute timer, TIMER 2 (of FIG. 8N). In some embodiments, if the request was a request to rename the time-based notification (e.g., received after the time-based notification was already set), and the second name is not received, the electronic device can forgo renaming the time-based notification (e.g., and keep the previous name).

In some embodiments, in response to receiving the information representing the first time-based notification condition (e.g., receiving voice input 834 of FIG. 8M), wherein the electronic device has not received a request to set a name of the first time-based notification (e.g., in FIG. 8M, voice input 834 does not include a request to set a same of the ten minute timer being created): in accordance with a determination that a fourth time-based notification (e.g., TIMER 1 of FIG. 8M) is active, wherein the fourth time-based notification was previously set based on a fourth time-based notification condition (e.g., timer of length ten minutes), and wherein the electronic device has not received a request to set a name of the fourth time-based notification condition (e.g., TIMER 1 in FIG. 8M has default name TEN MINUTE), and wherein the first time-based notification condition (e.g., ten minutes as indicated by voice input 834) and the fourth time-based notification condition are the same (e.g., timer length of ten minutes): the electronic device (e.g., 600) causes output of a prompt (e.g., an audio prompt) (e.g., audio output 836) to provide a custom name for the first time-based notification; and awaits input of the custom name (e.g., voice input 838 includes exemplary custom name "DINNER") for the first time-based notification. In response to receiving the information representing the first time-based notification condition: in accordance with a determination that the fourth time-based notification is not active (e.g., there is not currently a timer set with the same default name): the electronic device (e.g., 600) sets the name of the first time-based notification to a first default name (e.g., a timer length, an alarm time); the electronic device (e.g., 600) forgoes causing output of the prompt (e.g., 836) to provide the custom name for the first time-based notification; and the electronic device (e.g., 600) forgoes awaiting input of the custom name for the first time-based notification. For example, as shown in FIGS. 8K-8L, when a request to create a time-based notification does not include a request to set a name, and another time-based notification does not already exist that would have the same default name, the default name is used (e.g., TEN MINUTE for TIMER 1).

Outputting a prompt to provide a custom name for a time-based notification when another time-based notification was previously set with the same time-based notification condition provides the user with more control of the device by helping the user unintentionally avoid creating duplicate audio identifiers. Providing additional control of the device automatically without requiring repeated or excessive user inputs improved audio feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the information representing the first time-based notification condition does not include a request to set a name of the first time-based notification (e.g., voice input 804 does not include a request to set a name), and the electronic device (e.g., 600) sets the name of the first time-based notification to a second default name (e.g., TEN MINUTE as shown in FIG. 8B), wherein the second default name is based on a time value representing the first time-based notification condition; and wherein causing output of the audio identifier comprises causing audio output of the second default name (e.g., audio output 814 of FIG. 8F includes output of "TEN MINUTE TIMER"). In some embodiments, the time value is a length of time (e.g., 10 minutes). In some embodiments, the time value is a time of day (e.g., 5:00 pm).

Setting a default name for a time-based notification based on a time value when information representing the first time-based notification condition does not include a request to set a name of the first time-based notification reduces the number of user inputs required by the user for determining a name to be used as an audio identifier. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, causing output of the audio notification and causing output of the audio identifier comprises causing output of the audio notification and the audio identifier in a predetermined pattern that includes causing output of the audio notification a first predetermined number of times (e.g., two times) and causing output of the audio identifier that identifies the first time-based notification a second predetermined number of times (e.g., one time). For example, as shown in FIG. 6K, audio output 622 includes a predetermined pattern in which an audio notification (AUDIO NOTIFICATION 2) is output twice, followed by output of an audio identifier (two in this example, "TEN MINUTE AND FIVE MINUTE TIMERS"). In some embodiments, the electronic device causes output of the predetermined pattern to repeat (e.g., until dismissal of the notifications or expiration of a predetermined amount of time (e.g., 15 minutes). For example, in FIG. 6K, the pattern repeats (e.g., AUDIO NOTIFICATION 2 is shown being output another two times after the audio identifiers). In some embodiments, the first predetermined number of times increases to a third predetermined number of times (e.g., four times) after the electronic device has caused output of the predetermined pattern a fourth predetermined number of times (e.g., after the pattern has repeated two times). For example, in FIG. 6L, the number of times that the audio notification AUDIO NOTIFICATION 2 is output during one repetition of the predetermined pattern has increased to four.

In some embodiments, the device outputs the audio notification the first predetermined number of times, followed by the audio identifier. In some embodiments, the device outputs the audio identifier followed by the audio notification.

Note that details of the processes described above with respect to method 900 (e.g., FIGS. 9A-9B) are also applicable in an analogous manner to the methods described above. For example, method 900 optionally includes one or more of the characteristics of the various methods described above with reference to method 700. For example, the technique for determining the type of audio notification to output can be combined with the technique for determining whether to output an audio identifier. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of audio notifications. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver audio notifications that are more informative to the user. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of time-based notification audio output, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, audio output for time-based notifications can be selected and delivered to users by inferring preferences based on non-personal information data or a bare minimum amount of personal information, such as the content being requested by the device associated with a user, other non-personal information available to the time-based notification output service, or publicly available information.

What is claimed is:

1. An electronic device, comprising:
   one or more processors; and
   memory storing one or more programs configured to be executed by the one or more processors, the one or more programs including instructions for:
   receiving a first information representing a first time-based notification condition;
   setting a first time-based notification based on the first time-based notification condition; and
   in response to a determination that the first time-based notification condition has occurred:
      in accordance with a determination that the electronic device is not currently causing output of an audio notification based on at least one time-based notification other than the first time-based notification, causing output of a first audio notification; and
      in accordance with a determination that the electronic device is currently causing output of the audio notification based on at least one time-based notification other than the first time-based notification:
         causing output of a second audio notification audibly different from the first audio notification, wherein the at least one time-based notification other than the first time-based notification is a second time-based notification, and wherein the second time-based notification was previously set by the electronic device based on a second time-based notification condition; and
         while causing output of the second audio notification and while the first time-based notification and the second time-based notification have not been dismissed:
            causing audio output of audio identifiers that audibly identify the first time-based notification and the second time-based notification, wherein the respective audio identifiers are audibly different from the first audio notification and the second audio notification.

2. The electronic device of claim 1, wherein the audio notification based on at least one time-based notification other than the first time-based notification is the first audio notification, the one or more programs further including instructions for:
   further in accordance with the determination that the electronic device is currently causing output of the audio notification based on at least one time-based notification other than the first time-based notification, ceasing to cause output of the first audio notification.

3. The electronic device of claim 2, wherein causing output of the second audio notification comprises causing output of the second audio notification to begin upon ceasing to cause output of the first audio notification.

4. The electronic device of claim 1, wherein receiving the first information representing the first time-based notification condition comprises receiving a voice input representing a request to set the first time-based notification, wherein the voice input includes the first information representing the first time-based notification condition.

5. The electronic device of claim 1, wherein receiving the first information representing the first time-based notification condition comprises receiving data from a second electronic device, connected to the electronic device, representing a request to set the first time-based notification, wherein the data includes the first information representing the first time-based notification condition.

6. The electronic device of claim 1, the one or more programs further including instructions for:
   while causing output of the second audio notification, receiving an input representing a request to cease audio notification output; and
   in response to receiving the input representing the request to cease audio notification output, ceasing to cause output of the second audio notification.

7. The electronic device of claim 6, the one or more programs further including instructions for:
   prior to the determination that the first time-based notification condition has occurred:
      setting a third time-based notification based on a third time-based notification condition;
      while the electronic device is not currently causing output of an audio notification based on at least one time-based notification other than the third time-based notification, and in response to a determination that the third time-based notification condition has occurred, causing output of the first audio notification;

further in response to the determination that the first time-based notification condition has occurred, and in accordance with the determination that the electronic device is currently causing output of the audio notification based on at least one time-based notification other than the first time-based notification, ceasing to cause output of the first audio notification, wherein the first time-based notification condition occurs while the electronic device is currently causing output of the first audio notification based on the third time-based notification;

while the electronic device is currently causing output of the second audio notification, wherein the first time-based notification condition and the third time-based notification condition have occurred, and wherein the first time-based notification and the third time-based notification have not been dismissed, receiving the input representing the request to cease audio notification output; and further in response to receiving the input representing the request to cease audio notification output:

dismissing the first time-based notification and the third time-based notification, wherein upon ceasing to cause output of the second audio notification the electronic device does not begin to cause output of the first audio notification.

8. The electronic device of claim 1, wherein the first time-based notification condition includes one or more of:

a first type of notification condition that occurs upon expiration of a determined length of time; and a second type of notification condition that occurs upon arrival of a determined time of day.

9. The electronic device of claim 1, wherein causing output of the second audio notification and causing output of the audio identifiers comprises causing output of the second audio notification and the audio identifiers in a predetermined pattern that includes causing output of the second audio notification a first predetermined number of times and causing output of the audio identifiers that identify the first time-based notification and the second time-based notification a second predetermined number of times;

wherein the electronic device causes output of the predetermined pattern to repeat; and wherein the first predetermined number of times increases to a third predetermined number of times after the electronic device has caused output of the predetermined pattern a fourth predetermined number of times.

10. The electronic device of claim 1, wherein the first audio notification is a single-event audio notification that indicates occurrence of a time-based notification condition of a single time-based notification that has not been dismissed, and wherein the second audio notification is a multiple-event audio notification that indicates the occurrence of time-based notification conditions of multiple time-based notifications that have not been dismissed.

11. The electronic device of claim 10, the one or more programs further including instructions for:

in accordance with a determination that the at least one time-based notification includes a third type of time-based notification or that the first time-based notification is the third type of time-based notification, the second audio notification is a first multiple-event audio notification; and in accordance with a determination that each of the at least one time-based notification is a fourth type of time-based notification different from the third type and that the first time-based notification is the fourth type of time-based notification, the second audio notification is a second multiple-event audio notification different from the first multiple-event audio notification.

12. The electronic device of claim 1, the one or more programs further including instructions for:

while causing output of the first audio notification, causing output of a first visual indication; and while causing output of the second audio notification, causing output of a second visual indication different from the first visual indication.

13. A non-transitory computer-readable storage medium storing one or more programs configured to be executed by one or more processors of an electronic device, the one or more programs including instructions for:

receiving a first information representing a first time-based notification condition;

setting a first time-based notification based on the first time-based notification condition; and in response to a determination that the first time-based notification condition has occurred:

in accordance with a determination that the electronic device is not currently causing output of an audio notification based on at least one time-based notification other than the first time-based notification, causing output of a first audio notification; and in accordance with a determination that the electronic device is currently causing output of the audio notification based on at least one time-based notification other than the first time-based notification:

causing output of a second audio notification audibly different from the first audio notification, wherein the at least one time-based notification other than the first time-based notification is a second time-based notification, and wherein the second time-based notification was previously set by the electronic device based on a second time-based notification condition; and while causing output of the second audio notification and while the first time-based notification and the second time-based notification have not been dismissed:

causing audio output of audio identifiers that audibly identify the first time-based notification and the second time-based notification, wherein the respective audio identifiers are audibly different from the first audio notification and the second audio notification.

14. The computer-readable storage medium of claim 13, wherein the audio notification based on at least one time-based notification other than the first time-based notification is the first audio notification, the one or more programs further including instructions for:

further in accordance with the determination that the electronic device is currently causing output of the audio notification based on at least one time-based notification other than the first time-based notification, ceasing to cause output of the first audio notification.

15. The computer-readable storage medium of claim 14, wherein causing output of the second audio notification comprises causing output of the second audio notification to begin upon ceasing to cause output of the first audio notification.

16. The computer-readable storage medium of claim 13, wherein receiving the first information representing the first time-based notification condition comprises receiving a voice input representing a request to set the first time-based notification, wherein the voice input includes the first information representing the first time-based notification condition.

17. The computer-readable storage medium of claim 13, wherein receiving the first information representing the first time-based notification condition comprises receiving data from a second electronic device, connected to the electronic device, representing a request to set the first time-based notification, wherein the data includes the first information representing the first time-based notification condition.

18. The computer-readable storage medium of claim 13, the one or more programs further including instructions for:
  while causing output of the second audio notification, receiving an input representing a request to cease audio notification output; and
  in response to receiving the input representing the request to cease audio notification output, ceasing to cause output of the second audio notification.

19. The computer-readable storage medium of claim 18, the one or more programs further including instructions for:
  prior to the determination that the first time-based notification condition has occurred:
    setting a third time-based notification based on a third time-based notification condition;
    while the electronic device is not currently causing output of an audio notification based on at least one time-based notification other than the third time-based notification, and in response to a determination that the third time-based notification condition has occurred, causing output of the first audio notification;
  further in response to the determination that the first time-based notification condition has occurred, and in accordance with the determination that the electronic device is currently causing output of the audio notification based on at least one time-based notification other than the first time-based notification, ceasing to cause output of the first audio notification, wherein the first time-based notification condition occurs while the electronic device is currently causing output of the first audio notification based on the third time-based notification;
  while the electronic device is currently causing output of the second audio notification, wherein the first time-based notification condition and the third time-based notification condition have occurred, and wherein the first time-based notification and the third time-based notification have not been dismissed, receiving the input representing the request to cease audio notification output; and
  further in response to receiving the input representing the request to cease audio notification output:
    dismissing the first time-based notification and the third time-based notification, wherein upon ceasing to cause output of the second audio notification the electronic device does not begin to cause output of the first audio notification.

20. The computer-readable storage medium of claim 13, wherein the first time-based notification condition includes one or more of:
  a first type of notification condition that occurs upon expiration of a determined length of time; and
  a second type of notification condition that occurs upon arrival of a determined time of day.

21. The computer-readable storage medium of claim 13, wherein causing output of the second audio notification and causing output of the audio identifiers comprises causing output of the second audio notification and the audio identifiers in a predetermined pattern that includes causing output of the second audio notification a first predetermined number of times and causing output of the audio identifiers that identify the first time-based notification and the second time-based notification a second predetermined number of times;
  wherein the electronic device causes output of the predetermined pattern to repeat; and
  wherein the first predetermined number of times increases to a third predetermined number of times after the electronic device has caused output of the predetermined pattern a fourth predetermined number of times.

22. The computer-readable storage medium of claim 13, wherein the first audio notification is a single-event audio notification that indicates occurrence of a time-based notification condition of a single time-based notification that has not been dismissed, and
  wherein the second audio notification is a multiple-event audio notification that indicates the occurrence of time-based notification conditions of multiple time-based notifications that have not been dismissed.

23. The computer-readable storage medium of claim 22, the one or more programs further including instructions for:
  in accordance with a determination that the at least one time-based notification includes a third type of time-based notification or that the first time-based notification is the third type of time-based notification, the second audio notification is a first multiple-event audio notification; and
  in accordance with a determination that each of the at least one time-based notification is a fourth type of time-based notification different from the third type and that the first time-based notification is the fourth type of time-based notification, the second audio notification is a second multiple-event audio notification different from the first multiple-event audio notification.

24. The computer-readable storage medium of claim 13, the one or more programs further including instructions for:
  while causing output of the first audio notification, causing output of a first visual indication; and
  while causing output of the second audio notification, causing output of a second visual indication different from the first visual indication.

25. A method comprising:
  at an electronic device:
    receiving a first information representing a first time-based notification condition;
    setting a first time-based notification based on the first time-based notification condition; and
    in response to a determination that the first time-based notification condition has occurred:
      in accordance with a determination that the electronic device is not currently causing output of an audio notification based on at least one time-based notification other than the first time-based notification, causing output of a first audio notification; and
      in accordance with a determination that the electronic device is currently causing output of the audio notification based on at least one time-based notification other than the first time-based notification:
        causing output of a second audio notification audibly different from the first audio notification, wherein the at least one time-based notification other than the first time-based notification is a second time-based notification, and wherein the second time-based notification was previously set by the electronic device based on a second time-based notification condition; and while causing output of the second audio notification and while the first time-based notification and the second time-based notification have not been dismissed:
causing audio output of audio identifiers that audibly identify the first time-based notification and the second time-based notification, wherein the respective audio identifiers are audibly different from the first audio notification and the second audio notification.

26. The method of claim 25, wherein the audio notification based on at least one time-based notification other than the first time-based notification is the first audio notification, further comprising:
further in accordance with the determination that the electronic device is currently causing output of the audio notification based on at least one time-based notification other than the first time-based notification, ceasing to cause output of the first audio notification.

27. The method of claim 26, wherein causing output of the second audio notification comprises causing output of the second audio notification to begin upon ceasing to cause output of the first audio notification.

28. The method of claim 25, wherein receiving the first information representing the first time-based notification condition comprises receiving a voice input representing a request to set the first time-based notification, wherein the voice input includes the first information representing the first time-based notification condition.

29. The method of claim 25, wherein receiving the first information representing the first time-based notification condition comprises receiving data from a second electronic device, connected to the electronic device, representing a request to set the first time-based notification, wherein the data includes the first information representing the first time-based notification condition.

30. The method of claim 25, further comprising:
while causing output of the second audio notification, receiving an input representing a request to cease audio notification output; and
in response to receiving the input representing the request to cease audio notification output, ceasing to cause output of the second audio notification.

31. The method of claim 30, further comprising:
prior to the determination that the first time-based notification condition has occurred:
setting a third time-based notification based on a third time-based notification condition;
while the electronic device is not currently causing output of an audio notification based on at least one time-based notification other than the third time-based notification, and in response to a determination that the third time-based notification condition has occurred, causing output of the first audio notification;
further in response to the determination that the first time-based notification condition has occurred, and in accordance with the determination that the electronic device is currently causing output of the audio notification based on at least one time-based notification other than the first time-based notification, ceasing to cause output of the first audio notification, wherein the first time-based notification condition occurs while the electronic device is currently causing output of the first audio notification based on the third time-based notification;
while the electronic device is currently causing output of the second audio notification, wherein the first time-based notification condition and the third time-based notification condition have occurred, and wherein the first time-based notification and the third time-based notification have not been dismissed, receiving the input representing the request to cease audio notification output; and
further in response to receiving the input representing the request to cease audio notification output:
dismissing the first time-based notification and the third time-based notification, wherein upon ceasing to cause output of the second audio notification the electronic device does not begin to cause output of the first audio notification.

32. The method of claim 25, wherein the first time-based notification condition includes one or more of:
a first type of notification condition that occurs upon expiration of a determined length of time; and
a second type of notification condition that occurs upon arrival of a determined time of day.

33. The method of claim 25, wherein causing output of the second audio notification and causing output of the audio identifiers comprises causing output of the second audio notification and the audio identifiers in a predetermined pattern that includes causing output of the second audio notification a first predetermined number of times and causing output of the audio identifiers that identify the first time-based notification and the second time-based notification a second predetermined number of times;
wherein the electronic device causes output of the predetermined pattern to repeat; and
wherein the first predetermined number of times increases to a third predetermined number of times after the electronic device has caused output of the predetermined pattern a fourth predetermined number of times.

34. The method of claim 25,
wherein the first audio notification is a single-event audio notification that indicates occurrence of a time-based notification condition of a single time-based notification that has not been dismissed, and
wherein the second audio notification is a multiple-event audio notification that indicates the occurrence of time-based notification conditions of multiple time-based notifications that have not been dismissed.

35. The method of claim 34, further comprising:
in accordance with a determination that the at least one time-based notification includes a third type of time-based notification or that the first time-based notification is the third type of time-based notification, the second audio notification is a first multiple-event audio notification; and
in accordance with a determination that each of the at least one time-based notification is a fourth type of time-based notification different from the third type and that the first time-based notification is the fourth type of time-based notification, the second audio notification is a second multiple-event audio notification different from the first multiple-event audio notification.

36. The method of claim 25, further comprising:
while causing output of the first audio notification, causing output of a first visual indication; and while causing output of the second audio notification, causing output of a second visual indication different from the first visual indication.

\* \* \* \* \*